(12) United States Patent
Seregin et al.

(10) Patent No.: US 10,630,986 B2
(45) Date of Patent: *Apr. 21, 2020

(54) METHOD AND DEVICE FOR ENCODING INTRA PREDICTION MODE FOR IMAGE PREDICTION UNIT, AND METHOD AND DEVICE FOR DECODING INTRA PREDICTION MODE FOR IMAGE PREDICTION UNIT

(71) Applicant: SAMSUNG ELECTRONICS CO., LTD., Suwon-si (KR)

(72) Inventors: Vadim Seregin, Suwon-si (KR); Jianle Chen, Suwon-si (KR); Sun-il Lee, Yongin-si (KR); Tammy Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 96 days.

This patent is subject to a terminal disclaimer.

(21) Appl. No.: 16/003,946

(22) Filed: Jun. 8, 2018

(65) Prior Publication Data

US 2018/0295365 A1    Oct. 11, 2018

Related U.S. Application Data

(63) Continuation of application No. 13/997,524, filed as application No. PCT/KR2011/010066 on Dec. 23, 2011, now Pat. No. 10,021,384.

(Continued)

(51) Int. Cl.
*H04N 19/13* (2014.01)
*H04N 19/46* (2014.01)
(Continued)

(52) U.S. Cl.
CPC .......... *H04N 19/13* (2014.11); *H04N 19/186* (2014.11); *H04N 19/46* (2014.11); *H04N 19/463* (2014.11);
(Continued)

(58) Field of Classification Search
CPC ....... H04N 19/46; H04N 19/186; H04N 19/13
See application file for complete search history.

(56) References Cited

U.S. PATENT DOCUMENTS 5,822,541 A    10/1998  Nonomura et al.
6,188,725 B1    2/2001  Sugiyama
(Continued)

FOREIGN PATENT DOCUMENTS

CN    1777283 A    5/2006
CN    1784015 A    6/2006
(Continued)

OTHER PUBLICATIONS

Communication dated Sep. 29, 2017, issued by the Russian Patent Office in counterpart Russian Application No. 2016129591.
(Continued)

*Primary Examiner* — Zhubing Ren
(74) *Attorney, Agent, or Firm* — Sughrue Mion, PLLC

(57) ABSTRACT

Methods and apparatuses for encoding and decoding an intra prediction mode of a prediction unit of a chrominance component based on an intra prediction mode of a prediction unit of a luminance component are provided. When an intra prediction mode of a prediction unit of a luminance component is the same as an intra prediction mode in an intra prediction mode candidate group of a prediction unit of a chrominance component, reconstructing the intra prediction mode candidate group of the prediction unit of the chrominance component by excluding or replacing an intra prediction mode of the prediction unit of the chrominance com-
(Continued)

US 10,630,986 B2

Page 2 ponent which is same as an intra prediction mode of the prediction unit of the luminance component from the intra prediction mode candidate group, and encoding the intra prediction mode of the prediction unit of the chrominance component by using the reconstructed intra prediction mode candidate group.

4 Claims, 28 Drawing Sheets

Related U.S. Application Data

(60) Provisional application No. 61/426,684, filed on Dec. 23, 2010.

(51) Int. Cl.
*H04N 19/593* (2014.01)
*H04N 19/463* (2014.01)
*H04N 19/186* (2014.01)
H04N 19/119 (2014.01)
H04N 19/11 (2014.01)
H04N 19/154 (2014.01)

(52) U.S. Cl.
CPC ........... *H04N 19/593* (2014.11); *H04N 19/11* (2014.11); *H04N 19/119* (2014.11); *H04N 19/154* (2014.11)

(56) References Cited

U.S. PATENT DOCUMENTS

| | | | |
|---|---|---|---|
| 6,625,215 | B1 | 9/2003 | Faryar et al. |
| 6,636,637 | B1 | 10/2003 | Kaup |
| 6,907,142 | B2 | 6/2005 | Kalevo et al. |
| 7,010,044 | B2 | 3/2006 | Dattani et al. |
| 7,835,438 | B2 | 11/2010 | Chono |
| 8,369,404 | B2 | 2/2013 | Sekiguchi et al. |
| 8,422,803 | B2 | 4/2013 | Sekiuchi et al. |
| 8,509,551 | B2 | 8/2013 | Moriya et al. |
| 2002/0168009 | A1 | 11/2002 | Sakaguchi |
| 2003/0152270 | A1 | 8/2003 | Saiga et al. |
| 2009/0003717 | A1* | 1/2009 | Sekiguchi ............ H04N 19/176 382/238 |
| 2009/0232206 | A1 | 9/2009 | Boon et al. |
| 2010/0054334 | A1* | 3/2010 | Yoo ...................... H04N 19/176 375/240.14 |
| 2010/0254457 | A1* | 10/2010 | Xi ........................ H04N 19/176 375/240.12 |
| 2011/0249749 | A1 | 10/2011 | Takahashi et al. |
| 2015/0139328 | A1 | 5/2015 | Lee et al. |
| 2015/0326879 | A1 | 11/2015 | Alshina et al. |
| 2018/0295365 | A1 | 10/2018 | Seregin et al. |

FOREIGN PATENT DOCUMENTS

| | | |
|---|---|---|
| CN | 101222644 A | 7/2008 |
| CN | 101889449 A | 11/2010 |
| EP | 1 059 812 A3 | 12/2000 |
| EP | 2166769 A1 | 3/2010 |
| EP | 2685724 A2 | 1/2014 |
| KR | 1020070005848 A | 1/2007 |
| KR | 100865690 B1 | 10/2008 |
| KR | 1020100121972 A | 11/2010 |
| KR | 10-1763909 B1 | 8/2017 |
| KR | 10-1995551 B1 | 7/2019 |
| KR | 10-2054948 B1 | 12/2019 |
| RU | 2333616 C2 | 9/2008 |
| RU | 2342804 C2 | 12/2008 |
| RU | 2386222 C2 | 11/2009 |
| RU | 2196391 C2 | 1/2010 |
| RU | 2384970 C1 | 3/2010 |
| RU | 2 391 794 C2 | 6/2010 |
| WO | 2007/010690 A1 | 1/2007 |
| WO | 2010/002214 A2 | 1/2010 |
| WO | 2010064396 A1 | 6/2010 |
| WO | 2012008125 A1 | 1/2012 |

OTHER PUBLICATIONS

Communication dated Mar. 23, 2016 issued by the Russian Patent Office in counterpart Russian Patent Application No. 2015104959.
Communication dated Jun. 6, 2016 issued by the European Patent Office in counterpart European Patent Application No. 11 850 033.9.
Jianle Chen et al; "CE6.a: Chroma intra prediction by reconstructed luma samples"; Joint Collaborative Team on Video Coding (JCT-VC) of ITU-T SG16 WP3 and ISO/IEC JTC1/SC29/WG11; 4th Meeting:Daegu, KR, Jan. 20-28, 2011; Document: JCTVC-D350; 7 pgs. total.
Communication dated Jan. 6, 2016, issued by the State Intellectual Property Office of P.R. China in counterpart Chinese Application No. 201180068469.3.
Communication dated on Feb. 16, 2016, issued by the Ministry of Justice and Human Rights of the Republic of Indonesia Directorate General of Intellectual Property Rights in counterpart Indonesian Application No. W-00201303409.
International Search Report dated Jun. 29, 2012 from the International Searching Authority in counterpart application No. PCT/KR/2011010066.
Communication dated Sep. 8, 2015 by the Japanese Patent Office in related Application No. 2013-546039.
Davies, "BBC's Response to the Call for Proposals on Video Compression Technology", Joint Collaborative Team on Video Coding (JCT-VC) of ITU-T SG16 WP3 and ISO/IEC JTC1/SC29/WG11, 1st Meeting, Apr. 15-23, 2010, 16 total pages.
Communication dated May 20, 2014 issued by the Japanese Patent Office in counterpart Japanese Patent Application No. 2013-546039.
Jianle Chen et al., "Chroma Intra Prediction by Reconstructed luma Samples", Joint Collaborative Team on Video Coding (JCT-VC) of ITU-T SG16 WP3 and ISO/IEC JTC1/SC29/WG11, JCTVC-C206, <URL:http://phenix.itsudparis.eu/jct/doc_end_user/documents/3_Guangzhou/wg11/JCTVC-C206-m18244-v1-JCTVC-C206.zip>, Oct. 7, 2010, p. 1-8.
Ali Tabatabai et al., "Core Experiment 6: Intra Prediction Improvement", Joing Collaborative Team on Video Coding (JCT-VC) of ITU-T SG16 WP3 and ISO/IEC JTCC1/SC29/WG11, JCTVC-C506_r2, <URL:http://ph enix.it-sudparis.eu/jct/doc_end_user/documents/3_Guang zhou/wg11/JCTVC-C506-m18608-v3-JCTVC-C506_r2.zip>, Oct. 7, 2010, p. 1-16.
Communication dated Oct. 21, 2014 issued by the Japanese Patent Office in counterpart Japanese Patent Application No. 2013-546039.
Yeo, C., et al,"CE7: Cross-check of Tool 4—DST for Intra Chroma Residual Coding",Joint Collaborative Team on Video Coding (JCT-VC)of ITU-T SG16 WP3 and ISO/IEC JTC1/SC29/WG11 JCTVC-G076_r1,Nov. 17, 2011, total 6 pages.
Iain E. Richardson, "H.264 and MPEG-4 Video Compression, chapter 6, H.264/MPEG4 Part 10" Not Known, Oct. 17, 2003 (Oct. 17, 2003), XP030001626, total 65 pages.
Kim J, et al., "New intra chroma prediction using inter channel correlation", 2. JCT-VC Meeting; Jul. 21, 2010-Jul. 28, 2010; Geneva; (Joint Collaborativeteam on Video Coding of ISO/IEC JTC1/SC29/WG11 and ITU-T SG.16 ); URL:http://wftp3.itu.int/av-arch/jctvc-site/, No. JCTVC-B021 , Jul. 23, 2010 (Jul. 23, 2010), XP030007601, total 9 pages.
Yang H, et al., "Non-CE6: Remove potential duplicate modes from the candidate mode list for chroma intra prediction", 7. JCT-VC Meeting; 98. MPEG Meeting; Nov. 21, 2011-Nov. 30, 2011; Geneva; (Joint Collaborative Team on Video Coding of ISO/IEC JTC1/SC29/WG11 and ITU-T SG.16 ); URL:http://wftp3.itu.int/av-arch/jctvc-site/, No. JCTVC-G423, Nov. 8, 2011 (Nov. 8, 2011), XP030110407, total 4 pages.
Zhang X et al: "New modes for chroma intra prediction", 7. JCT-VC Meeting; 98. MPEG Meeting; Nov. 21, 2011-Nov. 30, 2011; Geneva; (Joint Collaborative Team on Video Coding of ISO/IEC JTC1/SC29/

(56) References Cited

OTHER PUBLICATIONS

WG11 and ITU-T SG.16 ); URL:http://wftp3.itu.int/av-arch/jctvc-site/, No. JCTVC-G358, Nov. 10, 2011 (Nov. 10, 2011), XP030110342, total 8 pages.

Communication from the European Patent Office dated Nov. 4, 2014, in a counterpart European Application No. 11850033.9.

Communication from the Australian Patent Office dated Oct. 24, 2014, in a counterpart Australian Application No. 2011345535.

Zhang, K. et al:"An Efficient Coding Method for Intra Prediction Mode Information", Circuits and Systems, 2009, ISCAS 2009, IEEE International Symposium on, May 24-27, 2009, total 4 pages.

Sung Park, J, et al., "Selective Intra Prediction Mode Decision for H.264/AVC Encoders", World Academy of Science, Engineering and Technology 13, 2006, pp. 51-55.

Communication from the Russian Patent Office dated Oct. 27, 2014, in a counterpart Russian application No. 2013134263.

Communication dated Nov. 5, 2018, issued by the Korean Intellectual Property Office in counterpart Korean Application No. 10-2017-0094962.

Communication dated Feb. 11, 2020, issued by the Korean Intellectual Property Office in counterpart Korean Application No. 10-2019-0160959.

Communication dated Feb. 6, 2020, issued by the Malaysian Intellectual Property Corporation in counterpart Malaysian Application No. PI2016000387.

Communication dated Feb. 6, 2020, issued by the Malaysian Intellectual Property Corporation in counterpart Malaysian Application No. PI2019002543.

* cited by examiner

FIG. 7
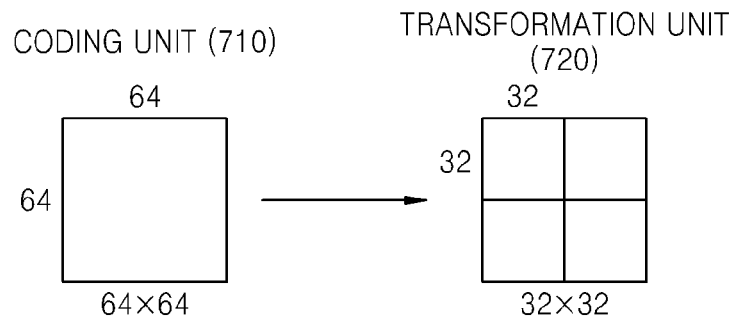
FIG. 8
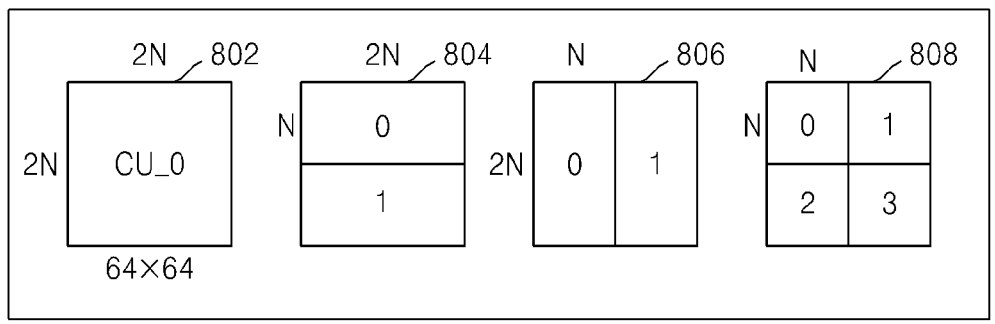
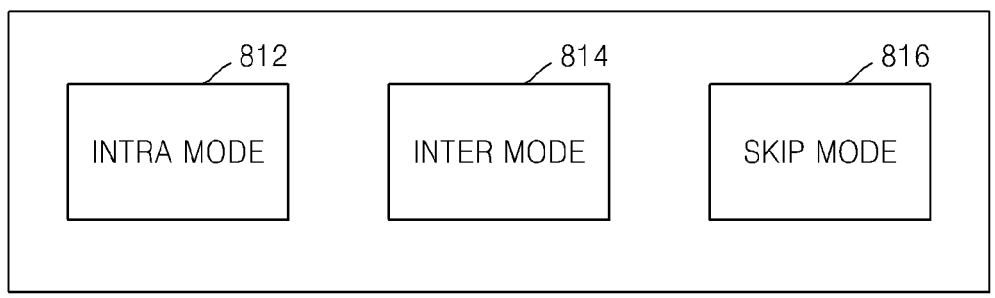
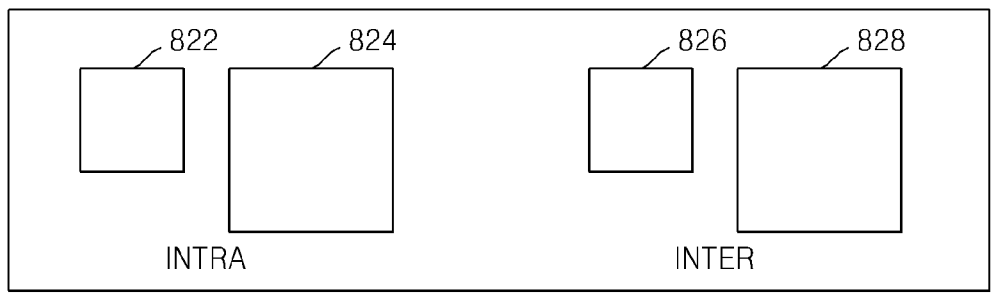

CODING UNIT (1010)

PREDICTION UNIT (1060)

4:4:4 FORMAT

| SIZE OF CODING UNIT | NUMBER OF PREDICTION MODES | | |
| --- | --- | --- | --- |
| | Example 1 | Example 2 | Example 3 |
| 2 | – | 5 | 5 |
| 4 | 9 | 9 | 9 |
| 8 | 9 | 9 | 9 |
| 16 | 33 | 17 | 11 |
| 32 | 33 | 33 | 33 |
| 64 | 5 | 5 | 9 |
| 128 | 5 | 5 | 5 |

| PREDICTION MODE | NAME |
|---|---|
| 0 | VERTICAL |
| 1 | HORIZONTAL |
| 2 | DC |
| 3 | DOWN_LEFT |
| 4 | DOWN_RIGHT |
| 5 | VERTICAL_RIGHT |
| 6 | HORIZONTAL_DOWN |
| 7 | VERTICAL_LEFT |
| 8 | HORIZONTAL_UP |

PREDICTION MODE DIRECTION

■ : NEIGHBORING PIXEL

METHOD AND DEVICE FOR ENCODING INTRA PREDICTION MODE FOR IMAGE PREDICTION UNIT, AND METHOD AND DEVICE FOR DECODING INTRA PREDICTION MODE FOR IMAGE PREDICTION UNIT

CROSS-REFERENCE TO RELATED PATENT APPLICATION

This application is a Continuation of U.S. application Ser. No. 13/997,524 filed Jun. 24, 2013, which is a National Stage of International Application No. PCT/KR2011/010066 filed Dec. 23, 2011, and claims priority from U.S. Provisional Application No. 61/426,684 filed on Dec. 23, 2010, the disclosures of which are incorporated herein in their entirety by reference.

BACKGROUND

1. Field

Methods and apparatuses consistent with the exemplary embodiments relate to encoding and decoding of an image, and more particularly, to encoding an intra prediction mode of an image prediction unit which efficiently encodes an intra prediction mode of a chrominance component based on a correlation between an intra prediction mode determined for an image prediction unit of a luminance component and the intra prediction mode of the chrominance component, and decoding an intra prediction mode of an image prediction unit.

2. Related Art

In an image compression method, such as Moving Picture Experts Group (MPEG)-1, MPEG-2, MPEG-4, or H.264/MPEG-4 Advanced Video Coding (AVC), a picture is divided into macroblocks in order to encode an image. Each of the macroblocks is encoded in all encoding modes that can be used in inter prediction or intra prediction, and then is encoded in an encoding mode that is selected according to a bit rate used to encode the macroblock and a distortion degree of a decoded macroblock based on the original macroblock.

As hardware for reproducing and storing high resolution or high quality video content is being developed and supplied, there is an increasing need for a video codec which effectively encodes or decodes the high resolution or high quality video content. In a related art video codec, a video is encoded using a limited prediction mode based on macroblocks each having a predetermined size.

SUMMARY

The exemplary embodiments provide methods and apparatuses for efficiently encoding and decoding an intra prediction mode of a chrominance image component prediction unit corresponding to a luminance image component prediction unit based on an intra prediction mode determined for the luminance image component prediction unit.

According to an aspect of the exemplary embodiments, an intra prediction mode of a prediction unit of a chrominance component is efficiently encoded and decoded by reconstructing an intra prediction mode candidate group applied to the prediction unit of the chrominance component according to whether an intra prediction mode of a luminance component is the same as the intra prediction mode of the chrominance component.

According to the exemplary embodiments, redundancy between an intra prediction mode of a prediction unit of a luminance image component and an intra prediction mode of a prediction unit of a chrominance image component may be removed, and the intra prediction mode of the prediction unit of the chrominance image component may be efficiently expressed based on the intra prediction mode of the prediction unit of the luminance image component. Also, the number of bits used to signal the intra prediction mode of the prediction unit of the chrominance image component may be reduced.

According to an aspect of the exemplary embodiments, there is provided a method of encoding an intra prediction mode of an image, the method comprising: determining an intra prediction mode of a prediction unit of a first image component constituting the image by using a first intra prediction mode candidate group comprising a plurality of intra prediction modes; determining an intra prediction mode of a prediction unit of a second image component corresponding to the prediction unit of the first image component by using a second intra prediction mode candidate group comprising a plurality of intra prediction modes; when the determined intra prediction mode of the prediction unit of the first image component is the same as one of predetermined intra prediction modes included in the second intra prediction mode candidate group, reconstructing the second intra prediction mode candidate group to remove redundancy of an intra prediction mode which is included in the second intra prediction mode candidate group and is same as the determined intra prediction mode of the prediction unit of the first image component; and encoding the determined intra prediction mode of the prediction unit of the second image component based on the reconstructed second intra prediction mode candidate group.

According to another aspect of the exemplary embodiments, there is provided an apparatus for encoding an intra prediction mode of an image, the apparatus including: a first intra prediction mode determiner that determines an intra prediction mode of a prediction unit of a first image component constituting the image by using a first intra prediction mode candidate group including a plurality of intra prediction modes; a second intra prediction mode determiner that determines an intra prediction mode of a prediction unit of a second image component corresponding to the prediction unit of the first image component by using a second intra prediction mode candidate group including a plurality of intra prediction modes; and an intra prediction mode encoder that when the determined intra prediction mode of the prediction unit of the first image component is the same as one of predetermined intra prediction modes included in the second intra prediction mode candidate group, reconstructs the second intra prediction mode candidate group to remove redundancy of an intra prediction mode included in the second intra prediction mode candidate group which is same as the determined intra prediction mode of the prediction unit of the first image component, and encodes the determined intra prediction mode of the prediction unit of the second image component based on the reconstructed intra prediction mode candidate group.

According to another aspect of the exemplary embodiments, there is provided a method of decoding an intra prediction mode of an image, the method comprising: obtaining intra prediction mode information of a prediction unit of a first image component constituting the image from a bitstream; when an intra prediction mode of the prediction unit of the first image component is the same as one of predetermined intra prediction modes included in a second intra prediction mode candidate group applicable to a prediction unit of a second image component, reconstructing the second intra prediction mode candidate group to remove redundancy of an intra prediction mode included in the second intra prediction mode candidate group which is same as the determined intra prediction mode of the prediction unit of the first image component; and decoding an intra prediction mode of the prediction unit of the second image component based on the reconstructed second intra prediction mode candidate group.

According to another aspect of the exemplary embodiments, there is provided an apparatus for decoding an intra prediction mode of an image, the apparatus comprising: an intra prediction mode obtainer that obtains intra prediction mode information of a prediction unit of a first image component constituting the image from a bitstream, when it is determined that an intra prediction mode of the prediction unit of the first image component is the same as one of predetermined intra prediction modes included in a second intra prediction mode candidate group applicable to a prediction unit of a second image component, reconstructs the second intra prediction mode candidate group to remove redundancy of an intra prediction mode which is included in the second intra prediction mode candidate group and is same as the determined intra prediction mode of the prediction unit of the first image component, and determines an intra prediction mode of the prediction unit of the second image component based on the reconstructed second intra prediction mode candidate group; a first intra prediction performer that performs intra prediction on the prediction unit of the first image component based on the intra prediction mode of the prediction unit of the first image component which is obtained from the bitstream; and a second intra prediction performer that performs intra prediction on the prediction unit of the second image component based on the determined intra prediction mode of the prediction unit of the second image component.

BRIEF DESCRIPTION OF THE DRAWINGS

FIG. 7 is a diagram for describing a relationship between a coding unit and a transformation unit, according to an exemplary embodiment.

FIG. 8 is a diagram for describing information of coding units according to depths, according to an exemplary embodiment.

DETAILED DESCRIPTION OF EXEMPLARY EMBODIMENTS

The exemplary embodiments will now be described more fully with reference to the accompanying drawings, in which exemplary embodiments are shown.

Figure 1:
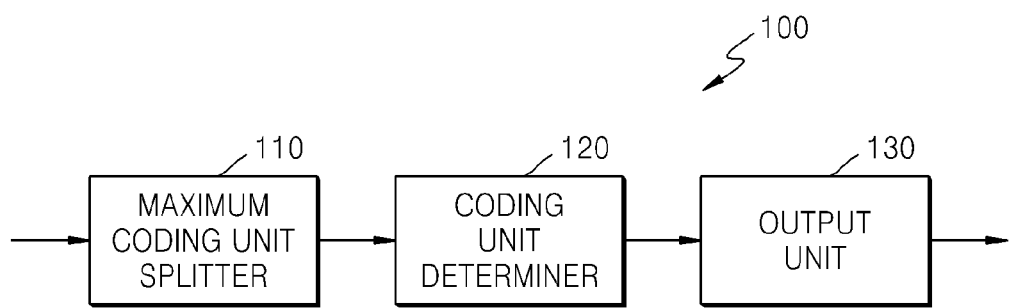
FIG. 1 is a block diagram illustrating an apparatus for encoding a video, according to an exemplary embodiment.

FIG. 1 is a block diagram illustrating an apparatus 100 for encoding a video, according to an exemplary embodiment.

The apparatus 100 includes a maximum coding unit splitter 110, a coding unit determiner 120, and an output 130.

The maximum coding unit splitter 110 may split a current picture based on a maximum coding unit which is a coding unit having a maximum size for the current picture of an image. If the current picture is larger than the maximum coding unit, image data of the current picture may be split into at least one maximum coding unit. The maximum coding unit may be a data unit having a size of 32×32, 64×64, 128×128, or 256×256, and a shape of the data unit may be a square having a width and length in squares of 2 greater than 8. The image data may be output to the coding unit determiner 120 according to the at least one maximum coding unit.

A coding unit may be characterized by a maximum size and a depth. The depth denotes the number of times the coding unit is spatially split from the maximum coding unit, and as the depth deepens, deeper coding units according to depths may be split from the maximum coding unit to a minimum coding unit. A depth of the maximum coding unit is an uppermost depth and a depth of the minimum coding unit is a lowermost depth. Since a size of a coding unit corresponding to each depth decreases as the depth of the maximum coding unit deepens, a coding unit corresponding to an upper depth may include a plurality of coding units corresponding to lower depths.

As described above, the image data of the current picture is split into the maximum coding units according to a maximum size of the coding unit, and each of the maximum coding units may include deeper coding units that are split according to depths. Since the maximum coding unit is split according to depths, the image data of a spatial domain included in the maximum coding unit may be hierarchically classified according to depths.

A maximum depth and a maximum size of a coding unit, which limit the total number of times a height and a width of the maximum coding unit are hierarchically split, may be preset.

The coding unit determiner 120 encodes at least one split region obtained by splitting a region of the maximum coding unit according to depths and determines a depth in which final encoding results are to be output according to the at least one split region. That is, the coding unit determiner 120 encodes the image data according to deeper coding units according to depths for each maximum coding unit of the current picture, and selects a depth having a least encoding error as a coded depth. The determined coded depth and the image data according to maximum coding units are output to the output 130.

The image data in the maximum coding unit is encoded based on the deeper coding units corresponding to at least one depth equal to or below the maximum depth, and results of encoding the image data are compared based on each of the deeper coding units. A depth having the least encoding error may be selected after comparing encoding errors of the deeper coding units. At least one coded depth may be selected for each maximum coding unit.

The size of the maximum coding unit that is split as a coding unit is hierarchically split according to depths, and as the number of coding units increases. Also, even if coding units correspond to the same depth in one maximum coding unit, it is determined whether to split each of the coding units corresponding to the same depth to a lower depth by measuring an encoding error of the image data of each coding unit, separately. Accordingly, even when image data is included in one maximum coding unit, since the encoding errors may differ according to regions in the one maximum coding unit, the coded depths may differ according to regions in the image data. Thus, one or more coded depths may be determined in one maximum coding unit, and the image data of the maximum coding unit may be split according to coding units of at least one coded depth.

Accordingly, the coding unit determiner 120 may determine coding units having a tree structure included in a current maximum coding unit. The 'coding units having the tree structure' include coding units having a depth determined as a coded depth from among all deeper coding units included in the current maximum coding unit. The coding units of the coded depth may be hierarchically determined according to depths in the same region in the maximum coding unit, and may be independently determined in other regions. Likewise, a coded depth of a current region may be independently determined from coded depths of other regions.

A maximum depth is an index related to the number of splits from a maximum coding unit to a minimum coding unit. A first maximum depth may indicate the total number of splits from a maximum coding unit to a minimum coding unit. A second maximum depth may indicate the total number of depth levels from the maximum coding unit to the minimum coding unit. For example, when a depth of a maximum coding unit is 0, a depth of a coding unit obtained by splitting the maximum coding unit one time may be set to 1, and a depth of a coding unit obtained by splitting the maximum coding unit two times may be set to 2. In this case, when a coding unit obtained by splitting the maximum coding unit four times is a minimum coding unit, since depth levels of depths 0, 1, 2, 3, and 4 exist, a first maximum depth may be set to 4 and a second maximum depth may be set to 5.

Prediction encoding and frequency transformation may be performed on the maximum coding unit. The prediction encoding and the frequency transformation are performed based on deeper coding units according to depths equal to or less a maximum depth for each maximum coding unit.

Since the number of deeper coding units according to depths increase as the maximum coding unit is split according to depths, encoding including prediction encoding and frequency transformation has to be performed on all of the deeper coding units generated as the depths deepen. Prediction encoding and frequency transformation will be explained based on a coding unit of a current depth from among one or more maximum coding units for convenience of explanation.

The apparatus 100 may variously select a size or a shape of a data unit for encoding image data. In order to encode the image data, operations such as prediction encoding, frequency transformation, and entropy encoding are performed. The same data unit may be used for all operations, or different data units may be used for different operations.

For example, the apparatus 100 may select not only a coding unit for encoding the image data, but also a data unit, which is different from the coding unit, in order to perform prediction encoding on the image data in the coding unit.

In order to perform prediction encoding in a maximum coding unit, the prediction encoding may be performed based on a coding unit of a coded depth, that is, a coding unit which is no longer split. The coding unit which is no longer split and becomes a basis unit for prediction encoding is referred to as a 'prediction unit'. A partition obtained by splitting the prediction unit may include a prediction unit and a data unit obtained by splitting at least one of a height and a depth of the prediction unit.

For example, when a coding unit having a size of 2N×2N (N is a positive integer) is no longer split, a prediction unit may have a size of 2N×2N and a partition may have a size of 2N×2N, N×N, N×2N, or N×N. Examples of a partition type may include symmetric partitions obtained by symmetrically splitting a height or a width of the prediction unit, partitions obtained by asymmetrically splitting the height or the width of the prediction unit such as 1:n or n:1, partitions obtained by geometrically splitting the prediction unit, and partitions having arbitrary shapes.

A prediction mode of the prediction unit may be at least one of an intra mode, an inter mode, and a skip mode. For example, the intra mode and the inter mode may be performed on the partition having a size of 2N×2N, 2N×N, N×2N, or N×N. Also, the skip mode may be performed only on the partition having a size of 2N×2N. The encoding may be independently performed on one prediction unit in a coding unit and a prediction mode having a least encoding error may be selected.

Also, the apparatus 100 may also perform frequency transformation on the image data in a coding unit based on not only the coding unit for encoding the image data but also a data unit different from the coding unit.

In order to perform frequency transformation in the coding unit, the frequency transformation may be performed based on a data unit having a size equal to or less than that of the coding unit. For example, the data unit for the frequency transformation may include a data unit for an inter mode and a data unit for an intra mode.

A data unit which becomes a base of frequency transformation may be referred to as a 'transformation unit'. Similar to a coding unit, a transformation unit in a coding unit may be recursively split into a transformation unit having a smaller size, and residual data of the coding unit may be split according to transformation units having a tree structure according to a transformation depth.

A transformation depth indicating the number of splits to reach the transformation unit by splitting a height and a width of the coding unit may also be set in the transformation unit. For example, a size of a transformation unit of a current coding unit having a size of 2N×2N is 2N×2N, a transformation depth may be set to 0, when a size of a transformation unit is N×N, a transformation depth may be set to 1, and when a size of a transformation unit is N/2×N/2, a transformation depth may be set to 2. That is, transformation units having a tree structure may be set according to transformation depths.

Information about deeper coding units according to depths uses information about a coded depth, information related to prediction, and information related to frequency transformation. Accordingly, the coding unit determiner 120 may determine not only a coded depth that generates a least encoding error, but also a partition type by which a prediction unit is split into partitions, a prediction mode according to each prediction unit, and a size of a transformation unit for frequency transformation.

A method of determining a partition and coding units having a tree structure of a maximum coding unit will be explained in detail with reference to FIGS. 3 through 12.

The coding unit determiner 120 may measure an encoding error of deeper coding units according to depths by using a Rate-Distortion Optimization based on Lagrangian multipliers.

The image data output unit 130 outputs the image data of the maximum coding unit, which is encoded based on the at least one coded depth determined by the coding unit determiner 120 and information about the encoding mode according to the coded depth, in bitstreams.

The encoded image data may be results obtained by encoding residual data of the image.

The information about the coding mode according to the coded depth may include information about the coded depth, information about the partition type in the prediction unit, information about the prediction mode, and information about a size of the transformation unit.

The information about the coded depth may be defined by using split information according to each depth indicating whether encoding is performed on coding units of a lower depth instead of a current depth. When the current depth of the current coding unit is the coded depth, since image data in the current coding unit is encoded, the split information may be defined not to split the current coding unit to a lower depth. Alternatively, when the current depth of the current coding unit is not the coded depth, since encoding is performed on a coding unit of a lower depth, the split information may be defined to split the current coding unit to obtain coding units of a lower depth.

When the current depth is not the coded depth, encoding is performed on a coding unit which is split into coding units of a lower depth. Since one or more coding units of a lower depth exist in one coding unit of the current depth, encoding may be repeatedly performed on each coding unit of the lower depth, and thus the encoding may be recursively performed for coding units of the same depth.

Since coding units having a tree structure has to be determined in one maximum coding unit and information about at least one encoding mode has to be determined for each coding unit of a coded depth, information about at least one encoding mode may be determined for one maximum coding unit. Also, since image data of the maximum coding unit may be hierarchically split according to depths and thus coded depths may differ according to regions, information about an encoding mode and a coded depth may be set for the image data.

Accordingly, the output unit 130 may assign encoding information about a corresponding coded depth and an encoding mode to at least one of the coding unit, the prediction unit, and a minimum unit included in the maximum coding unit.

The minimum unit may be a square data unit having a size obtained by splitting a minimum coding unit constituting a lowermost depth by 4, and may be a square data unit having a maximum size which may be included in all of coding units, prediction units, and transformation units included in the maximum coding unit.

For example, the encoding information output through the output 130 may be classified into encoding information according to deeper coding units according to depths and encoding information according to prediction units. The encoding information according to the deeper coding units according to depths may include information about a prediction mode and information about sizes of partitions. The encoding information about the prediction units may include information about an estimated direction of an inter mode, information about a reference image index of the inter mode, information about a motion vector, information about a chrominance component of an intra mode, and information about an interpolation method of the intra mode. Also, information about a maximum size of a coding unit which is defined according to pictures, slices, or Group of Pictures (GOPs) and information about a maximum depth may be inserted into a header of a bitstream.

According to the apparatus 100 having a simple structure, a deeper coding unit is a coding unit obtained by dividing a height or a width of a coding unit of an upper depth, which is one layer above, by two. That is, when a size of a coding unit of a current depth is 2N×2N, a size of a coding unit of a lower depth is N×N. Also, when the coding unit of the current depth has a size of 2N×2N, a size of the coding unit of the lower depth is N×N. Also, the coding unit of the current depth having the size of 2N×2N may include a maximum 4 of the coding unit of the lower depth.

Accordingly, the apparatus 100 may form coding units having a tree structure by determining a coding unit having an optimum shape and an optimum size for each maximum coding unit, based on a size of the maximum coding unit and a maximum depth determined in consideration of characteristics of a current picture. Also, since encoding may be performed on each maximum coding unit by using any of various prediction modes and frequency transformation modes, an optimum encoding mode may be determined in consideration of characteristics of coding units having various image sizes.

Thus, if an image having high resolution or a large data amount is encoded in a conventional macroblock, the number of macroblocks per picture excessively increases. Accordingly, the number of pieces of compressed information generated for each macroblock increases, and thus it is difficult to transmit the compressed information and data compression efficiency decreases. However, by using the apparatus 100, image compression efficiency may be increased since a coding unit is adjusted while considering characteristics of an image while increasing a maximum size of a coding unit while considering a size of the image.

Figure 2:
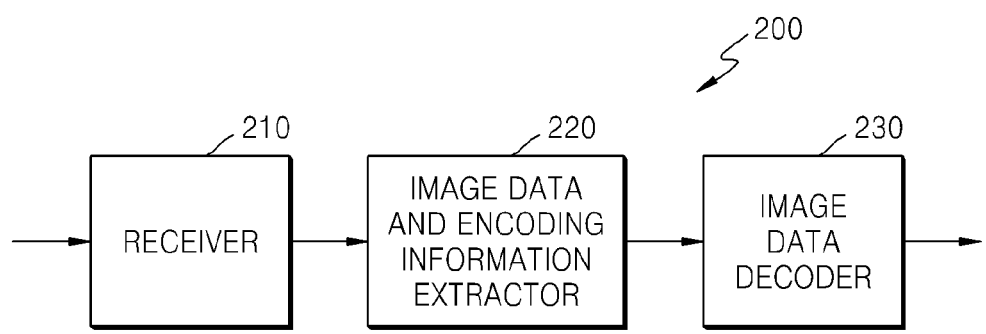
FIG. 2 is a block diagram illustrating an apparatus for decoding a video, according to an exemplary embodiment.

FIG. 2 is a block diagram of an apparatus 200 for decoding a video, according to an exemplary embodiment.

Referring to FIG. 2, the apparatus 200 includes a receiver 210, an image data and encoding information extractor 220, and an image data decoder 230. Definitions of terms such as a coding unit, a depth, a prediction unit, a transformation, unit, and information about various encoding modes for various processes of the apparatus 200 are the same as those described with reference to FIG. 1 and the apparatus 100.

The receiver 210 receives and parses a bitstream for an encoded video. The image data and encoding information extractor 220 extracts encoded image data for each coding unit according to coding units having a tree structure according to maximum coding units from the parsed bitstream, and outputs the extracted encoded image data to the image data decoder 230. The image data and encoding information extractor 220 may extract information of a maximum size of a coding unit of a current picture from a header of the current picture.

Also, the image data and encoding information extractor 220 extracts information about a coded depth and an encoding mode for the coding units having the tree structure according to the maximum coding units from the parsed bitstream. The extracted information about the coded depth and the encoding mode is output to the image data decoder 230. That is, the image data decoder 230 may decode image data for each maximum coding unit by splitting the image data of a bit string according to maximum coding units.

The information about the coded depth and the encoding mode according to the maximum coding units may be set for one or more pieces of coded depth information, and information about encoding modes according to coded depths may include information about a partition type of a corresponding coding unit, information about a prediction mode, and information about a size of a transformation unit. Also, split information according to depths may be extracted as the information about the coded depth.

The information about the coded depth and the encoding mode according to the maximum coding units extracted by the image data and encoding information extractor 220 is information about a coded depth and an encoding mode determined to have a least encoding error by repeatedly performing encoding on deeper coding units according to maximum coding units at an encoding side such as the apparatus 100. Accordingly, the apparatus 200 may restore an image by decoding data according to an encoding method that generates a least encoding error.

Since encoding information about a coded depth and an encoding mode may be assigned to a predetermined data unit from among a corresponding coding unit, a prediction unit, and a minimum unit, the image data and encoding information extractor 220 may extract information about a coded depth and an encoding mode according to predetermined data units. When information about a coded depth and an encoding mode of a corresponding maximum coding unit is recorded according to the predetermined data units, the predetermined data units having the same information about the coded depth and the encoding mode may be derived as a data unit included in the same maximum coding unit.

The image data decoder 230 restores a current picture by decoding image data in each maximum coding unit based on the information about the coded depth and the encoding mode according to the maximum coding units. That is, the image data decoder 230 may decode encoded image data based on read information about a partition type, a prediction mode, and a transformation unit, for each coding unit from among coding units having a tree structure included in each maximum coding unit. The decoding may include a prediction process including intra prediction and motion compensation, and a frequency inverse transformation process.

The image data decoder 230 may perform intra prediction or motion compensation according to each partition and prediction mode for each coding unit based on information about a partition type and a prediction mode of a prediction unit of coding units according to coded depths.

Also, the image data decoder 230 may perform frequency inverse transformation according to each transformation unit in the coding unit, based on size information of a transformation unit of coding units according to coded depths, for frequency inverse transformation according to maximum coding units.

The image data decoder 230 may determine a coded depth of a current maximum coding unit by using split information according to each depth. If split information indicates that image data is no longer split in a current depth, the current depth is a coded depth. Accordingly, the image data decoder 230 may decode a coding unit of the current depth for image data of the current maximum coding unit by using information about a partition type of a prediction unit, a prediction mode, and a size of a transformation unit.

That is, data units containing encoding information including the same split information may be gathered by observing the encoding information set assigned for a predetermined data unit from among a coding unit, a prediction unit, and a minimum unit, and the gathered data units may be considered to be one data unit to be decoded by the image data decoder 230 in the same encoding mode.

The apparatus 200 may obtain information about a coding unit that generates a least encoding error by recursively performing encoding for each maximum coding unit and may use the information to decode a current picture. That is, encoded image data of coding units having a tree structure determined for each maximum coding unit may be decoded.

Accordingly, even an image has high resolution or a large amount of data, image data may be efficiently decoded and restored according to a size of a coding unit and an encoding mode which are adaptively determined for characteristics of an image by using information about an optimum encoding mode transmitted from an encoding side.

A method of determining coding units having a tree structure, a prediction unit, and a transformation unit will be explained in detail with reference to FIGS. 3 through 13.

Figure 3:
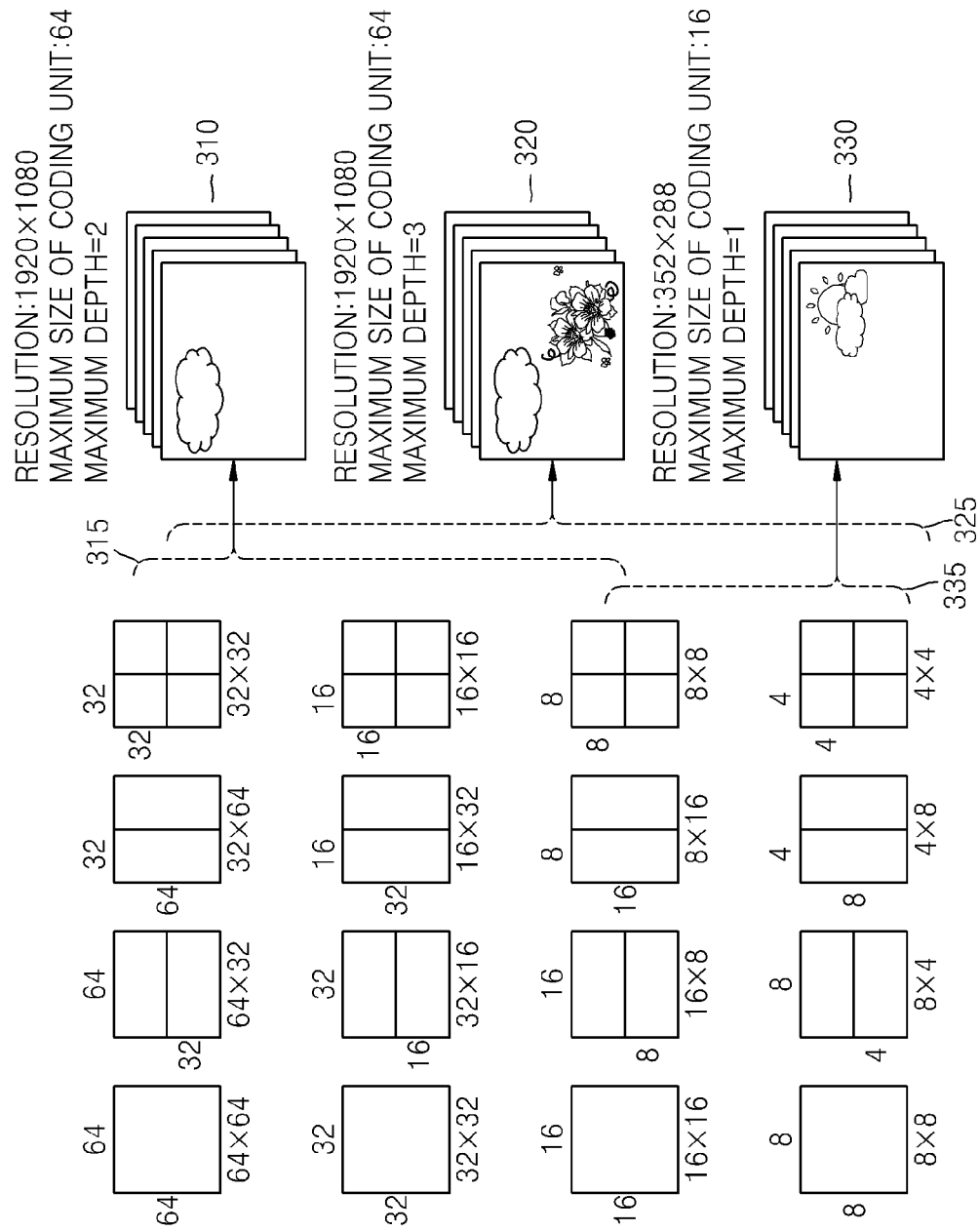
FIG. 3 is a diagram for describing a concept of coding units, according to an exemplary embodiment.

FIG. 3 is a diagram for describing a concept of hierarchical coding units, according to an exemplary embodiment.

A size of a coding unit may be expressed in width×height, and examples of the size may include 64×64, 32×32, 16×16, and 8×8. A coding unit having a size of 64×64 may be split into partitions having sizes of 64×64, 64×32, 32×64, and 32×32, a coding unit having a size of 32×32 may be split into partitions having sizes of 32×32, 32×16, 16×32, and 16×16, a coding unit having a size of 16×16 may be split into partitions having sizes of 16×16, 16×8, 8×16, and 8×8, and a coding unit having a size of 8×8 may be split into partitions having sizes of 8×8, 8×4, 4×8, and 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 4. In video data 330, a resolution is 352×288, a maximum size of a coding unit is 16, and a maximum depth is 2. A maximum depth in FIG. 3 indicates the total number of splits from a maximum coding unit to a minimum coding unit.

If a resolution is high or a data amount is large, a maximum size of a coding unit may be large so as to not only increase encoding efficiency but also to accurately reflect characteristics of an image. Accordingly, the maximum size of the coding unit of the video data 310 and 320 having a higher resolution than the video data 330 may be 64.

Since the maximum depth of the video data 310 is 2, coding units 315 of the video data 310 may include a maximum coding unit having a long axis size of 64, and coding units having long axis sizes of 32 and 16 since depths are deepened by two layers by splitting the maximum coding unit twice. Meanwhile, since the maximum depth of the video data 330 is 1, coding units 335 of the video data 330 may include a maximum coding unit having a long axis size of 16, and coding units having a long axis size of 8 since depths are deepened by one layer by splitting the maximum coding unit once.

Since the maximum depth of the video data 320 is 3, coding units 325 of the video data 320 may include a maximum coding unit having a long axis size of 64, and coding units having long axis sizes of 32, 16, and 8 since the depths are deepened by 3 layers by splitting the maximum coding unit three times. As a depth deepens, detailed information may be precisely expressed.

Figure 4:
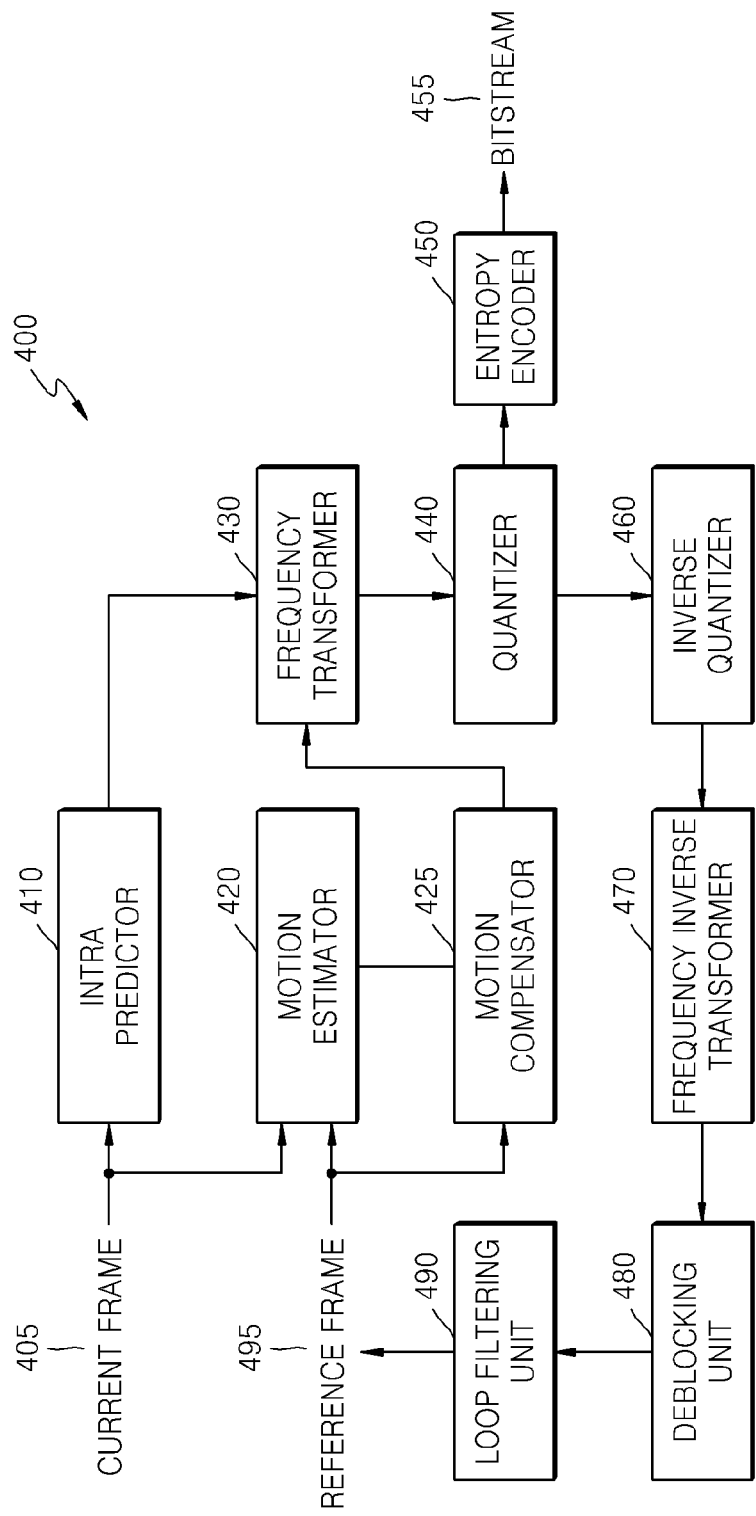
FIG. 4 is a block diagram illustrating an image encoder based on a coding unit, according to an exemplary embodiment.

FIG. 4 is a block diagram of an image encoder 400 based on a coding unit, according to an exemplary embodiment.

The image encoder 400 performs operations of the coding unit determiner 120 of the apparatus 100 to encode image data. That is, an intra predictor 410 performs intra prediction on coding units in an intra mode, from among a current frame 405, and a motion estimator 420 and a motion compensator 425 perform inter estimation and motion compensation by using a reference frame 495 and the current frame 405 of an inter mode.

Data output from the intra predictor 410, the motion estimator 420, and the motion compensator 425 is output as a quantized transformation coefficient through a frequency transformer 430 and a quantizer 440. The quantized transformation coefficient is restored as data in a spatial domain through an inverse quantizer 460 and a frequency inverse transformer 470, and the restored data in the spatial domain is output as the reference frame 495 after being post-processed through a deblocker 480 and a loop filter 490. The quantized transformation coefficient may be output as a bitstream 455 through an entropy encoder 450.

In order for the image encoder 400 to be applied to the apparatus 100, all elements of the image encoder 400, i.e., the intra predictor 410, the motion estimator 420, the motion compensator 425, the frequency transformer 430, the quantizer 440, the entropy encoder 450, the inverse quantizer 460, the inverse transformer 470, the deblocker 480, and the loop filter 490 have to perform operations based on each coding unit from among coding units having a tree structure in consideration of a maximum depth for each maximum coding unit.

Specifically, the intra predictor 410, the motion estimator 420, and the motion compensator 425 determine a prediction unit and partitions of each coding unit from among a coding units having a tree structure in consideration of a maximum depth and a maximum size of a current maximum coding unit, and the frequency transformer 430 has to determine a size of a transformation unit in each coding unit from among the coding units having the tree structure.

Figure 5:
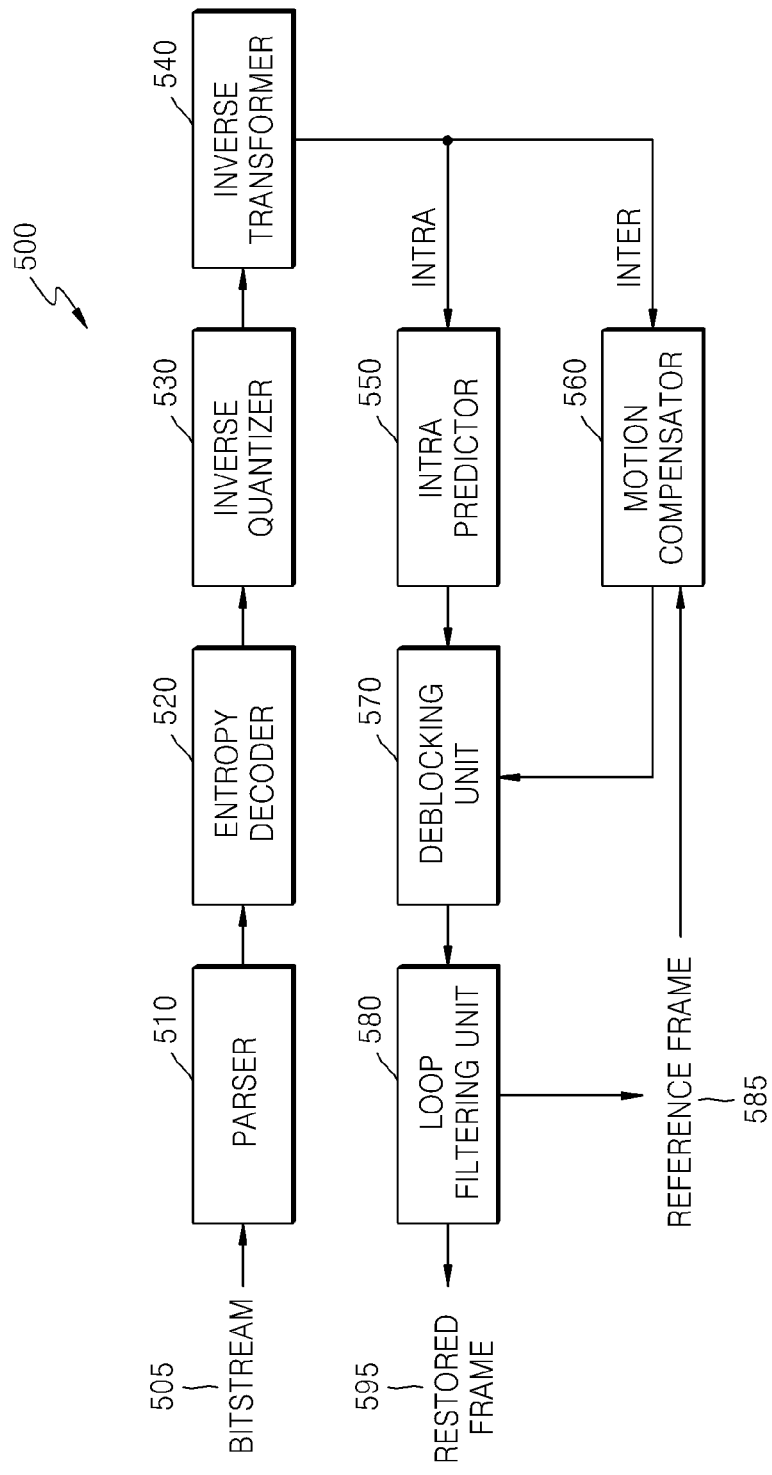
FIG. 5 is a block diagram illustrating an image decoder based on a coding unit, according to an exemplary embodiment.

FIG. 5 is a block diagram of an image decoder 500 based on a coding unit, according to an exemplary embodiment.

Referring to FIG. 5, a parser 510 parses encoded image data to be decoded and information about encoding used for decoding from a bitstream 505. The encoded image data is output as inverse quantized data through an entropy decoder 520 and an inverse quantizer 530, and the inverse quantized data is restored to image data in a spatial domain through an inverse transformer 540.

An intra predictor 550 performs intra prediction on coding units in an intra mode with respect to the image data in the spatial domain, and a motion compensator 560 performs motion compensation on coding units in an inter mode by using a reference frame 585.

The image data in the spatial domain, which passed through the intra predictor 550 and the motion compensator 560, may be output as a restored frame 595 after being post-processed through a deblocker 570 and a loop filter 580. Also, the image data that is post-processed through the deblocker 570 and the loop filter 580 may be output as the reference frame 585.

In order to decode the image data in the image data decoder 230 of the apparatus 200, the image decoder 500 may perform operations that are performed after the parser 510.

In order for the image decoder 500 to be applied to the apparatus 200, all elements of the image decoder 500, i.e., the parser 510, the entropy decoder 520, the inverse quantizer 530, the inverse transformer 540, the intra predictor 550, the motion compensator 560, the deblocker 570, and the loop filter 580 have to perform operations based on coding units having a tree structure for each maximum coding unit.

Specifically, the intra prediction 550 and the motion compensator 560 have to determine partitions and a prediction mode for each of the coding units having the tree structure, and the inverse transformer 540 has to determine a size of a transformation unit for each coding unit.

Figure 6:
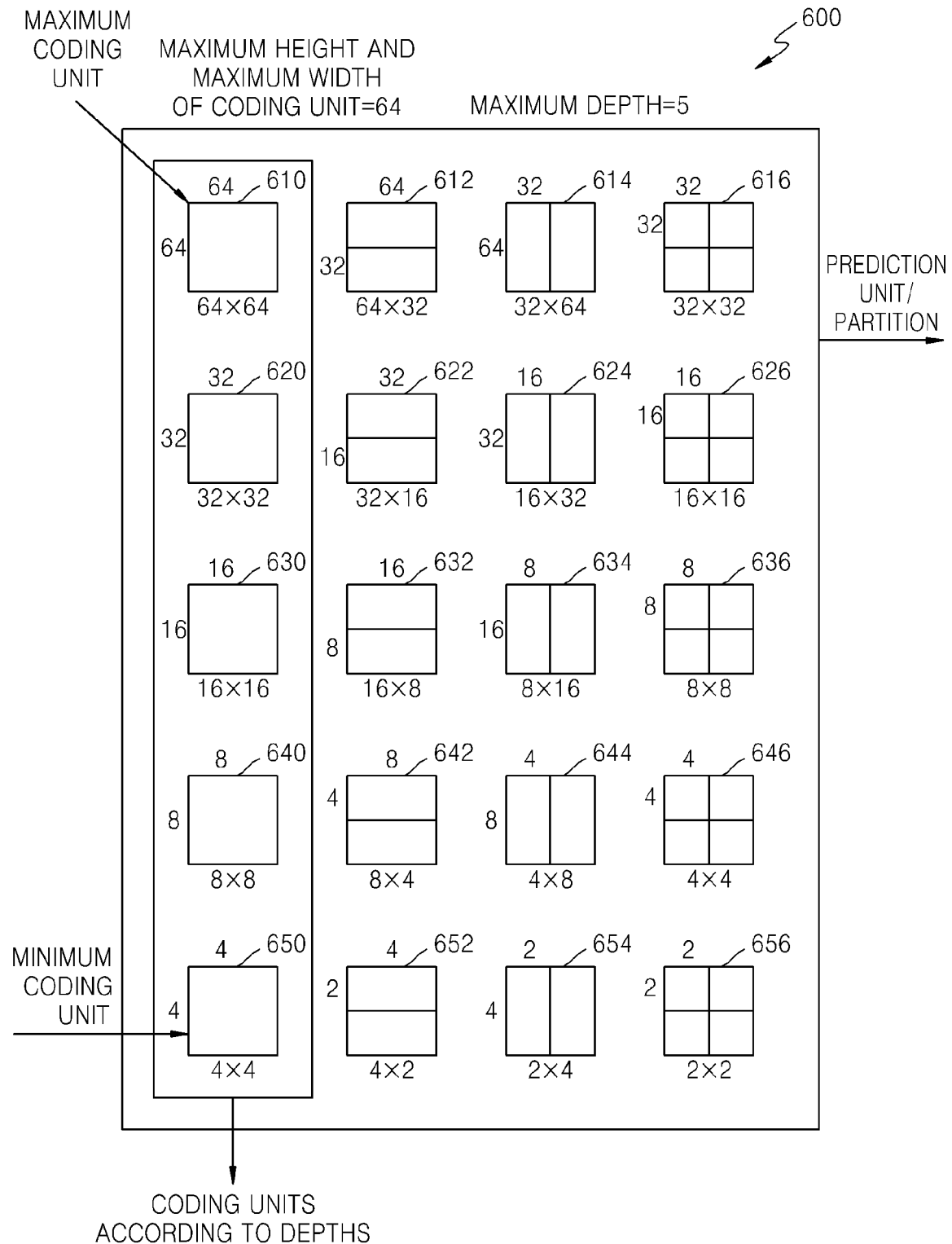
FIG. 6 is a diagram illustrating deeper coding units according to depths and partitions, according to an exemplary embodiment.

FIG. 6 is a diagram illustrating partitions and deeper coding units according to depths, according to an exemplary embodiment.

The apparatus 100 and the apparatus 200 use hierarchical coding units so as to consider characteristics of an image. A maximum height, a maximum width, and a maximum depth of coding units may be adaptively determined according to the characteristics of the image, or may be differently set by a user. Sizes of deeper coding units according to depths may be determined according to a preset maximum size of a coding unit.

In a hierarchical structure 600 of coding units, the maximum height and the maximum width of the coding units are each 64, and the maximum depth is 4. Since a depth deepens along a vertical axis of the hierarchical structure 600, a height and a width of the deeper coding unit are each split. Also, a prediction unit and a partition, which are a base for prediction encoding of each deeper coding unit, are shown along a horizontal axis of the hierarchical structure 600.

In other words, a coding unit 610 is a maximum coding unit in the hierarchical structure 600, wherein a depth is 0 and a size, i.e., a height by width, is 64×64. The depth deepens along the vertical axis, and a coding unit 620 having a size of 32×32 and a depth of 1, a coding unit 630 having a size of 16×16 and a depth of 2, a coding unit 640 having a size of 8×8 and a depth of 3, and a coding unit 650 having a size of 4×4 and a depth of 4 exist. The coding unit 650 having the size of 4×4 and the depth of 4 is a minimum coding unit.

Partial data units are shown in FIG. 6 as the prediction units of a coding unit along the horizontal axis according to each depth. In other words, if the coding unit 610 having the size of 64×64 and the depth of 0 is a prediction unit, the prediction unit may be split into partial data units included in the encoding unit 610, i.e. a partial data unit 610 having a size of 64×64, partial data units 612 having the size of 64×32, partial data units 614 having the size of 32×64, or partial data units 616 having the size of 32×32.

A prediction unit of the coding unit 620 having the size of 32×32 and the depth of 1 may be split into partial data units included in the coding unit 620, i.e. a partial data unit 620 having a size of 32×32, partial data units 622 having a size of 32×16, partial data units 624 having a size of 16×32, and partial data units 626 having a size of 16×16.

A prediction unit of the coding unit 630 having the size of 16×16 and the depth of 2 may be split into partial data units included in the coding unit 630, i.e. a partial data unit having a size of 16×16 included in the coding unit 630, partial data units 632 having a size of 16×8, partial data units 634 having a size of 8×16, and partial data units 636 having a size of 8×8.

A prediction unit of the coding unit 640 having the size of 8×8 and the depth of 3 may be split into partial data units included in the coding unit 640, i.e. a partial data unit having a size of 8×8 included in the coding unit 640, partial data units 642 having a size of 8×4, partial data units 644 having a size of 4×8, and partial data units 646 having a size of 4×4.

The coding unit 650 having the size of 4×4 and the depth of 4 is the minimum coding unit and a coding unit of the lowermost depth. A prediction unit of the coding unit 650 is only assigned to a partial data unit having a size of 4×4.

In order to determine a coded depth of the maximum coding unit 610, the coding unit determiner 120 of the apparatus 100 has to perform encoding for coding units corresponding to each depth included in the maximum coding unit 610.

The number of deeper coding units according to depths including data in the same range and the same size increases as the depth deepens. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding according to depths, for a current depth from among the depths, a representative encoding error which is a least encoding error may be selected for a current depth by performing encoding for prediction units in the coding units corresponding to the current depth, along the horizontal axis of the hierarchical structure 600. Alternatively, a minimum encoding error may be searched for by comparing the least encoding errors according to depths, by performing encoding for each depth as the depth deepens along the vertical axis of the hierarchical structure 600. A depth and a partition having the minimum encoding error in the coding unit 610 may be selected as a coded depth and a partition type of the coding unit 610.

FIG. 7 is a diagram for describing a relationship between a coding unit 710 and transformation units 720, according to an exemplary embodiment.

The apparatus 100 or 200 encodes or decodes an image according to coding units having sizes smaller than or equal to a maximum coding unit for each maximum coding unit. Sizes of transformation units for frequency transformation during encoding may be selected based on data units that are not larger than a corresponding coding unit.

For example, in the apparatus 100 or 200, if a size of the coding unit 710 is 64×64, frequency transformation may be performed by using the transformation units 720 having a size of 32×32.

Also, data of the coding unit 710 having the size of 64×64 may be encoded by performing the frequency transformation on each of the transformation units having the size of 32×32, 16×16, 8×8, and 4×4, which are smaller than 64×64, and then a transformation unit having a least coding error may be selected.

FIG. 8 is a diagram for describing encoding information of coding units according to depths, according to an exemplary embodiment.

The output 130 of the apparatus 100 may encode and transmit information 800 about a partition type, information 810 about a prediction mode, and information 820 about a size of a transformation unit for each coding unit corresponding to a coded depth, as information about an encoding mode.

The information 800 indicates information about a shape of a partition obtained by splitting a prediction unit of a current coding unit, as a data unit for prediction encoding the current coding unit. For example, a current coding unit CU_0 having a depth 0 and size of 2N×2N may be split into any one of a partition 802 having a size of 2N×2N, a partition 804 having a size of 2N×N, a partition 806 having a size of N×2N, and a partition 808 having a size of N×N. Here, the information 800 about a partition type of the current coding unit is set to indicate one of the partition 804 having a size of 2N×N, the partition 806 having a size of N×2N, and the partition 808 having a size of N×N The information 810 indicates a prediction mode of each partition. For example, the information 810 may indicate a mode of prediction encoding performed on a partition indicated by the information 800, i.e., an intra mode 812, an inter mode 814, or a skip mode 816.

The information 820 indicates a transformation unit to be based on when frequency transformation is performed on a current coding unit. For example, the transformation unit may be a first intra transformation unit 822, a second intra transformation unit 824, a first inter transformation unit 826, or a second intra transformation unit 828.

The image data and encoding information extractor 220 of the apparatus 200 may extract and use the information 800, 810, and 820 for decoding, according to each deeper coding unit.

Figure 9:
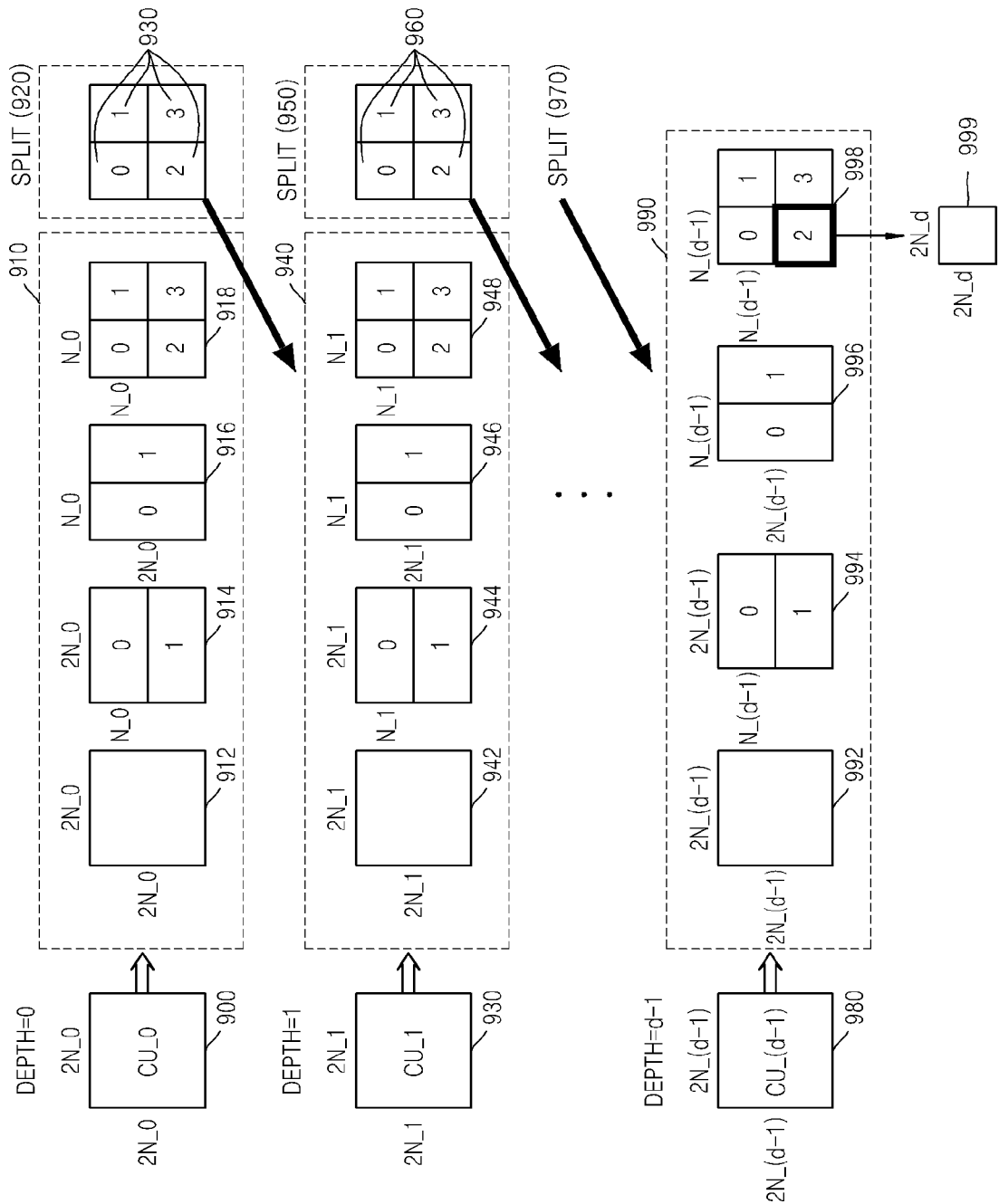
FIG. 9 is a diagram illustrating coding units according to depths, according to an exemplary embodiment.

FIG. 9 is a diagram illustrating deeper coding units according to depths, according to an exemplary embodiment.

Split information may be used to indicate a change in a depth. The spilt information indicates whether a coding unit of a current depth is split into coding units of a lower depth.

A prediction unit 910 for prediction encoding a coding unit having a depth of 0 and a size of 2N_0×2N_0 may include a partition type 912 having a size of 2N_0×2N_0, a partition type 914 having a size of 2N_0×N_0, a partition type 916 having a size of N_0×2N_0, and a partition type 918 having a size of N_0×N_0. Although the partition types 912, 914, 916, and 918 in which prediction units are split symmetrically are shown in FIG. 9, partition types are not limited thereto and may have asymmetrical, arbitrary, or geometric shapes as described above.

Encoding via motion prediction is repeatedly performed on one partition having a size of 2N_0×2N_0, two partitions having a size of 2N_0×N_0, two partitions having a size of N_0×2N_0, and four partitions having a size of N_0×N_0, according to each split type. The prediction encoding in an intra mode and an inter mode may be performed on the partitions having the sizes of 2N_0×2N_0, N_0×2N_0, 2N_0×N_0, and N_0×N_0. The prediction encoding in a skip mode is performed only on the partition having the size of 2N_0×2N_0.

If the encoding error is the smallest in any one of the partition types 912, 914, and 916 having the sizes of 2N_0×2N_0, 2N_0×N_0, and N_0×2N_0, no more split to a lower depth is necessary.

If the encoding error is the smallest in the split type 918 having the size N_0×N_0, a depth is changed from 0 to 1 to split the partition type 918 in operation 920, and encoding is repeatedly performed on coding units 930 having a depth of 2 and a size of N_0×N_0 to search for a minimum encoding error.

A prediction unit 940 for performing prediction encoding on the coding unit 930 having a depth of 1 and a size of 2N_1×2N_1 (=N_0×N_0) may include a partition type 942 having a size of 2N_1×2N_1, a partition type 944 having a size of 2N_1×N_1, a partition type 946 having a size of N_1×2N_1, and a partition type 948 having a size of N_1×N_1.

Also, if the encoding error is the smallest in the partition type 948 having the size N_1×N_1, the depth is changed from 1 to 2 to split the partition type 948 in operation 950, and encoding is repeatedly performed on coding units 960 having a depth of 2 and a size of N_2×N_2 to search for a minimum encoding error.

When a maximum depth is d, split information according to each depth may be set up to when a depth becomes d−1, and split information may be set up to when a depth becomes d−2. That is, when encoding is performed from a depth of d−2 to a depth of d−1 in operation 970, a prediction unit 990 for performing prediction encoding on a coding unit 980 having a depth of d−1 and a size of 2N_(d−1)×2N_(d−1) may include a partition type 992 having a size of 2N_(d−1)×2N_(d−1), a partition type 994 having a size of 2N_(d−1)×N_(d−1), a partition type 996 having a size of N_(d−1)×2N_(d−1), and a partition type 998 having a size of N_(d−1)×N_(d−1).

Encoding via prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), and four partitions having a size of N_(d−1)×N_(d−1), according to each split type to search for a partition type generating a minimum encoding error.

Although an encoding error of the partition type 998 having the size of N_(d−1)×N_(d−1) is the smallest, since the maximum depth is d, a coding unit CU_(d−1) having a depth of d−1 is no longer split to a lower depth, and a coded depth of a current maximum coding unit 900 may be determined to be a depth of d−1 and a partition type of the current maximum coding unit 900 may be determined to be N_(d−1)×N_(d−1). Also, since the maximum depth is d, split information about a coding unit 952 having a depth of d−1 is not set.

A data unit 999 may be referred to as a 'minimum unit' of a current maximum coding unit. The minimum unit may be a square data unit having a size obtained by splitting a minimum coding unit having a lowermost coded depth by 4. By repeatedly performing encoding, the apparatus 100 may compare encoding errors according to depths of the coding unit 900, select a depth that generates a least encoding error, determine a coded depth, and set a corresponding partition type and prediction mode as an encoding mode of the coded depth.

As such, minimum encoding errors according to depths of depths may be compared in all of the depths of 0, 1, . . . , d−1, and d, and a depth having a smallest error may be selected as a coded depth. A coded depth, and a prediction mode and a partition type of a prediction unit may be encoded and transmitted as information about an encoding mode. Also, since a coding unit has to be split up to when a depth changes from a depth of 0 to a coded depth, only split information of the coded depth has to be set to '0' and split information according to each depth excluding the coded depth has to be set to '1'.

The image data and encoding information extractor 220 of the apparatus 200 may extract and use information about a prediction unit and a coded depth of the coding unit 900 to decode the partition type 912. The apparatus 200 may determine a depth in which split information is '0' as a coded depth by using the split information according to each depth, and may use information about an encoding mode of the corresponding depth for decoding.

Figure 10:
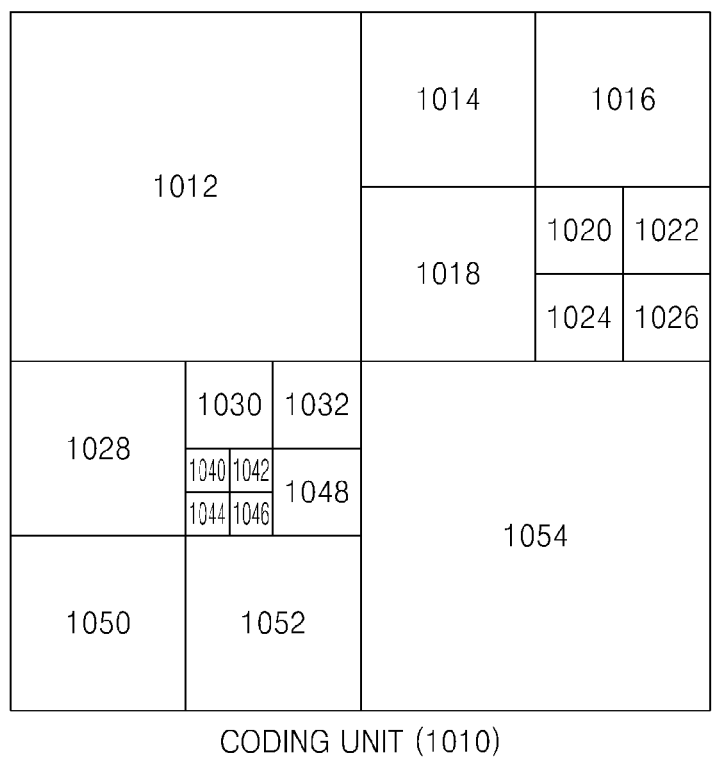
FIGS. 10, 11, and 12 are diagrams for describing a relationship between coding units, prediction units, and frequency transformation units, according to an exemplary embodiment.
Figure 11:
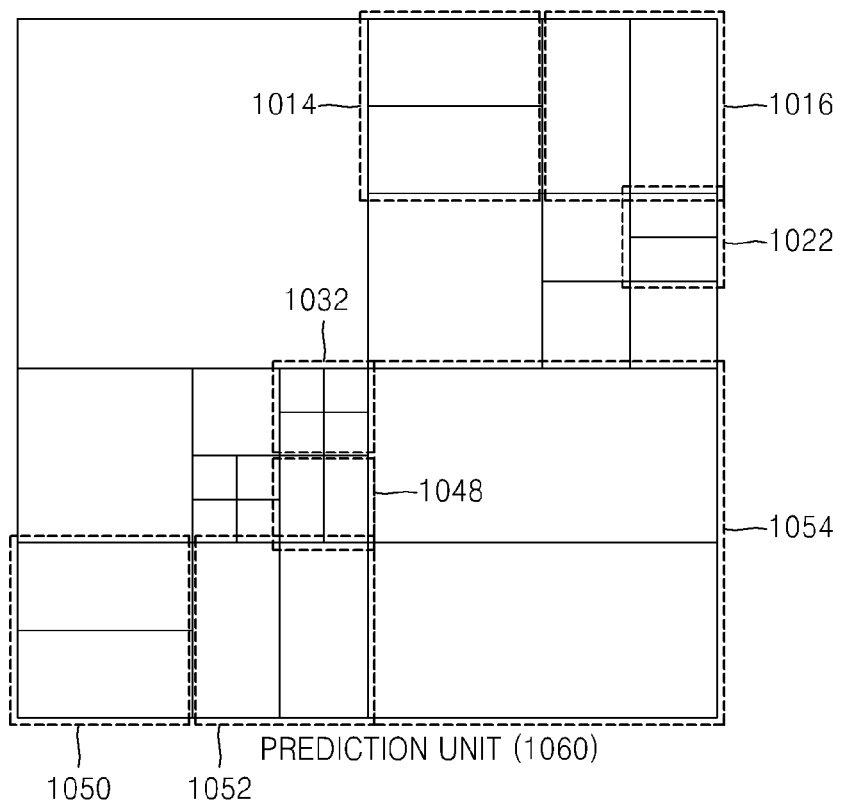
Figure 12:
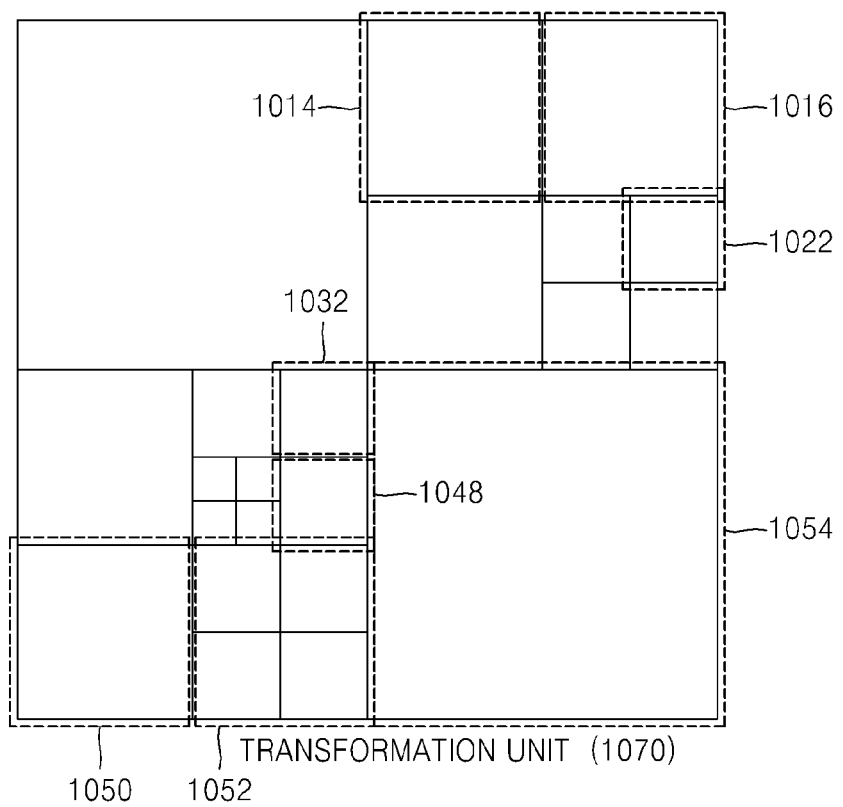

FIGS. 10, 11, and 12 are diagrams for describing a relationship between coding units 1010, prediction units 1060, and frequency transformation units 1070, according to an exemplary embodiment.

The coding units 1010 are coding units corresponding to coded depths determined by the apparatus 100, in a maximum coding unit 1000. The prediction units 1060 are partitions of prediction units of each of the coding units 1010, and the transformation units 1070 are transformation units of each of the coding units 1010.

When a depth of a maximum coding unit is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some partitions 1014, 1016, 1022, 1032, 1048, 1050, 1052, and 1054 are obtained by splitting the coding units in the encoding units 1010. In other words, partition types in the partitions 1014, 1022, 1050, and 1054 have a size of 2N×N, partition types in the partitions 1016, 1048, and 1052 have a size of N×2N, and a partition type of the partition 1032 has a size of N×N. Prediction units and partitions of the coding units 1010 are smaller than or equal to each coding unit.

Frequency transformation or frequency inverse transformation is performed on image data of the coding unit 1052 in the transformation units 1070 in a data unit that is smaller than the coding unit 1052. Also, the transformation units 1014, 1016, 1022, 1032, 1048, 1050, and 1052 in the transformation units 1070 are different from those in the prediction units 1060 in terms of sizes and shapes. In other words, the apparatuses 100 and 200 may perform intra prediction, motion estimation, motion compensation, frequency transformation, and inverse transformation individually on a data unit in the same coding unit.

Accordingly, since an optimum coding unit is determined by recursively performing encoding on coding units having a hierarchical structure in each region for each maximum coding unit, coding units having a recursive tree structure may be obtained. Encoding information may include split information about a coding unit, information about a partition type, information about a prediction mode, and information about a size of a transformation unit. Table 1 shows encoding information which may be set by the apparatus 100 and the apparatus 200.

type, information about a prediction mode, and information about a size of a transformation unit may be defined for the coded depth. When the current coding unit needs to be further split according to the split information, encoding has to be independently performed on 4 split coding units of a lower depth.

A prediction mode may be expressed as one of an intra mode, an inter mode, and a skip mode. The intra mode and the inter mode may be defined in all partition types, and the skip mode may be defined only in a partition type having a size of 2N×2N.

Information about a partition type may indicate symmetric partition types having sizes of 2N×2N, 2N×N, N×2N, and N×N obtained by symmetrically splitting a height or a width of a prediction unit, and asymmetric partition types having sizes of 2N×nU, 2N×nD, nL×2N, and nR×2N obtained by asymmetrically splitting the height or the width of the prediction unit. The asymmetric partition types having the sizes of 2N×nU and 2N×nD are respectively obtained by splitting the height in 1:3 and 3:1, and the asymmetric partition types having the sizes of nL×2N and nR×2N are obtained by splitting the width in 1:3 and 3:1.

A size of a transformation unit may be set to be two types in an intra mode, and two types in an inter mode. That is, when split information about the transformation unit is 0, a size of the transformation unit is set to 2N×2N which is a size of a current coding unit. When split information of the transformation unit is 1, the transformation unit may be obtained by splitting the current coding unit. Also, when a partition type having a size obtained by splitting the current coding unit is an asymmetric partition type, a size of the transformation unit may be set to N×N, and when a partition type having a size obtained by splitting the current coding unit is a symmetric partition type, a size of the transformation unit may be set to N/2×N/2.

Encoding information of coding units having a tree structure may include at least one of a coding unit of a coded depth, a prediction unit, and a minimum unit. The coding

TABLE 1

| Split information 0 (encoding of coding unit having current depth of d and size of 2N × 2N) | | | | | Split information 1 |
|---|---|---|---|---|---|
| Prediction mode | Partition type | | Size of transformation unit | | Repeatedly encode coding units having lower depth of d + 1 |
| intra inter skip (only 2N × 2N) | Asymmetric partition type 2N × 2N 2N × N N × 2N N × N | symmetric partition type 2N × nU 2N × nD nL × 2N nR × 2N | Split information 0 of transformation unit 2N × 2N | Split information 1 of transformation unit N × N (symmetric partition type) N/2 × N/2 (asymmetric partition type) | |

The output unit 130 of the apparatus 100 may output encoding information about coding units having a tree structure, and the image data and encoding information extractor 220 of the apparatus 200 may extract the encoding information about the coding units having the tree structure from a received bitstream.

Split information indicates whether a current coding unit is split into coding units of a lower depth. When split information of a current depth of d is 0, since a depth in which the current coding unit is no longer split into a lower coding unit is a coded depth, information about a partition unit of the coded depth may include at least one of a prediction unit and a minimum unit containing the same encoding information.

Accordingly, it is determined whether adjacent data units are included in the same coding unit corresponding to the coded depth by comparing encoding information of the adjacent data units. Also, since a corresponding coding unit of the coded depth is determined by using encoding information of a data unit, a distribution of coded depths in a maximum coding unit may be determined.

Accordingly, in this case, when a current coding unit is predicted based on neighboring data units, encoding information of data units in deeper coding units adjacent to the current coding unit may be directly referred to and used.

Alternatively, when a current coding unit is predicted based on neighboring coding units, data units adjacent to the current coding unit are searched by using encoded information of the data units, and the searched adjacent coding units may be referred for predicting the current coding unit.

Figure 13:
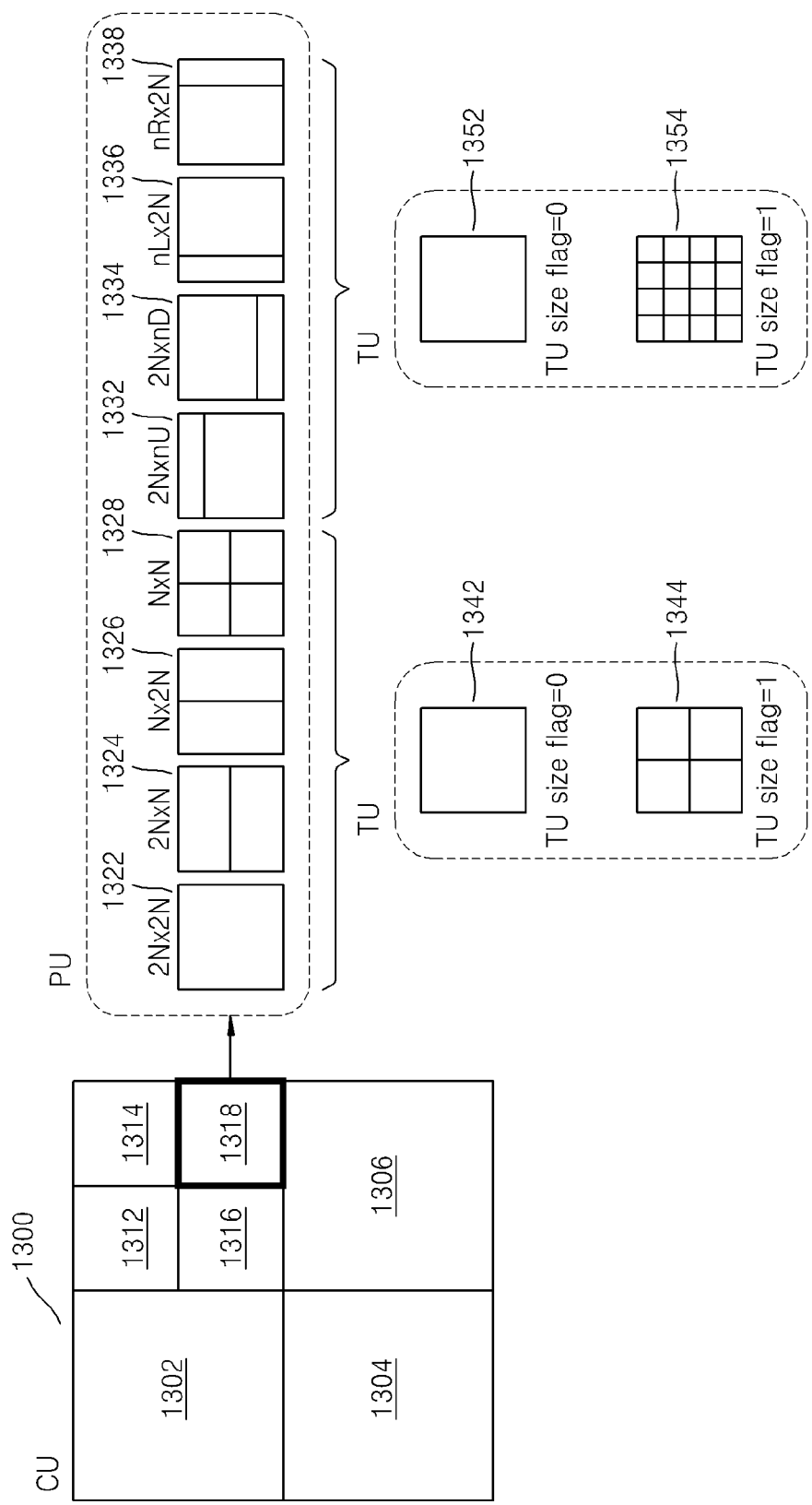
FIG. 13 is a diagram illustrating a relationship between a coding unit, a prediction unit, and a transformation unit according to encoding mode information of Table 1, according to an exemplary embodiment.

FIG. 13 is a diagram illustrating a relationship between a coding unit, a prediction unit, and a transformation unit according to encoding mode information of Table 1, according to an exemplary embodiment.

A maximum coding unit 1300 includes coding units 1302, 1304, 1306, 1312, 1314, 1316, and 1318. Since the coding unit 1318 is a coding unit of a coded depth, split information may be set to 0. Partition type information of the coding unit 1318 having a size of 2N×2N may be set to one of a partition type 1322 having a size of 2N×2N, a partition type 1324 having a size of 2N×N, a partition type 1326 having a size of N×2N, a partition type 1328 having a size of N×N, a partition type 1332 having a size of 2N×nU, a partition type 1334 having a size of 2N×nD, a partition type 1336 having a size of nL×2N, and a partition type 1338 having a size of nR×2N.

Assuming that partition type information is set to one of the partition types 1322 having the size of 2N×2N, the partition type 1324 having the size of 2N×N, the partition type 1326 having the size of N×2N, and the partition type 1328 having the size of N×N, which are symmetric partition types, when split information (TU size flag) of a transformation unit is 0, a transformation unit 1342 having a size of 2N×2N may be set, and when split information of a transformation unit is 1, a transformation unit 1344 having a size of N×N may be set.

Assuming that partition type information is set to one of the partition types 1332 having the size of 2N×nU, the partition type 1334 having the size of 2N×nD, nL×2N (1336), and the partition type 1338 having the size of nR×2N, when split information (TU size flag) of a transformation unit is 0, a transformation unit 1352 having a size of 2N×2N may be set, and when transformation unit split information is 1, a transformation unit 1354 having a size of N/2×N/2 may be set.

Intra prediction performed on a prediction unit by the intra predictor 410 of the apparatus 100 of FIG. 4 and the intra predictor 550 of the apparatus 200 of FIG. 5 will be explained in detail.

Figure 14A:
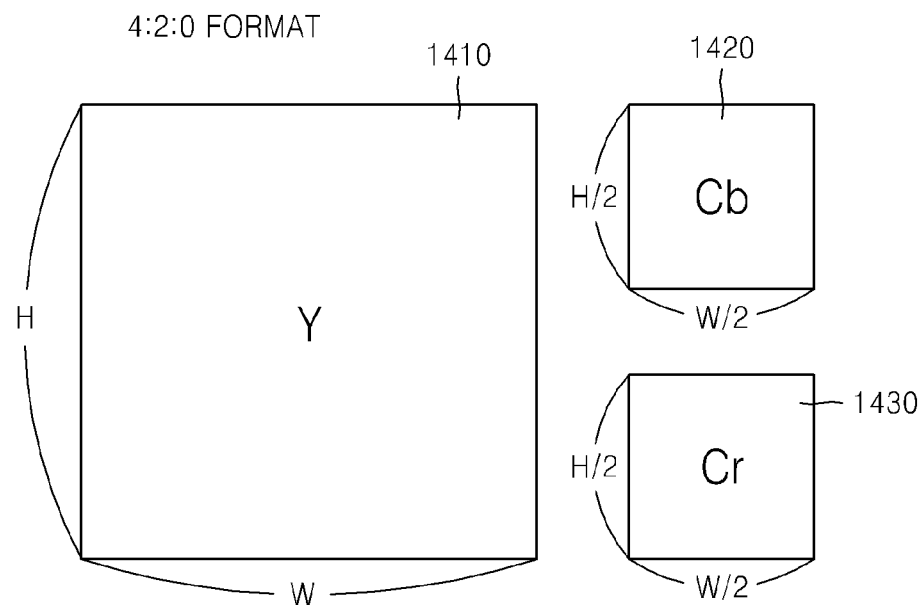
FIG. 14A through FIG. 14C are diagrams illustrating formats of prediction units of a luminance component and a chrominance component, according to exemplary embodiments.
Figure 14B:
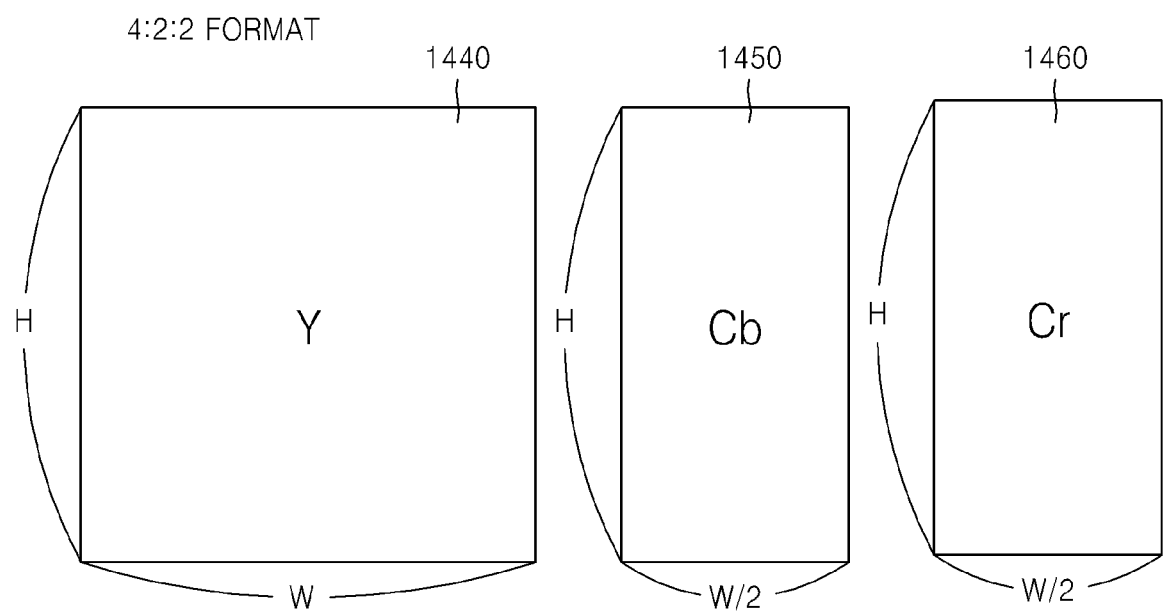
Figures 14C, 15:
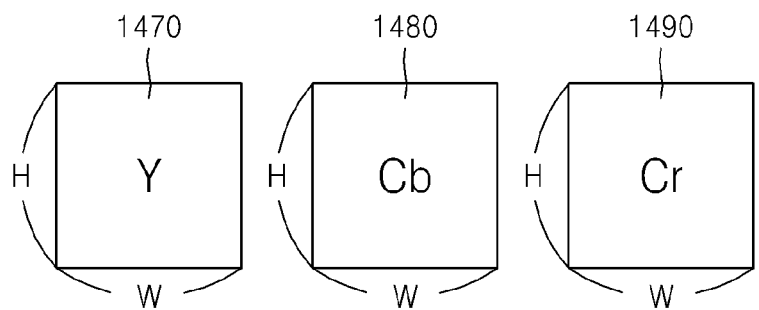
FIG. 15 is a table illustrating the number of intra prediction modes according to sizes of luminance component prediction units, according to an exemplary embodiment.

FIGS. 14A through 14C are diagrams illustrating formats of a luminance component image and a chrominance component image, according to the exemplary embodiments.

Each coding unit forming one frame may be expressed by using one of three components, i.e., Y, Cb, and Cr. Y is luminance data having luminance information, and Cb and Cr are chrominance data having chrominance information.

The chrominance data may be expressed using a lower amount of data than the luminance data, based on a fact that a person is generally more sensitive to the luminance information than the chrominance information. Referring to FIG. 14A, one coding unit having a 4:2:0 format includes luminance data 1410 having a size of H×W (H and W are positive integers), and two pieces of chrominance data 1420 and 1430 having a size of (H/2)×(W/2) obtained by sampling the chrominance components Cb and Cr by ¼. Referring to FIG. 14B, one coding unit having a 4:2:2 format includes luminance data 1440 having a size of H×W (H and W are positive integers), and two pieces of chrominance data 1450 and 1460 having a size of H×(W/2) obtained by sampling the chrominance components Cb and Cr by ½ in a horizontal direction. Also, referring to FIG. 14C, when one coding unit has a 4:4:4 format, the coding unit includes luminance data 1470, and chrominance data 1480 and 1490 each having a size of H×W without sampling the chrominance components Cb and Cr, so as to precisely express a chrominance component image.

Hereinafter, it is assumed that the luminance component coding unit and the chrominance component coding unit, which are intra predicted, are one of image signals having color formats of 4:2:0, 4:2:2, and 4:4:4 defined in a YCbCr (or YUV) color domain. It would be understood by one of ordinary skill in the art that the embodiments may be applied to not only an image including a luminance component and a chrominance image but also an image including a plurality of different image components.

FIG. 15 is a table showing the number of intra prediction modes according to sizes of luminance component coding units, according to an exemplary embodiment.

The number of intra prediction modes to be applied to a luminance component coding unit (a decoding unit in a decoding process) may be variously set. For example, referring to FIG. 15, if the size of a luminance component coding unit on which intra prediction is performed is N×N, the numbers of intra prediction modes actually performed on 2×2, 4×4, 8×8, 16×16, 32×32, 64×64, and 128×128-sized luminance component coding units may be respectively set as 5, 9, 9, 17, 33, 5, and 5 (in Example 2). The numbers of intra prediction modes to be actually performed are differently set according to the sizes of luminance component coding units because overheads for encoding prediction mode information differ according to the sizes of the luminance component coding units. In other words, a small luminance component coding unit occupies a small portion of entire image data but may have a large overhead in order to transmit additional information such as prediction mode information of the luminance component coding unit. Accordingly, if a luminance component small coding unit is encoded by using an excessively large number of prediction modes, the number of bits may be increased and thus compression efficiency may be reduced. Also, a luminance component large coding unit, e.g., a luminance component coding unit equal to or greater than 64×64, generally corresponds to a plane region of image data, and thus encoding of the large luminance component coding unit by using an excessively large number of prediction modes may also reduce compression efficiency. Accordingly, a size of a prediction unit is too greater or less than a predetermined size, only a smaller number of intra prediction modes may be used. The number of intra prediction modes used according to a size of a prediction unit may be variously set without being limited to FIG. 15. The number of prediction units used according to a size of each prediction unit of FIG. 15 is exemplary, and the number of prediction units according to a size of each prediction unit may be changed.

Figures 16A, 16B:
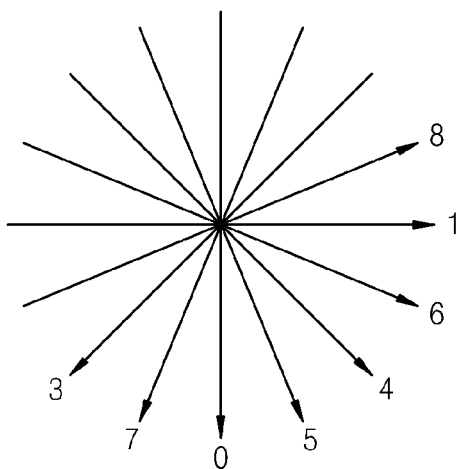
FIG. 16A is a diagram showing an intra prediction mode applicable a luminance component prediction unit having a predetermined size, according to an exemplary embodiment.
FIG. 16B is a diagram illustrating directions of the intra prediction modes of FIG. 16A.

FIG. 16A is a table showing intra prediction modes applied to a luminance component coding unit having a predetermined size, according to an exemplary embodiment.

Referring to FIGS. 15 and 16A, for example, when intra prediction is performed on a luminance component coding unit having a 4×4 size, the luminance component coding unit may have a vertical mode (mode 0), a horizontal mode (mode 1), a direct current (DC) mode (mode 2), a diagonal down-left mode (mode 3), a diagonal down-right mode (mode 4), a vertical-right mode (mode 5), a horizontal-down mode (mode 6), a vertical-left mode (mode 7), and a horizontal-up mode (mode 8).

FIG. 16B illustrates directions of the intra prediction modes shown in FIG. 16A. In FIG. 16B, numbers at the ends of the arrows represent prediction modes corresponding to prediction directions indicated by the arrows. Here, mode 2 is a DC mode having no directionality and thus is not shown in FIG. 16B.

Figure 16C:
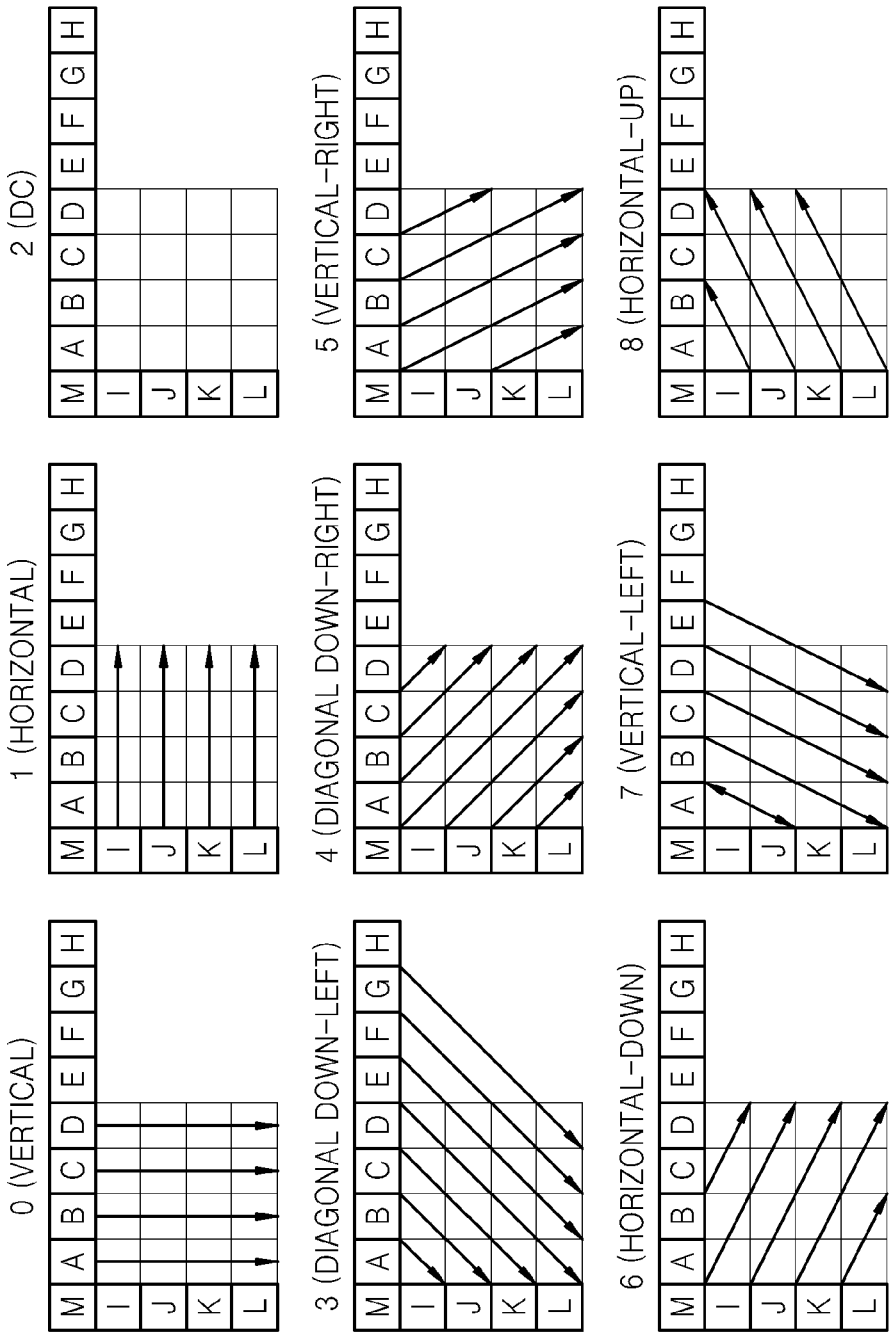
FIG. 16C is a diagram for describing a method of performing intra prediction on a luminance component prediction unit by using the intra prediction modes of FIG. 16A, according to an exemplary embodiment.

FIG. 16C is a diagram for describing a method of performing intra prediction on a luminance component coding unit by using the intra prediction modes shown in FIG. 16A, according to an exemplary embodiment.

Referring to FIG. 16C, a prediction coding unit is generated according to an available intra prediction mode determined according to the size of a current luminance component coding unit by using neighboring pixels A through M of the current luminance component coding unit. For example, an operation of performing prediction encoding on a current coding unit having a 4×4 size according to mode 0, i.e., a vertical mode, shown in FIG. 16A will be described. Initially, values of the neighboring pixels A through D at an upper side of the current coding unit are predicted as pixel values of the current coding unit. That is, the value of the neighboring pixel A is predicted as a value of four pixels in a first column of the current coding unit, the value of the neighboring pixel B is predicted as a value of four pixels in a second column of the current coding unit, the value of the neighboring pixel C is predicted as a value of four pixels in a third column of the current coding unit, and the value of the neighboring pixel D is predicted as a value of four pixels in a fourth column of the current coding unit. After that, the pixel values of the current coding unit predicted by using the neighboring pixels A through D are subtracted from the pixel values of the original current coding unit so as to calculate an error value and then the error value is encoded.

Figure 17:
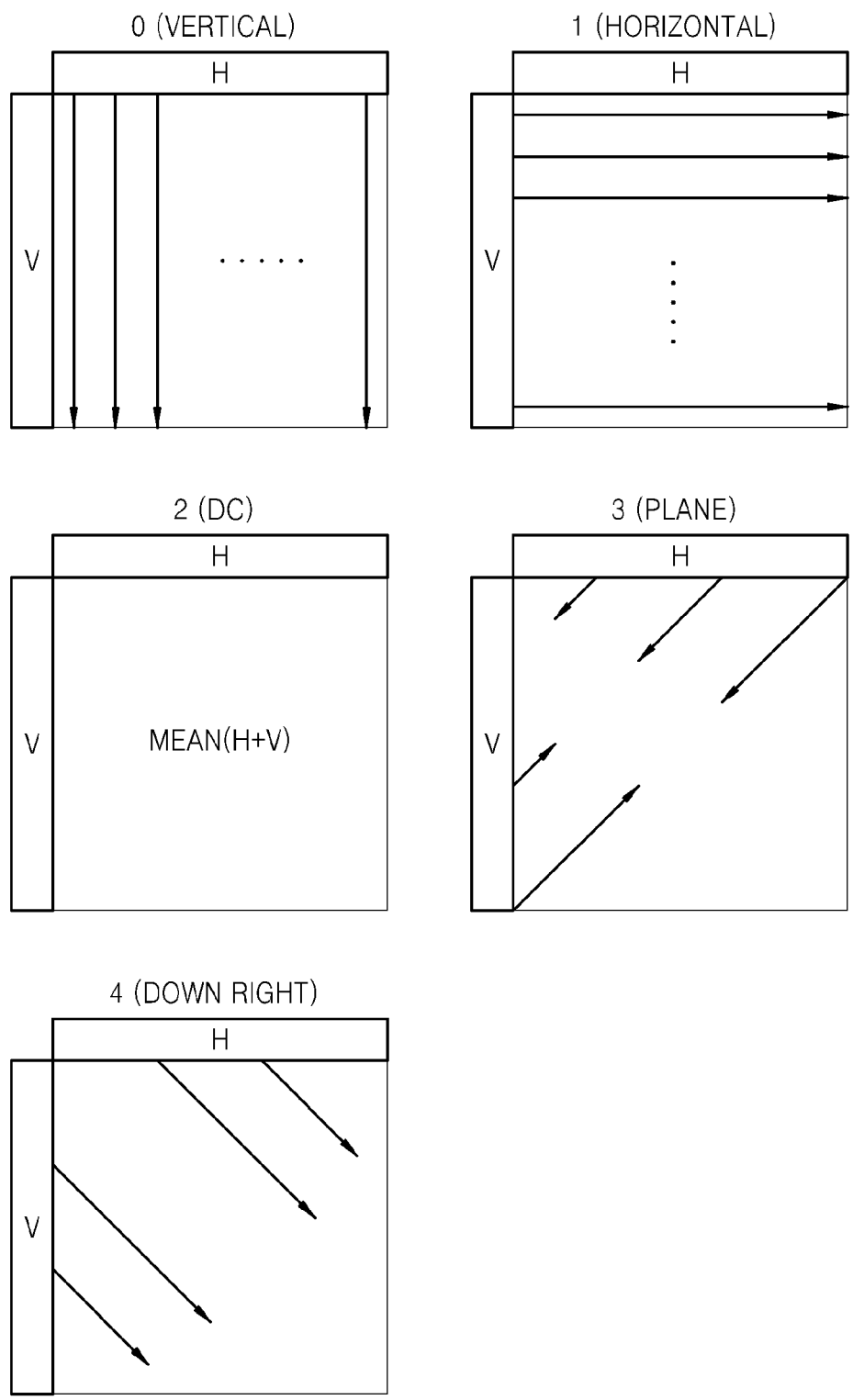
FIG. 17 is a diagram for describing an intra prediction mode applied to a luminance component prediction unit having a predetermined size, according to another exemplary embodiment.

FIG. 17 is a diagram for describing intra prediction modes applied to a luminance component coding unit having a predetermined size, according to another exemplary embodiment.

Referring to FIGS. 15 and 17, for example, when intra prediction is performed on a coding unit having a 2×2 size, the coding unit may have a total of five modes such as a vertical mode, a horizontal mode, a DC mode, a plane mode, and a diagonal down-right mode.

An intra prediction mode of a luminance component prediction unit may include intra prediction modes that determine a neighboring reference pixel by using a line having a predetermined gradient with respect to a pixel in a prediction unit and uses the determined neighboring reference pixel. The gradient may be set by using (dx, dy) parameters (dx and dy are integers). For example, if each of the 33 prediction modes is defined as mode N (where N is an integer from 0 to 32), mode 0 may be set as a vertical mode, mode 1 may be set as a horizontal mode, mode 2 may be set as a DC mode, mode 3 may be set as a plane mode, and each of mode 4 through mode 31 may be defined as a prediction mode that determines a neighboring reference pixel by using a line having a directionality of tan−1(dy/dx) by using (dx, dy) represented as one of (1,−1), (1,1), (1,2), (2,1), (1,−2), (2,1), (1,−2), (2,−1), (2,−11), (5,−7), (10,−7), (11,3), (4,3), (1,11), (1,−1), (12,−3), (1,−11), (1,−7), (3,−10), (5,−6), (7,−6), (7,−4), (11,1), (6,1), (8,3), (5,3), (5,7), (2,7), (5,−7), and (4,−3) as shown in Table 2 and uses the determined neighboring reference pixel for prediction.

TABLE 2

| mode # | dx | dy |
|---|---|---|
| mode 4 | 1 | −1 |
| mode 5 | 1 | 1 |
| mode 6 | 1 | 2 |
| mode 7 | 2 | 1 |
| mode 8 | 1 | −2 |
| mode 9 | 2 | −1 |
| mode 10 | 2 | −11 |
| mode 11 | 5 | −7 |
| mode 12 | 10 | −7 |
| mode 13 | 11 | 3 |
| mode 14 | 4 | 3 |
| mode 15 | 1 | 11 |
| mode 16 | 1 | −1 |
| mode 17 | 12 | −3 |
| mode 18 | 1 | −11 |
| mode 19 | 1 | −7 |
| mode 20 | 3 | −10 |
| mode 21 | 5 | −6 |
| mode 22 | 7 | −6 |
| mode 23 | 7 | −4 |
| mode 24 | 11 | 1 |
| mode 25 | 6 | 1 |
| mode 26 | 8 | 3 |
| mode 27 | 5 | 3 |
| mode 28 | 5 | 7 |
| mode 29 | 2 | 7 |
| mode 30 | 5 | −7 |
| mode 31 | 4 | −3 |

Mode 0 is a vertical mode, mode 1 is a horizontal mode, mode 2 is a DC mode, mode 3 is a plane mode, and mode 32 is a bi-linear mode.

Mode 32 may be set as a bi-linear mode that uses bi-linear interpolation as will be described later with reference to FIG. 19.

Figure 18A:
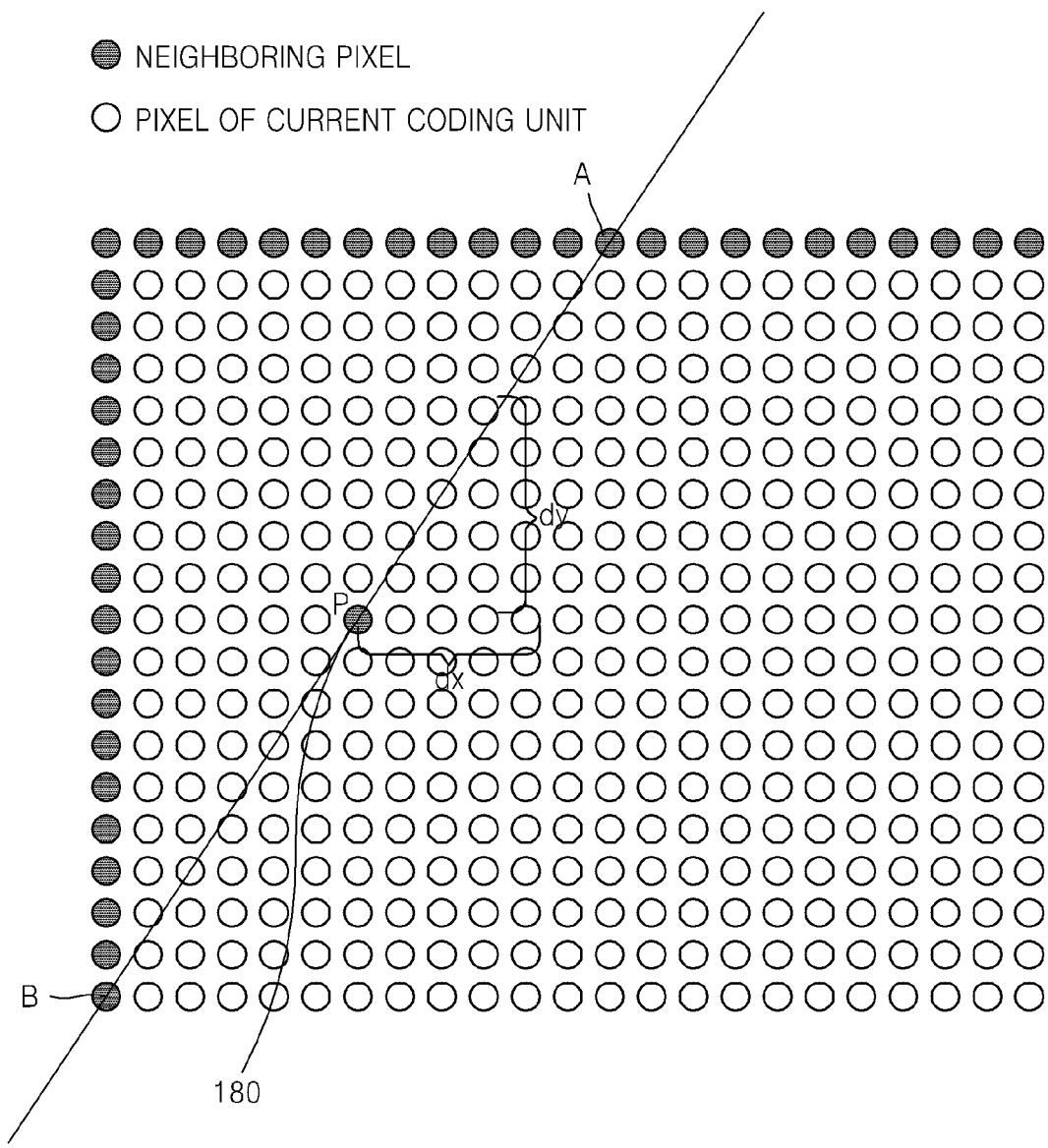
FIGS. 18A through 18C are reference diagrams for describing intra prediction modes having different directionalities, according to an exemplary embodiment.
Figure 18B:
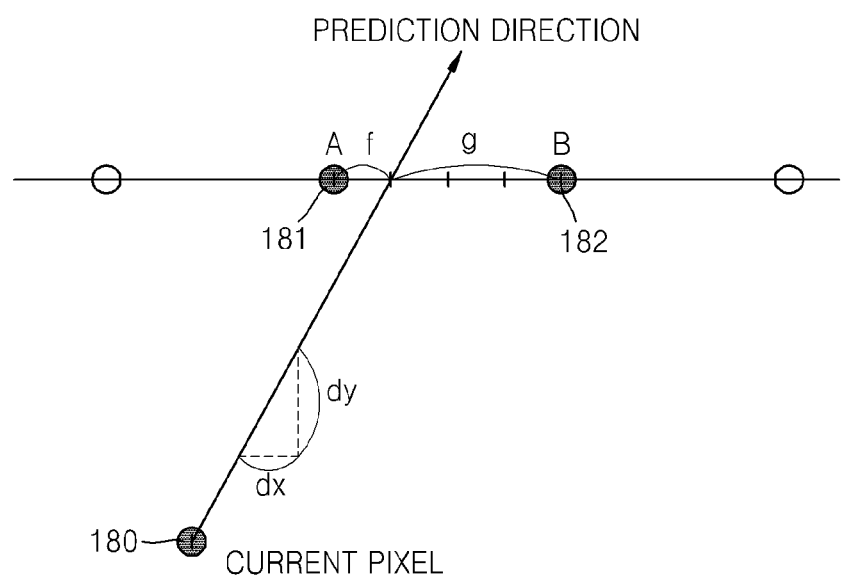
Figure 18C:
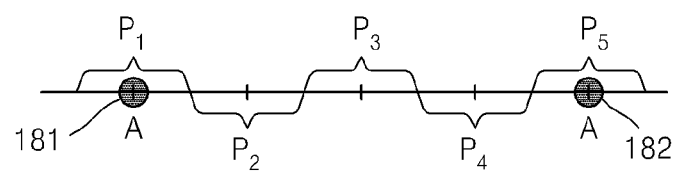

FIGS. 18A through 18C are reference diagrams for describing intra prediction modes having various directionalities, according to an exemplary embodiment.

As described above with reference to Table 2, in each of the intra prediction modes, a neighboring reference pixel may be determined by using a line having a gradient of $\tan^{-1}(dy/dx)$ determined by using a plurality of (dx, dy) parameters, and prediction may be performed by using the determined neighboring reference pixel.

Referring to FIG. 18A, neighboring pixels A and B on a line 180 that extends from a current pixel P in a current luminance component coding unit, which is to be predicted, at an angle of $\tan^{-1}(dy/dx)$ determined by a value of a (dx, dy) parameter according to a mode, as shown in Table 1, may be used as predictors of the current pixel P. In this case, the neighboring pixels A and B may be pixels that have been encoded and restored, and belong to previous coding units located above and to the left side of the current coding unit. Also, when the line 180 does not pass through a neighboring pixels on locations each having an integral value but passes between these neighboring pixels, a neighboring pixel closer to the line 180 may be used as a predictor of the current pixel P. Alternatively, a weighted average value considering a distance between intersections of the line 180 and neighboring pixels close to the line 180 may be used as a predictor of the current pixel P.

FIGS. 18B and 18C are reference diagrams for describing a process of generating a predictor when the line 180 of FIG. 18A passes between integer location neighboring pixels on locations each having an integral value, not passes through neighboring pixels on locations each having an integral value, according to an exemplary embodiment.

Referring to FIG. 18B, when the line 180 having an angle of $\tan^{-1}(dy/dx)$ determined by values of (dx, dy) parameters according to modes passes between neighboring pixels A 181 and B 182 on locations having integral values, a weighted average value considering a distance between intersections of the line 180 and the neighboring pixels A 181 and B 182 close the line 180 may be used as a predictor of the current pixel P. For example, when a distance between the neighboring pixel A 181 and the intersection of the line 180 having the angle of $\tan^{-1}(dy/dx)$ is f and a distance between the neighboring pixel B 182 and the intersection is g, a predictor of the current pixel P may be obtained as (A*g+B*f)/(f+g). The distances f and g may be distances normalized with integers. When software or hardware is embodied, a predictor of the current pixel P may be obtained through a shift operation as (g*A+f*B+2)>>2. As shown in FIG. 18B, when the line 180 passes a location corresponding to ¼ close to the neighboring pixel A 181 from among points obtained by splitting a space between the neighboring pixel A 181 and the neighboring pixel B 182 on locations having integral values by 4, a predictor of the current pixel P may be obtained as (3*A+B)/4. Such calculation may be performed through shift operation considering rounding as in (3*A+B+2)>>2.

When the line 180 having the angle of $\tan^{-1}(dy/dx)$ determined by the values of the (dx, dy) parameters according to the modes passes between the neighboring pixels A 181 and B 182 on locations having integral values, a space between the neighboring pixel A 181 and the neighboring pixel B 182 may be split into a predetermined number of regions, and a weighted average value considering a distance between intersections and the neighboring pixel A 181 and the neighboring pixel B 182 according to the split regions may be used as a prediction value. For example, referring to FIG. 18C, a space between the neighboring pixel A 181 and the neighboring pixel B 182 may be split into 5 regions (P1 through P5), a representative weighted average value considering a distance between intersections and the neighboring pixel A 181 and the neighboring pixel B 182 according to the regions may be determined, and the representative weighted average value may be used as a predictor of the current pixel P. In detail, when the line 180 passes the region P1, a value of the neighboring pixel A may be determined as a predictor of the current pixel P. When the line 180 passes the region P2, (3*A+1*B+2)>>2 which is a weighted average value considering a distance between a midpoint of the region P2 and the neighboring pixels A and B may be determined as a predictor of the current pixel P. When the line 180 passes the region P3, (2*A+2*B+2)>>2 which is a weighted average value considering a distance between a midpoint of the region P3 and the neighboring pixels A and B may be determined as a predictor of the current pixel P. When the line 180 passes through the region P4, (1*A+3*B+2)>>2 which is a weighted average value considering a distance between a midpoint of the region P4 and the neighboring pixels A and B may be determined as a predictor of the current pixel P. When the line passes through the region P5, a value of the neighboring pixel B may be determined as a predictor of the current pixel P.

Also, when two neighboring pixels, that is, the neighboring pixel A disposed over the line 180 and the neighboring pixel B disposed at the left of the line 180, meet the line 180, an average value of the neighboring pixel A and the neighboring pixel B may be used as a predictor of the current pixel. Alternatively, when a value of dx*dy is a positive value, the neighboring pixel A may be used, and when a value of dx*dy is a negative value, the neighboring pixel B may be used.

The intra prediction modes having various directionalities shown in Table 2 may be preset by an encoding side and a decoding side, and only an index of an intra prediction mode of each coding unit may be transmitted.

Figure 19:
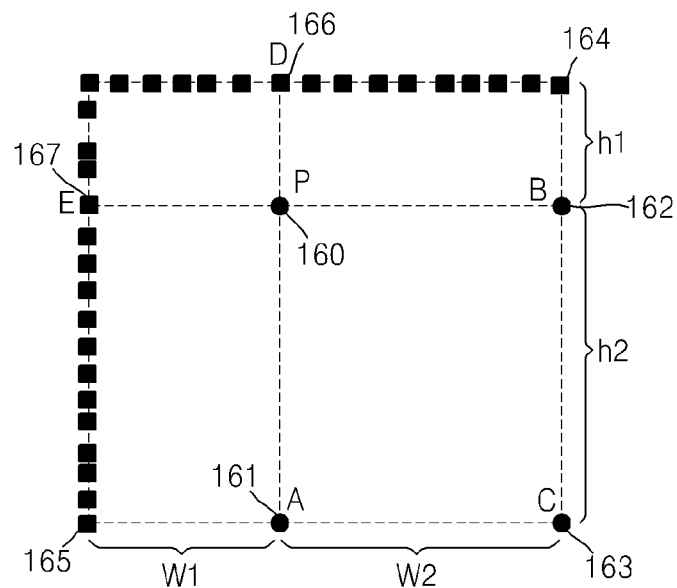
FIG. 19 is a reference diagram for describing a bi-linear mode according to an exemplary embodiment.

FIG. 19 is a reference diagram for describing a bi-linear mode according to an exemplary embodiment.

Referring to FIG. 19, in the bi-linear mode, a geometric average is calculated by considering a value of a current pixel P in a current luminance component coding unit, which is to be predicted, values of pixels on upper, lower, left, and right boundaries of the current luminance component coding unit, and the distances between the current pixel P and the upper, lower, left, and right boundaries of the current luminance component coding unit, and the geometric average is then used as a predictor of the current pixel P. For example, in the bi-linear mode, a geometric average calculated using a virtual pixel A 161, a virtual pixel B 162, a pixel D 166, and a pixel E 167 located to the upper, lower, left, and right sides of the current pixel P, and the distances between the current pixel P and the upper, lower, left, and right boundaries of the current luminance component coding unit, is used as a predictor of the current pixel P. Since the bi-linear mode is one of the intra prediction modes, upper and left neighboring pixels that have been encoded and restored have to be used as reference pixels for prediction. Thus, pixel values in the current luminance component coding unit are not used but virtual pixel values calculated using neighboring pixels located to the upper and left sides of the current luminance component coding unit are used as the pixel A 161 and the pixel B 162. Specifically, first, a value of a virtual pixel C 163 on a lower rightmost point of the current luminance component coding unit is calculated by calculating an average of values of a neighboring pixel (right-up pixel) 164 on an upper rightmost point of the current luminance component coding unit and a neighboring pixel (left-down pixel) 165 on a lower leftmost point of the current luminance component coding unit, as expressed in Equation 1 below:

$$C = 0.5(\text{DownPixel} + \text{UpPixel}) \quad \text{[Equation 1]}$$

Next, a value of the virtual pixel A 161 located on a lowermost boundary of the current luminance component coding unit when the current pixel P is extended downward by considering the distance W1 between the current pixel P and the left boundary of the current luminance component coding unit and the distance W2 between the current pixel P and the right boundary of the current luminance component coding unit, is calculated by using Equation 2 below:

$$A = (C*W1 + \text{LeftDownPixel}*W2)/(W1+W2) \quad \text{[Equation 2]}$$

Similarly, a value of the virtual pixel B 162 located on a rightmost boundary of the current luminance component coding unit when the current pixel P is extended in the right direction by considering the distance h1 between the current pixel P and the upper boundary of the current luminance component coding unit and the distance h2 between the current pixel P and the lower boundary of the current luminance component coding unit, is calculated by using Equation 3 below:

$$B = (C*h1 + \text{RightUpPixel}*h2)/(h1+h2) \quad \text{[Equation 3]}$$

When the values of the virtual pixels A 161 and B 162 are determined using Equations 1 to 3, an average of the values of the pixels A 161, the pixel B, the pixel D 166, and the pixel E 167 may be used as a predictor of the current pixel P. In detail, an average value of the pixels A+B+C+D may be used as a predictor of the current pixel P, or a weighted average value considering a distance between the current pixel P and the virtual pixels A 161, B 162, D 166, and E 167 may be used as a predictor of the current picture P. For example, when a weighted average value is used, a predictor of the current pixel P may be obtained as $\{(h1*A+h2*D)/(h1+h2)+(W1*B+W2*E)/(W1+W2)\}/2$. Such a bi-linear prediction process may be applied to all pixels in a current prediction unit, and a prediction value of the current prediction unit according to the bi-linear prediction mode may be generated.

According to the present embodiment, since prediction encoding is performed according to intra prediction modes variously set according to a size of a prediction unit, more efficient compression may be achieved according to characteristics of an image.

As described above with reference to FIGS. 18A through 18C, when a predictor of the current pixel P is generated by using a neighboring pixel on the line 180 or close to the line 180, the line 180 has actually a directionality of $\tan^{-1}(dy/dx)$. Since subtraction (dy/dx) is used to determine a neighboring pixel using the line 180, calculation using a decimal point may be included when hardware or software is embodied, thereby increasing the amount of calculation. Accordingly, when a prediction direction for selecting a neighboring pixel to be used as a reference pixel is set by using dx and dy parameters, like in Table 2, dx and dy need to be set to reduce the amount of calculation.

Figure 20:
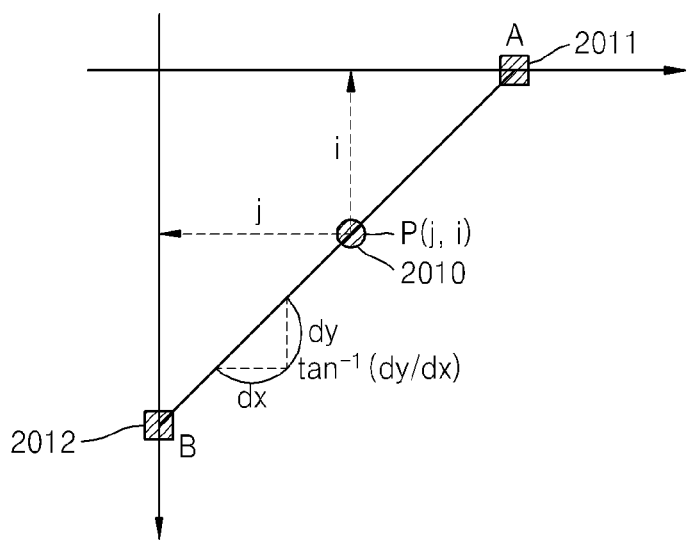
FIG. 20 is a graph which illustrates a relationship between a current pixel and a peripheral pixel located on a line having a directionality of (dx, dy), according to an exemplary embodiment.

FIG. 20 is a graph for describing a relationship between a current pixel and a neighboring pixel located on a line having a directionality of (dx, dy), according to an exemplary embodiment.

Referring to FIG. 20, a current pixel located on (j, i) is P 2010, and an upper neighboring pixel and a left neighboring pixel which pass through the current pixel P 2010 and are located on a line having a directionality, that is, a gradient, of $\tan^{-1}(dy/dx)$ are respectively A 2011 and B 2012. It is assumed that locations of upper neighboring pixels correspond to an X axis on a coordinate plane and locations of left neighboring pixels correspond to a y axis on the coordinate plane. Also, it is assumed that a size of a prediction unit included in the current pixel P 2010 is nS×nS (nS is a positive integer), a location of each of pixels of the prediction unit is one from (0,0) to (nS−1, nS−1), a location of an upper neighboring pixel located on the x axis is (m, −1) (m is an integer), and a location of a left neighboring pixel located on the y axis is (−1, n) (n is an integer). A location of the upper neighboring pixel A 2011 meeting the line passing through the current pixel P 2010 is (j+i*dx/dy, −1), and a location of the left neighboring pixel B 2012 meeting the line is (−1, i+j*dy/dx). Accordingly, in order to determine the upper neighboring pixel A 2011 or the left neighboring pixel B 2012 to predict the current pixel P 2010, subtraction such as dx/dy or dy/dx is necessary. Since subtraction has high complexity, a calculation speed may be reduced when software or hardware is embodied as described above. Accordingly, alternatively, a value of at least one of dx and dy representing a directionality of a prediction mode for determining a neighboring pixel may be determined to be an exponential power of 2. That is, when n and m are integers, dx and dy may be respectively $2^n$ and $2^m$.

Referring to FIG. 20, when the left neighboring pixel B 2012 is used as a predictor of the current pixel P 2010 and dx has a value of $2^n$, calculation j*dy/dx necessary to determine (−1, i+j*dy/dx) which is the location of the left neighboring pixel B 2012 is (i*dy)/($2^n$), and calculation including subtraction using an exponential power of 2 may be obtained through shift operation as (i*dy)>>n, thereby reducing the amount of calculations.

Likewise, when the upper neighboring pixel A 2011 is used as a predictor of the current pixel P 2010 and dy has a value of $2^m$, calculation i*dx/dy necessary to determine (j+i*dx/dy,−1) which is the location of the upper neighboring pixel A may be (i*dx)/($2^m$), and calculation including subtraction using an exponential power of 2 may be obtained as (i*dx)>>m through shift operation.

Figure 21:
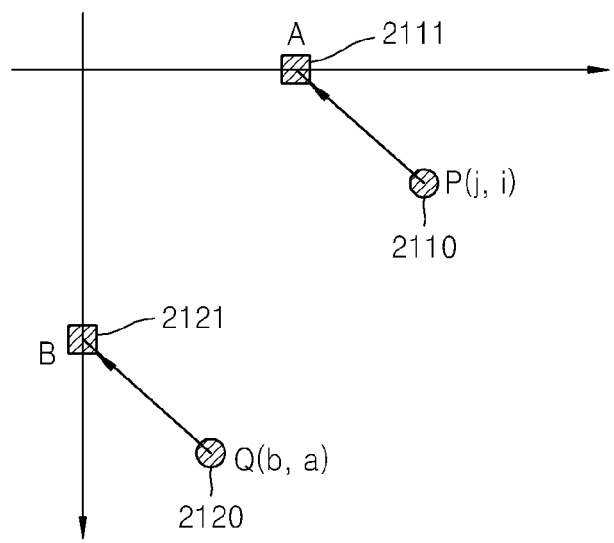
FIG. 21 is a graph illustrating a change in a neighboring pixel located on a line having a directionality of (dx, dy) according to a location of the current pixel, according to an exemplary embodiment.

FIG. 21 is a graph for describing a change in a neighboring pixel located on a line having a directionality of (dx, dy) according to a location of a current pixel, according to an exemplary embodiment.

Referring to FIG. 21, a location of a neighboring pixel referred to according to an intra prediction mode direction is changed according to whether a current pixel to be predicted is a pixel P 2110 or a pixel Q 2120. For example, when the pixel P 2110 is predicted, an upper pixel A is used, and when the pixel Q 2120 is predicted, a left pixel B is used. When only a dy component in a y direction from among (dx, dy) indicating a prediction direction has a value corresponding to an exponential power of 2 as $2^m$, a location of the upper pixel A 2111 in FIG. 21 may be determined through shift operation without subtraction as (j+(i*dx)>>m, −1) and a location of the left pixel B 2121 does not need subtraction as (−1, a+b*$2^m$/dx). Accordingly, in order to exclude subtraction when predictors of all pixels of a current block are generated, all of dx and dy may have exponential powers of 2.

Figure 22:
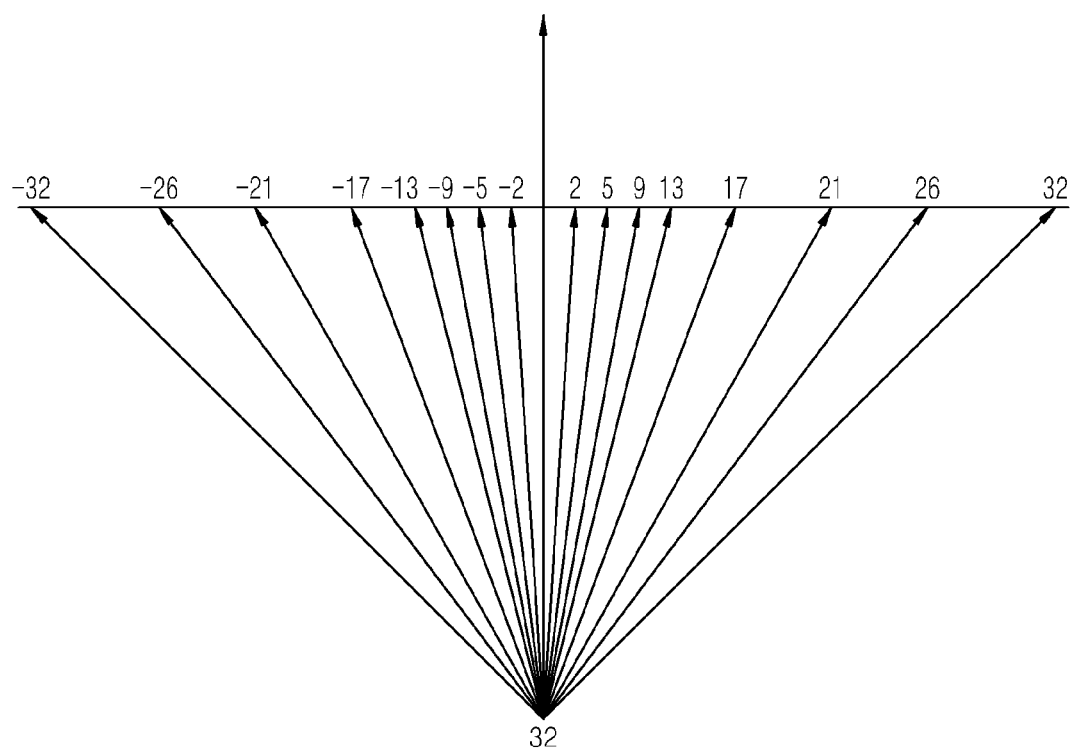
FIGS. 22 and 23 are diagrams for describing a method of determining an intra prediction mode direction, according to an exemplary embodiment.
Figure 23:
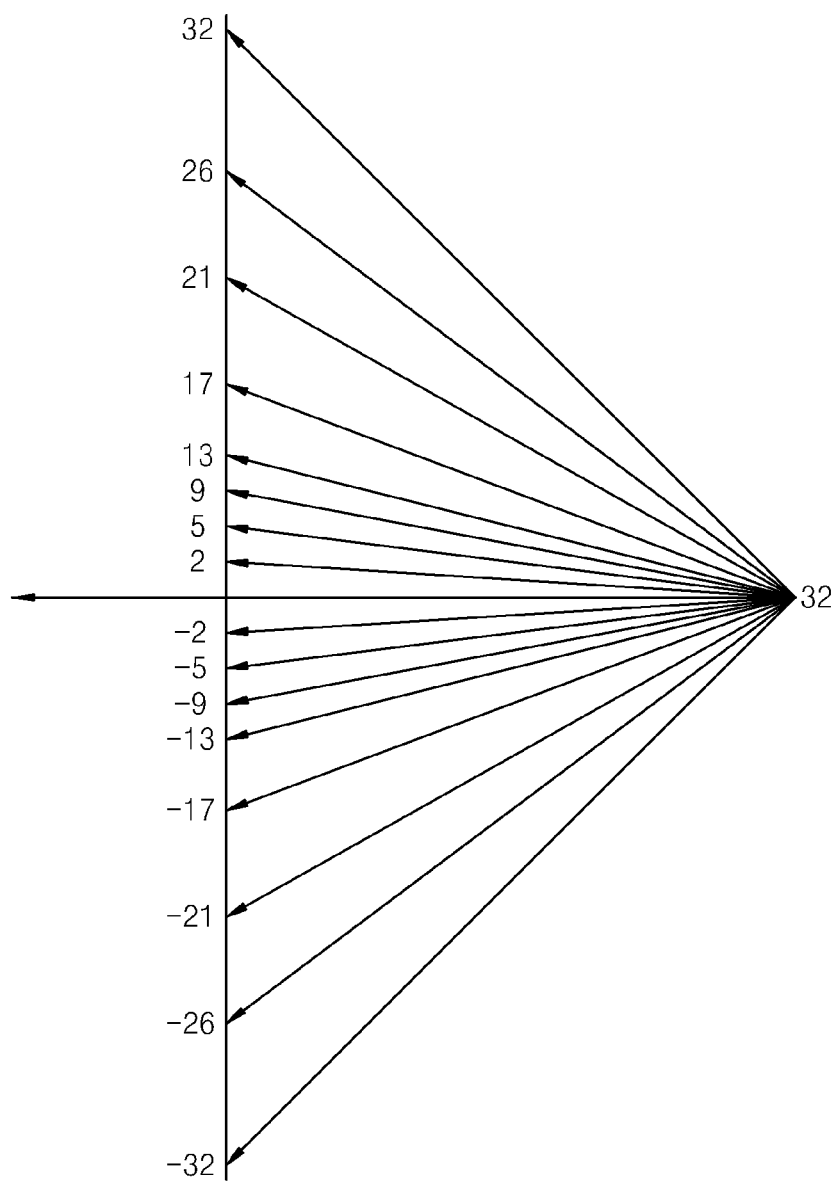

FIGS. 22 and 23 are diagrams for describing a method of determining an intra prediction mode direction, according to an exemplary embodiment.

In general, linear patterns in an image or video signal are vertical or horizontal in many cases. Accordingly, when an intra prediction mode having various directionalities is defined by using (dx, dy) parameters, image encoding efficiency may be improved by defining values of dx and dy as follows.

In detail, when dy has a fixed value of $2^m$, an absolute value of dx may be set such that an interval between prediction directions close to a vertical direction is narrow and an interval between prediction directions close to a horizontal direction is wide. For example, referring to FIG. 22, when dy is $2^5$, that is, has a value of 32, a value of dx may be set to 2, 5, 9, 13, 17, 21, 26, 32,−2,−5,−9,−13,−17,−21,−26, and −32 such that an interval between prediction directions close to a vertical direction is narrow and an interval between prediction directions close to a horizontal direction is wide.

Likewise, when dx has a fixed value of $2^n$, an absolute value of dy may be set such that an interval between prediction directions close to a horizontal direction is narrow and an interval between prediction directions close to a vertical direction is wide. For example, referring to FIG. 23, when dx is $2^5$, that is, has a value of 32, a value of dy may be set to 2, 5, 9, 13, 17, 21, 26, 32, −2, −5, −9, −13, −17, −21, −26, and −32 such that an interval between prediction directions close to a horizontal direction is narrow and an interval between prediction directions close to a vertical direction is wide.

When a value of any one of dx and dy is fixed, a non-fixed remaining value may be set to increase according to prediction modes. For example, when dy is fixed, an interval between values of dx may be set to increase by a predetermined value. Also, an angle between a horizontal direction and a vertical direction may be divided according to predetermined units, and an increased amount may be set according to the divided angles. For example, when dy is fixed, a value of dx may be set to have an increased width of a when an angle with respect to a vertical axis is less than 15°, an increased width of b when an angle ranges from 15 to 30°, and an increased width of c when an angle is equal to or greater than 30°.

For example, prediction modes having a directionality of tan−1(dy/dx) using (dx, dy) may define (dx, dy) parameters shown in Tables 3 through 5.

TABLE 3

| dx  | Dy | dx | dy  | dx | dy |
|-----|----|----|-----|----|----|
| −32 | 32 | 21 | 32  | 32 | 13 |
| −26 | 32 | 26 | 32  | 32 | 17 |
| −21 | 32 | 32 | 32  | 32 | 21 |
| −17 | 32 | 32 | −26 | 32 | 26 |
| −13 | 32 | 32 | −21 | 32 | 32 |
| −9  | 32 | 32 | −17 |    |    |
| −5  | 32 | 32 | −13 |    |    |
| −2  | 32 | 32 | −9  |    |    |
| 0   | 32 | 32 | −5  |    |    |
| 2   | 32 | 32 | −2  |    |    |
| 5   | 32 | 32 | 0   |    |    |
| 9   | 32 | 32 | 2   |    |    |
| 13  | 32 | 32 | 5   |    |    |
| 17  | 32 | 32 | 9   |    |    |

TABLE 4

| dx  | Dy | dx | dy  | dx | dy |
|-----|----|----|-----|----|----|
| −32 | 32 | 19 | 32  | 32 | 10 |
| −25 | 32 | 25 | 32  | 32 | 14 |
| −19 | 32 | 32 | 32  | 32 | 19 |
| −14 | 32 | 32 | −25 | 32 | 25 |
| −10 | 32 | 32 | −19 | 32 | 32 |
| −6  | 32 | 32 | −14 |    |    |
| −3  | 32 | 32 | −10 |    |    |
| −1  | 32 | 32 | −6  |    |    |
| 0   | 32 | 32 | −3  |    |    |
| 1   | 32 | 32 | −1  |    |    |
| 3   | 32 | 32 | 0   |    |    |
| 6   | 32 | 32 | 1   |    |    |
| 10  | 32 | 32 | 3   |    |    |
| 14  | 32 | 32 | 6   |    |    |

TABLE 5

| dx  | Dy | dx | dy  | dx | dy |
|-----|----|----|-----|----|----|
| −32 | 32 | 23 | 32  | 32 | 15 |
| −27 | 32 | 27 | 32  | 32 | 19 |
| −23 | 32 | 32 | 32  | 32 | 23 |
| −19 | 32 | 32 | −27 | 32 | 27 |
| −15 | 32 | 32 | −23 | 32 | 32 |
| −11 | 32 | 32 | −19 |    |    |
| −7  | 32 | 32 | −15 |    |    |
| −3  | 32 | 32 | −11 |    |    |
| 0   | 32 | 32 | −7  |    |    |
| 3   | 32 | 32 | −3  |    |    |
| 7   | 32 | 32 | 0   |    |    |
| 11  | 32 | 32 | 3   |    |    |
| 15  | 32 | 32 | 7   |    |    |
| 19  | 32 | 32 | 11  |    |    |

As described above, each of intra prediction modes using (dx, dy) parameters uses a left neighboring pixel having a location (−1, i+j*dy/dx) or an upper neighboring pixel having a location (j+i*dx/dy,−1) as a predictor of a pixel located on (j, i). When at least one of values of dx and dy has an exponential power of 2 as shown in Table 3, the location (−1, i+j*dy/dx) of the left neighboring pixel and the location (j+i*dx/dy,−1) of the upper neighboring pixel may be obtained by using only multiplication and shift operations without subtraction. Since subtraction using dx having a value of 2^n as shown in a case where dx from among values of (dx, dy) is 32 may be replaced with right shift operation, the location of the left neighboring pixel may be obtained without subtraction based on a value of (i*dy)>>n. Likewise, since subtraction using dy having a value of 2^m as shown in a case where dy from among values of (dx, dy) is 32 as shown in Table 3 may be replaced with a right shift operation, the location of the right neighboring pixel may be obtained without subtraction based on a value of (i*dx)>>m.

Figure 24:
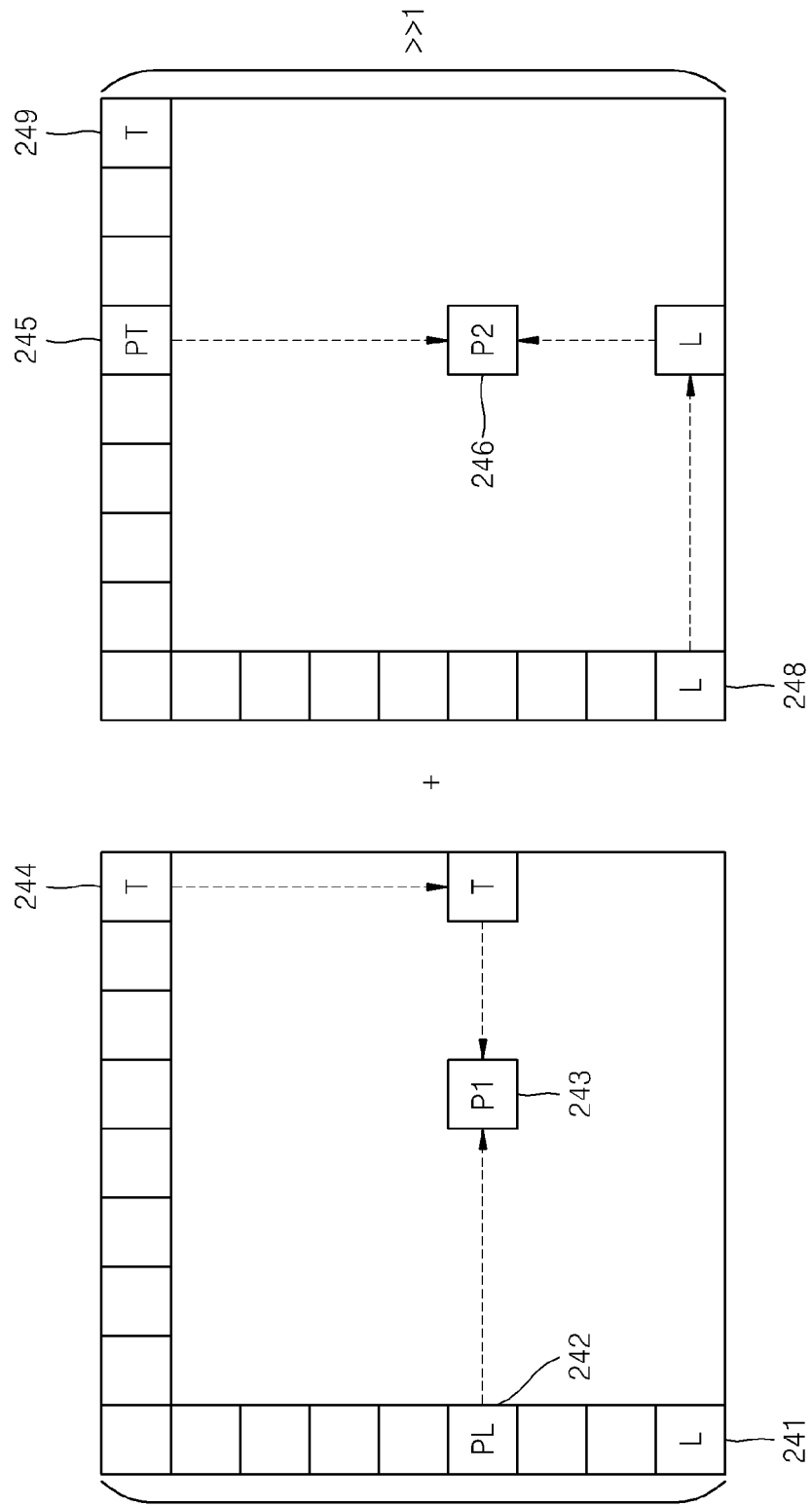
FIG. 24 is a reference diagram for describing an available intra prediction mode according to an exemplary embodiment.

FIG. 24 is a reference diagram for describing an available intra prediction mode according to an exemplary embodiment.

Referring to FIG. 24, in order to obtain a predictor of a current pixel, a predictor P1 obtained through horizontal linear interpolation of the current pixel and a predictor P2 obtained through vertical linear interpolation of the current pixel may be generated and an average value of the predictors P1 and P2 may be used as a predictor of the current pixel. An intra prediction mode of FIG. 24 is defined as a planar mode. According to the planar mode, pixels on a rightmost column are generated by copying a rightmost pixel T 244 from among pixels of the same prediction unit which are located on an uppermost column of the prediction unit to pixels of the rightmost column. A predictor P1 243 is obtained through horizontal linear interpolation using pixels of a leftmost column and a rightmost column which are located on the same row as the current pixel. As shown in FIG. 24, the predictor P1 243 through the horizontal linear interpolation of the current pixel is obtained by using linear interpolation, for example, a geometric average value considering a distance or an average value, of the generated pixel T of the rightmost column by copying a pixel PL 242 and the pixel 244 in the same prediction unit of the leftmost column which are located on the same location as the current pixel.

Likewise, according to the planar mode, pixels of a lowermost column are generated by copying the pixel L 248 which is located on a lowermost side from among pixels of the same prediction unit which are located on a leftmost column of a prediction unit to the pixels of the lowermost column. The predictor P 246 is obtained through vertical linear interpolation using pixels of an uppermost row and a lowermost row which are located on the same column as the current pixel. As shown in FIG. 24, the predictor P2 246 through vertical linear interpolation of the current pixel is obtained through linear interpolation of the generated pixel L of the lowermost row by copying a pixel PT 245 and the pixel L 248 in the same prediction unit of the uppermost row which are located on the same column as the current pixel. In the planar mode, an average value of the horizontal predictor P 243 and the vertical predictor P2 246, that is, P1+P2>>1, is determined as a final predictor of the current pixel.

Figure 25A:
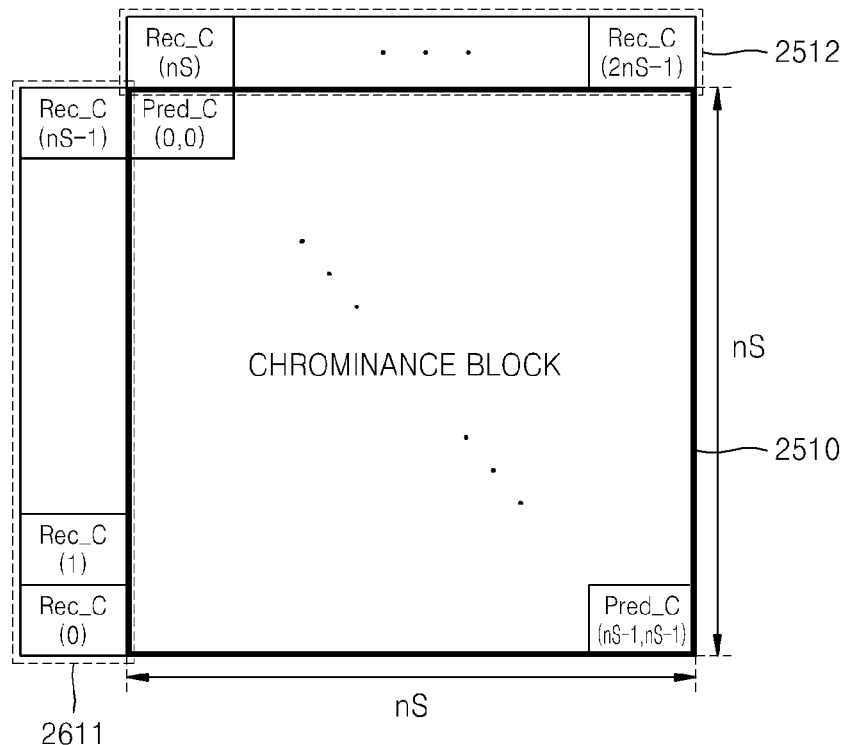
FIGS. 25A and 25B are reference diagrams for describing an intra prediction mode according to another exemplary embodiment.
Figure 25B:
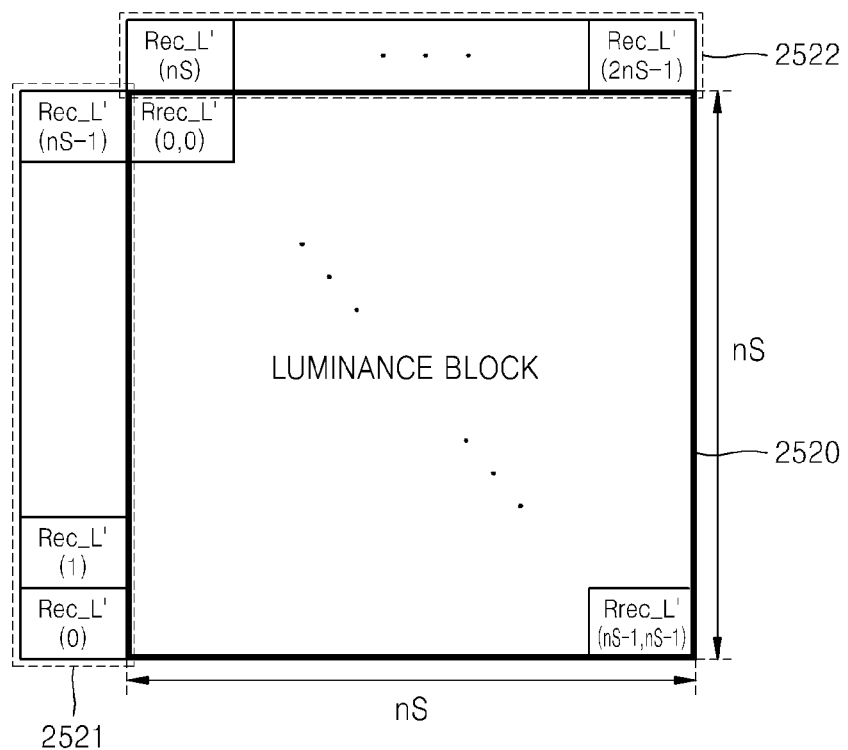

FIGS. 25A and 25B are reference diagrams for describing an intra prediction mode according to another exemplary embodiment.

There is a predetermined correlation, for example, a linear correlation, between corresponding luminance pixels and chrominance pixels. Referring to FIGS. 25A and 25B, when a pixel at a location (x, y) of a luminance block 2520 which is previously restored is Rec_L'(x,y), a prediction value Pred_c(x,y) at the location (x, y) of a chrominance block 2510 may be obtained by using a linear relationship between a luminance signal and a chrominance signal by using Equation 4.

$$\text{Pred\_}c(x,y) = a \cdot \text{Rec\_}L'(x,y) + b \qquad [\text{Equation 4}]$$

In Equation 4, "a" is a parameter indicating a weight and "b" is a parameter indicating an offset. Values of the parameters "a" and "b" may be obtained through calculation using neighboring pixels 2511 and 2522 Rec_L'(i) of the luminance block 2520 and neighboring pixels 2511 and 2512 Rec_c(i) (i=0, ... , 2nS−1) of the chrominance block 2510 as shown in Equations 5 and 6.

$$a = \frac{I \cdot \sum_{i=0}^{I-1} \text{Rec\_c}(i) \cdot \text{Rec\_L}'(i) - \sum_{i=0}^{I-1} \text{Rec\_c}(i) \cdot \sum_{i=0}^{I-1} \text{Rec\_L}'(i)}{I \cdot \sum_{i=0}^{I-1} \text{Rec\_L}'(i) \cdot \text{Rec\_L}'(i) - \left(\sum_{i=0}^{I-1} \text{Rec\_L}'(i)\right)^2} = \frac{A1}{A2}$$

[Equation 5]

$$b = \frac{\sum_{i=0}^{I-1} \text{Rec\_c}(i) - a \cdot \sum_{i=0}^{I-1} \text{Rec\_L}'(i)}{I}$$

[Equation 6]

In Equations 5 and 6, "I" is the number of neighboring pixels adjacent to an upper side and a left side of the chrominance block 2510 or the luminance block 2520. When sizes of the chrominance block 2510 and the luminance block 2520 are nS×nS as shown in FIGS. 25A and 25B, the number "I" is 2nS. Although upper and left pixels are used as neighboring pixels in FIGS. 25A and 25B, if right or lower neighboring pixels are processed and restored prior to a current block, the right or left neighboring pixels may be used to obtain values of the parameters "a" and "b". Also, in order to replace multiplication or subtraction with a shift operation, the number "I" of neighboring pixels may be an exponential power of 2. In general, since a value of ns which defines a size of a block is an exponential power of 2, the number "I" has a value of an exponential power of 2. Values of "a" and "b" which are changed through up-scaling or rounding to reduce calculation complexity when a value of the parameter "a" or "b" is obtained by using Equations 5 and 6 may be used instead of the parameters "a" and "b". Intra prediction modes of FIGS. 25A and 25B may be defined as linear model intra prediction modes and may be used as one of intra prediction modes of prediction units.

As described above with reference to FIGS. 18A through 25B, the number of available intra prediction modes is not limited and an intra prediction mode applied to a prediction unit of a luminance component or an intra prediction mode applied to a prediction unit of a chrominance component may be selectively used. For example, an intra prediction mode candidate group applied to a prediction unit of a luminance component may include 35 intra prediction modes including 33 intra prediction modes using 33 (dx, dy) parameters shown in Table 3, a DC prediction mode, and a planar mode of FIG. 24. An intra prediction mode candidate group applied to a prediction unit of a chrominance component is set to have a smaller number of intra prediction modes than the intra prediction mode candidate group applied to the prediction unit of the chrominance component. For example, the intra prediction mode candidate group of the chrominance component may include only 5 intra prediction modes, that is, a vertical mode, a horizontal mode, a DC mode, a 45°-diagonal mode, and an intra prediction mode of a luminance component which is previously processed and determined. However, the number and types of intra prediction modes applied to prediction units of a luminance component and a chrominance component are not limited thereto. Also, various intra prediction modes other than the intra prediction modes described with reference to FIGS. 18A through 25B may be included in intra prediction mode candidates for intra prediction of a chrominance component and a luminance component.

A process of encoding an intra prediction mode of a prediction unit of an image will be explained in detail.

Figure 26:
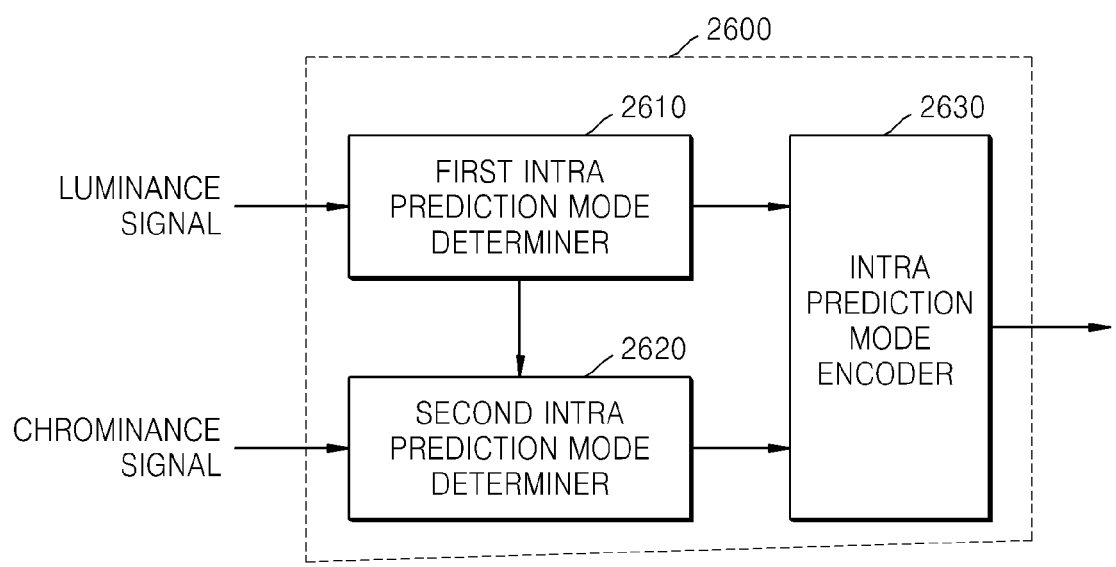
FIG. 26 is a block diagram illustrating an apparatus for encoding an intra prediction mode of an image, according to an exemplary embodiment.
Figure 27:
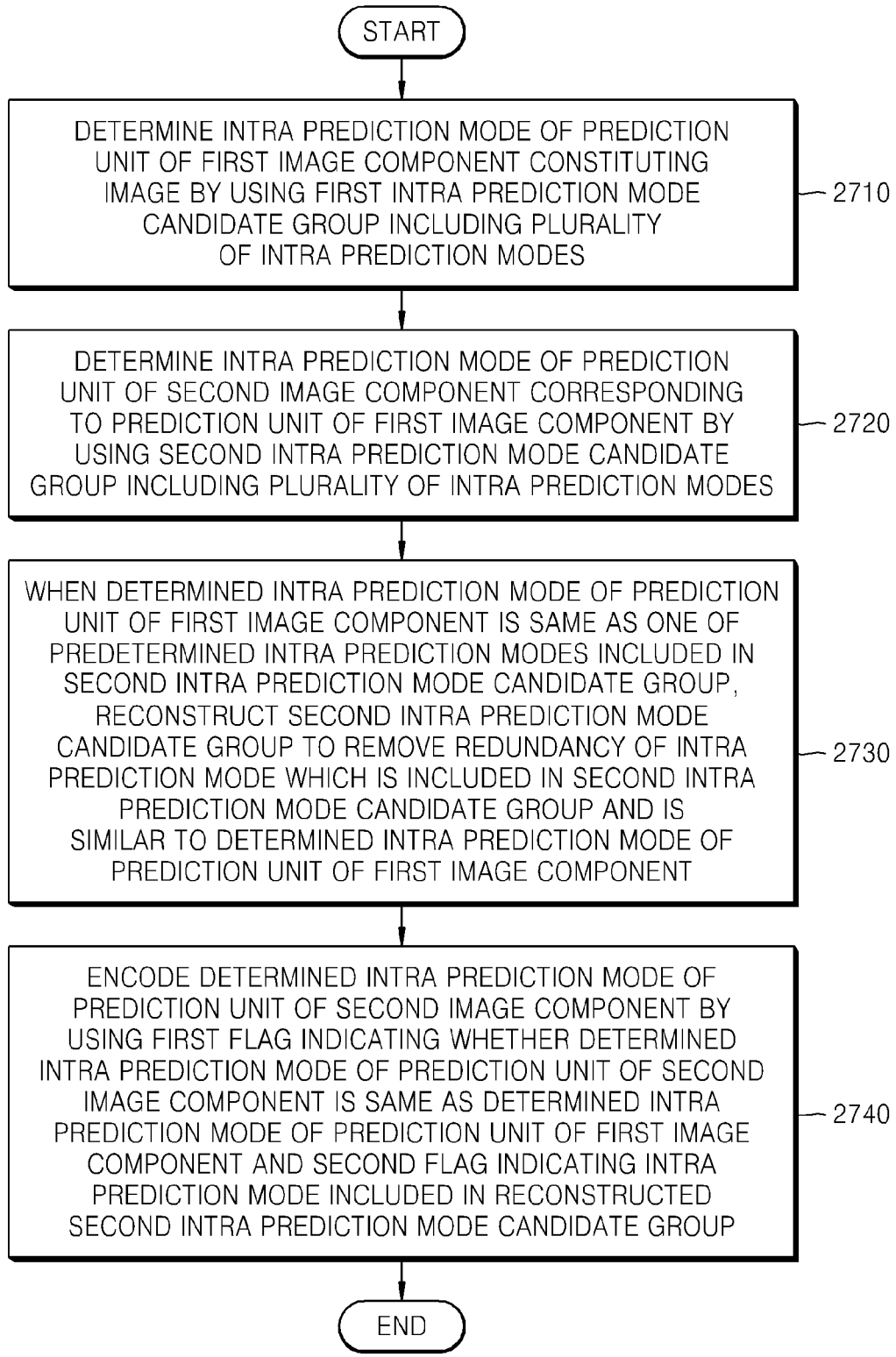
FIG. 27 is a flowchart illustrating a method of encoding an intra prediction mode of an image, according to an exemplary embodiment.

FIG. 26 is a block diagram illustrating an apparatus 2600 for encoding an intra prediction mode of an image, according to an exemplary embodiment. FIG. 27 is a flowchart illustrating a method of encoding an intra prediction mode of an image, according to an exemplary embodiment. The apparatus 2600 may operate as the intra predictor 410 of the apparatus 400 of FIG. 4. An intra prediction mode encoder 2630 in FIG. 26 may be included in the entropy encoder 450 of FIG. 4, instead of the intra predictor 410.

Referring to FIGS. 26 and 27, the apparatus 2600 includes a first intra prediction mode determiner 2610, a second intra prediction mode determiner 2620, and an intra prediction mode encoder 2630.

In operation 2710, the first intra prediction mode determiner 2610 determines an intra prediction mode having a minimum cost an intra prediction mode candidate group including a plurality of intra prediction modes as an intra prediction mode of a prediction unit of a luminance component by using intra prediction modes applicable to the prediction unit of the luminance component. For example, when an intra prediction mode candidate group applicable to the prediction unit of the luminance component includes 35 intra prediction modes including 33 intra prediction modes using (dx, dy) parameters, a DC prediction mode, and a planar mode, the first intra prediction mode determiner 2610 compares costs of error values obtained by using the 35 intra prediction modes and determines an optimum intra prediction mode IntraMode_Luma applicable to a current prediction unit of a current luminance component.

In operation 2720, the second intra prediction mode determiner 2620 determines an intra prediction mode having a minimum cost in an intra prediction mode candidate group including a plurality of intra prediction modes as an intra prediction mode of a prediction unit of a chrominance component by using intra prediction modes applicable to the prediction unit of the chrominance component. For example, when an intra prediction mode candidate group applicable to the prediction unit of the chrominance component includes 5 intra prediction modes, that is, a planar mode, a vertical mode, a horizontal mode, a DC mode, and a 45°-diagonal mode, the second intra prediction mode determiner 2620 compares costs of error values obtained by using the intra prediction modes and determines an optimum intra prediction mode IntraMode_Chroma applicable to a current prediction unit of a current chrominance component.

When an intra prediction mode of a luminance component which is previously processed and determined is included in an intra prediction mode candidate group of a chrominance component, the number of intra prediction modes of the chrominance component which are compared may be changed according to whether an intra prediction mode of a chrominance component which is same as an intra prediction mode of a luminance component exists in the intra prediction mode candidate group of the chrominance component.

Also, only an intra prediction mode candidate group applicable to a prediction unit of a chrominance component basically includes a planar mode, a vertical mode, a horizontal mode, and a DC mode, and a determined intra prediction mode of a prediction unit of a luminance component corresponds to one of the planar mode, the vertical mode, the horizontal mode, and the DC mode, an intra prediction mode candidate group applicable to the prediction unit of the chrominance component may be determined by replacing a mode which is same as the intra prediction mode of the prediction unit of the luminance component with a diagonal mode. In this case, the second intra prediction mode determiner 2620 determines an optimum intra prediction mode IntraMode_Chroma by using the intra prediction modes of the intra prediction mode candidate group.

As described above, an intra prediction mode candidate group applied to a prediction unit of a chrominance component may include separately a specific intra prediction mode which is not applied to a prediction unit of a luminance component. For example, an intra prediction mode candidate group of a luminance component may not include an LM mode, and only an intra prediction mode candidate group of a chrominance component may include an LM mode. The second intra prediction mode determiner 2620 may determine an optimum intra prediction mode IntraMode_Chroma by applying each intra prediction mode in the intra prediction mode candidate group including the LM mode to the prediction unit of the chrominance component.

The determined intra prediction mode of the prediction unit of the chrominance component and the determined intra prediction mode of the prediction unit of the luminance component need to be signaled to a decoding side. Accordingly, the intra prediction mode encoder 2630 encodes final intra prediction modes applied to the prediction unit of the chrominance component and the prediction unit of the luminance component. In particular, in operation 2730, when the intra prediction mode of the prediction unit of the luminance component is the same as one of predetermined intra prediction modes included in an intra prediction mode candidate group of the chrominance component, the intra prediction mode encoder 2630 reconstructs the intra prediction mode candidate group of the prediction unit of the chrominance component to reduce redundancy of the intra prediction mode included in the intra prediction mode candidate group applied to the prediction unit of the chrominance component which is same as the intra prediction mode of the prediction unit of the luminance component. In operation 2740, the intra prediction mode encoder 2630 encodes the intra prediction mode of the prediction unit of the chrominance component determined by the second intra prediction mode determiner 2620 based on the reconstructed intra prediction mode candidate group of the prediction unit of the chrominance component. The intra prediction mode encoder 2630 encodes differently intra prediction mode information of the chrominance component according to whether the intra prediction mode of the prediction unit of the luminance component is the same as the intra prediction mode of the prediction unit of the chrominance component and whether the intra prediction mode of the prediction unit of the luminance component is the same as one of the predetermined intra prediction modes included in the intra prediction mode candidate group of the chrominance component as well as an index indicating the intra prediction mode of the prediction unit of the luminance component.

In detail, when the intra prediction mode of the prediction unit of the luminance component is the same as the intra prediction mode of the prediction unit of the chrominance component, the intra prediction mode encoder 2630 encodes only a flag DM flag indicating whether the intra prediction mode of the prediction unit of the chrominance component is the same as the intra prediction mode of the prediction unit of the luminance component as intra prediction mode information about the prediction unit of the chrominance component. For example, when the determined intra prediction mode of the prediction unit of the luminance component and the determined intra prediction mode of the prediction unit of the chrominance component are horizontal modes H, the intra prediction mode encoder 2630 encodes an index and a flag DM flag indicating the intra prediction mode of the prediction unit of the luminance component as intra prediction mode information.

Assuming that the intra prediction mode of the prediction unit of the luminance component is not the same as the intra prediction mode of the prediction unit of the chrominance component and is the same as one of the predetermined intra prediction modes included in the intra prediction mode candidate group of the chrominance component, when the intra prediction mode candidate group of the chrominance component is reconstructed, the intra prediction mode encoder 2630 encodes an index indicating the corresponding intra prediction mode in the reconstructed intra prediction mode candidate group and a flag DM flag.

Assuming that the intra prediction mode of the prediction unit of the luminance component and the intra prediction mode of the prediction unit of the chrominance component are not the same and the intra prediction mode of the prediction unit of the luminance component is not the same as any one of the predetermined intra prediction modes included in the intra prediction mode candidate group of the chrominance component, the intra prediction mode encoder 2630 encodes an index indicating the corresponding intra prediction mode in the initially set intra prediction mode candidate group and a flag DM flag.

If a specific intra prediction mode, for example, the LM mode, which is not applied to the prediction unit of the luminance component in the intra prediction mode candidate group applied to the prediction unit of the chrominance component is applied to only the chrominance component, a flag (LM flag) indicating whether the intra prediction mode of the prediction unit of the chrominance component is the LM mode may be included as intra prediction mode information about the prediction unit of the chrominance component. When the LM mode is included as the prediction unit of the chrominance component and the intra prediction mode of the prediction unit of the chrominance component is the LM mode, the intra prediction mode encoder 2630 encodes only a DM flag and an LM flag.

When the intra prediction mode of the prediction unit of the luminance component and the intra prediction mode of the prediction unit of the chrominance component are not the same, and the intra prediction mode of the prediction unit of the chrominance component is not the LM mode, the intra prediction mode encoder 2630 encodes index information indicating the intra prediction mode of the prediction unit of the chrominance component, the DM flag, and the LM flag. In this case, assuming that the intra prediction mode of the prediction unit of the luminance component is the same as one of the predetermined intra prediction modes included in the intra prediction mode candidate group of the chrominance component, when the intra prediction mode candidate group of the chrominance component is reconstructed, the intra prediction mode encoder 2630 encodes the LM flag, the DM flag and the index indicating the corresponding intra prediction mode in the reconstructed intra prediction mode candidate group.

A process of encoding an intra prediction mode of a prediction unit of a chrominance component will be explained in detail with reference to FIG. 28.

Figure 28:
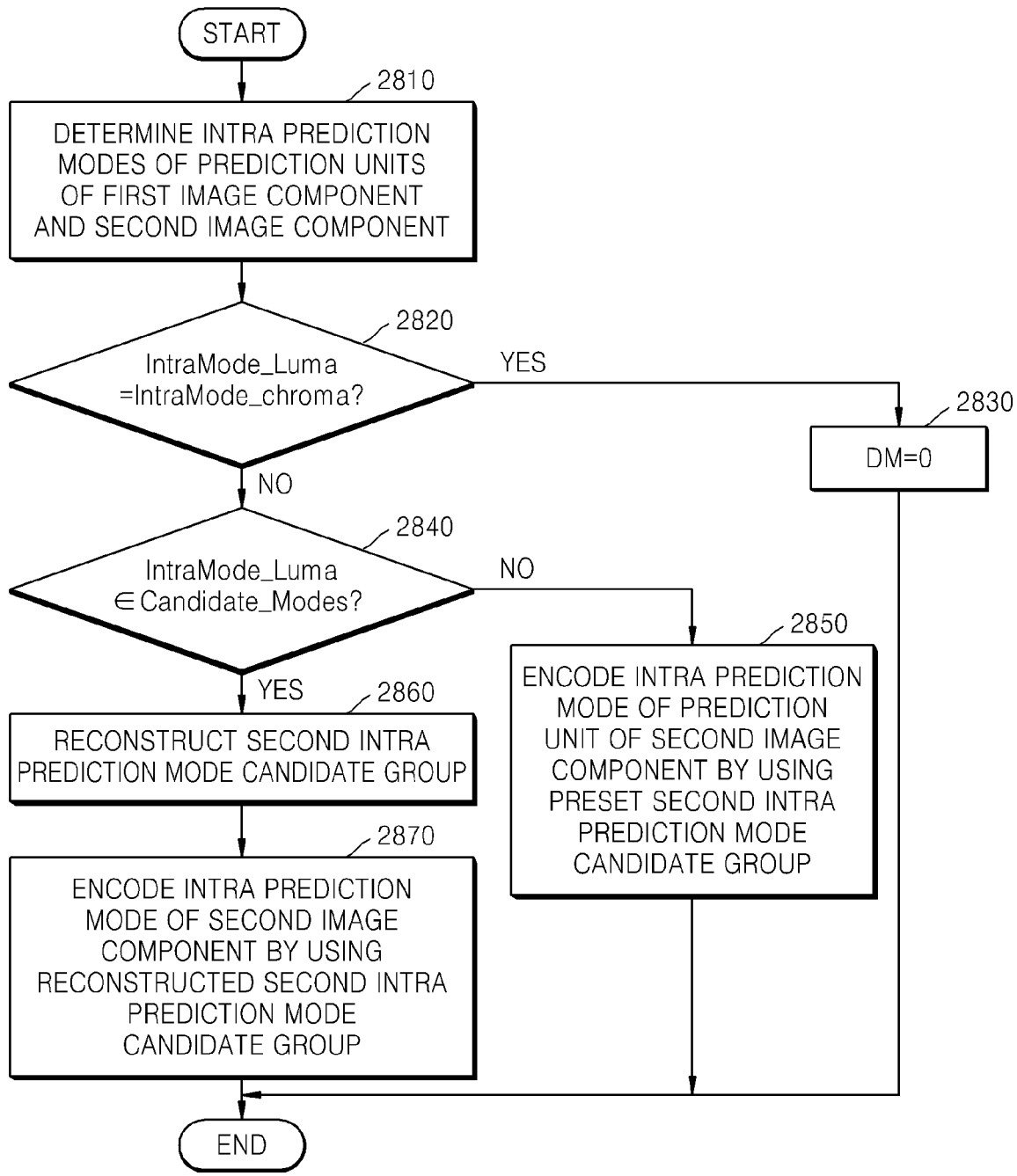
FIG. 28 is a flowchart illustrating a process of encoding an intra prediction mode of an image, according to an exemplary embodiment.

FIG. 28 is a flowchart illustrating a process of encoding an intra prediction mode of an image, according to an exemplary embodiment.

Referring to FIGS. 26 and 28, in operation 2810, the first intra prediction mode determiner 2610 and the second intra prediction mode determiner 2620 determine intra prediction modes of a prediction unit of a chrominance component and a prediction unit of a luminance component by using a plurality of available intra prediction modes. As described above, it is assumed that an intra prediction mode candidate group applicable to a prediction unit of a luminance component includes 35 intra prediction modes including 33 intra prediction modes using (dx, dy) parameters, a DC prediction mode, and a planar mode, and an intra prediction candidate group applicable to a prediction unit of a chrominance component includes 5 intra prediction units including a planar mode, a vertical mode, a horizontal mode, a DC mode, and a 45°-diagonal mode. As described above, an intra prediction mode applicable to a chrominance component may include an intra prediction mode (derived mode, hereinafter, referred to as a "DM mode") of a luminance component which is previously processed and determined. The DM mode is the same as IntraMode_Luma. The intra prediction mode encoder 2630 assigns a predetermined code word to each of the 35 intra prediction modes applicable to the prediction unit of the luminance component, and encodes a code word corresponding to the determined intra prediction mode IntraMode_Luma of the prediction unit of the luminance component. An Exp-Golomb (Exponential Goloms) code may be used as a code word.

In operation 2820, the intra prediction mode encoder 2630 determines whether the determined intra prediction mode IntraMode_Luma of the prediction unit of the luminance component is the same as the corresponding intra prediction mode IntraMode_Chroma of the prediction unit of the chrominance component. If the intra prediction mode IntraMode_Luma of the prediction unit of the luminance component is the same as the corresponding intra prediction mode IntraMode_Chroma of the prediction unit of the chrominance component, the method proceeds to operation 2830. In operation 2830, the intra prediction mode encoder 2630 sets to 0 a flag DM flag indicating whether the intra prediction mode of the prediction unit of the chrominance component is the same as the intra prediction mode of the prediction unit of the luminance component. When the flag DM flag is 0, it means that the intra prediction mode of the prediction unit of the luminance component is the same as the prediction mode of the chrominance component. When the flag DM flag is 1, it means that the intra prediction mode of the prediction unit of the luminance component is different from the intra prediction mode of the prediction unit of the chrominance component. A value of the flag DM flag may be set in an opposite way. As such, assuming that the flag DM flag is 0, that is, when the intra prediction mode of the prediction unit of the luminance component is the same as the prediction mode of the chrominance component, when only the flag DM flag is encoded and transmitted to a decoding side and the decoding side receives the flag DM flag having a value of 0, the corresponding intra prediction mode of the prediction unit of the chrominance component may be determined from the intra prediction mode of the prediction unit of the luminance component which is first decoded. For example, when the intra prediction modes of the prediction unit of the chrominance component and the prediction unit of the luminance component are horizontal modes, the intra prediction mode encoder 2630 encodes only the flag DM flag and intra prediction mode information IntraMode_Luma of the prediction unit of the luminance component.

When it is determined in operation 2820 that the intra prediction mode IntraMode_Luma of the prediction unit of the luminance component is not the same as the corresponding intra prediction mode IntraMode_Chroma of the prediction unit of the chrominance component, the intra prediction mode encoder 2630 has to encode a separate intra prediction mode applied to the prediction unit of the chrominance component. In operation 2840, the intra prediction mode encoder 2630 determines whether the intra prediction mode IntraMode_Luma of the prediction unit of the luminance component is included in predetermined intra prediction modes Candidate_Modes in an intra prediction mode candidate group of the prediction unit of the luminance component. For example, when the intra prediction mode candidate group applicable to the prediction unit of the chrominance component includes 5 intra prediction modes including a planar mode, a vertical mode, a horizontal mode, a DC mode, and a 45°-diagonal mode, the intra prediction mode encoder 2630 determines whether the intra prediction mode IntraMode_Luma of the prediction unit of the luminance component corresponds to one of the 5 intra prediction modes. Alternatively, when the intra prediction mode candidate group applicable to the prediction unit of the chrominance component basically includes a planar mode, a vertical mode, a horizontal mode, and a DC mode, and uses a diagonal mode instead of a mode which is same as the intra prediction mode of the prediction unit of the luminance component only when the intra prediction mode of the prediction unit of the luminance component corresponds to one of the planar mode, the vertical mode, the horizontal mode, and the DC mode, the intra prediction mode encoder 2630 determines whether the intra prediction mode of the prediction unit of the luminance component corresponds to one of the planar mode, the vertical mode, the horizontal mode, and the DC mode.

When it is determined in operation 2840 that the intra prediction mode IntraMode_Luma of the prediction unit of the luminance component is not included in the predetermined intra prediction modes Candidate_Modes, the method proceeds to operation 2850. In operation 2850, the intra prediction mode encoder 2630 encodes the intra prediction mode of the prediction unit of the chrominance component by using a second intra prediction mode candidate group applied to the present component which is preset. For example, a predetermined index may be preset as shown in Table 6 in each of intra prediction modes included in the second intra prediction mode candidate group applied to the chrominance component.

TABLE 6

| Intra prediction mode of chrominance component | Code word |
| --- | --- |
| Planar mode | 0 |
| Vertical mode | 10 |
| Horizontal mode | 110 |
| DC mode | 1110 |
| Diagonal mode | 1111 |

When it is determined that the intra prediction mode IntraMode_Luma of the prediction unit of the luminance component is not included in the predetermined intra prediction modes Candidate_Modes, the intra prediction mode encoder 2630 encodes the intra prediction mode of the prediction unit of the chrominance component by using the predetermined index as shown in Table 6. For example, when the intra prediction mode IntraMode_Luma of the prediction unit of the luminance component is not included in the predetermined intra prediction modes Candidate_Modes because the intra prediction mode IntraMode_Luma of the prediction unit of the luminance component is a prediction mode which has a directionality using (−13,32) as (dx, dy) as shown in Table 3, the intra prediction mode encoder 2630 encodes the intra prediction mode of the prediction unit of the chrominance component by using the predetermined index as shown in Table 6. The code word, number and types of intra prediction modes of chrominance component may be changed.

When it is determined in operation 2840 that the intra prediction mode IntraMode_Luma of the prediction unit of the luminance component is included in the predetermined intra prediction modes Candidate_Modes, the method proceeds to operation 2860. In operation 2860, the intra prediction mode encoder 2630 reconstructs an intra prediction mode candidate group applied to the prediction unit of the chrominance component to remove redundancy of the intra prediction mode included in the intra prediction mode candidate group of the prediction unit of the chrominance component which is same as the intra prediction mode of the prediction unit of the luminance component. For example, when the intra prediction mode IntraMode_Luma of the prediction unit of the luminance component is a DC mode, the intra prediction mode IntraMode_Chroma of the prediction unit of the chrominance component is a horizontal mode, and the predetermined intra prediction modes Candidate_Modes are a planar mode, a vertical mode, a horizontal mode, and a DC mode, the DC mode which is the intra prediction mode IntraMode_Luma of the prediction unit of the luminance component corresponds to one of the predetermined intra prediction modes Candidate_Modes applicable to the chrominance component. In this case, since the DC mode may be obtained from the intra prediction mode of the prediction unit of the luminance component in Table 6, a separate code word does not need to be assigned. Accordingly, according to the present exemplary embodiment, when the intra prediction mode IntraMode_Luma of the prediction unit of the luminance component is included in the predetermined intra prediction modes Candidate_Modes of the prediction unit of the luminance component, since the intra prediction mode which is similar to the intra prediction mode of the prediction unit of the luminance component and is included in the intra prediction mode candidate group of the prediction unit of the chrominance component may be replaced with an intra prediction mode other than the predetermined intra prediction modes Candidate_Modes or the redundant intra prediction mode may be signaled through the DM flag, the second intra prediction mode candidate group may be reconstructed by removing the redundant intra prediction mode of the chrominance component and an index indicating each intra prediction mode may be assigned based on the reconstructed second intra prediction mode candidate group.

In detail, when the intra prediction mode IntraMode_Luma of the prediction unit of the luminance component corresponds to one of the predetermined intra prediction modes Candidate_Modes applicable to the chrominance component, the intra prediction mode encoder 2630 may replace the prediction mode included in the intra prediction mode candidate group of the chrominance with an intra prediction mode not included in the predetermined intra prediction modes Candidate_Modes. For example, when the intra prediction mode candidate group applied to the prediction unit of the chrominance component basically includes a planar mode, a vertical mode, a horizontal mode, and a DC mode, and the determined intra prediction mode of the prediction unit of the luminance component corresponds to one of the planar mode, the vertical mode, the horizontal mode, and the DC mode, a mode which is same as the intra prediction mode of the prediction unit of the luminance component may be replaced with a diagonal mode. It is assumed that a code word is assigned as shown in Table 7 only to the predetermined intra prediction modes Candidate_Modes, that is, a planar mode, a vertical mode, a horizontal mode, and a DC mode, in the intra prediction mode candidate group of the prediction unit of the chrominance component.

TABLE 7

| Intra prediction mode of chrominance component | Code word |
|---|---|
| Planar mode | 0 |
| Vertical mode | 10 |
| Horizontal mode | 110 |
| DC mode | 111 |

When the DC mode which is the intra prediction mode IntraMode_Luma of the prediction unit of the luminance component is same as the DC mode from among the predetermined intra prediction modes Candidate_Modes applicable to the chrominance component, the DC mode is replaced with a diagonal mode, and Table 7 is reconstructed as Table 8.

TABLE 8

| Intra prediction mode of chrominance component | Code word |
|---|---|
| Planar mode | 0 |
| Vertical mode | 10 |
| Horizontal mode | 110 |
| Diagonal mode | 111 |

Also, when the intra prediction mode IntraMode_Luma of the prediction unit of the luminance component corresponds to one of the predetermined intra prediction modes Candidate_Modes applicable to the prediction unit of the chrominance component, the intra prediction mode encoder 2630 may remove a redundant intra prediction mode which is redundant in the intra prediction mode candidate group of the chrominance component. For example, when the intra prediction mode candidate group applicable to the prediction unit of the chrominance component includes 5 intra prediction modes including a planar mode, a vertical mode, a horizontal mode, a DC mode, and a 45°-diagonal mode, and the intra prediction mode IntraMode_Luma of the prediction unit of the luminance component is a diagonal mode, indices indicating the intra prediction mode candidate group of the chrominance component may remove the diagonal mode in Table 6 and may be reconstructed as shown in Table 9. In this case, since the number of intra prediction modes included in the intra prediction mode candidate group of the chrominance component is reduced, the number of bits which is a value of an index indicating each intra prediction mode may be reduced.

TABLE 9

| Intra prediction mode of chrominance component | Code word |
|---|---|
| Planar mode | 0 |
| Vertical mode | 10 |
| Horizontal mode | 110 |
| DC mode | 111 |

The encoding mode predictor 2630 may reduce the number of bits necessary to encode an intra prediction mode by assigning a code word only to (n–1) intra prediction modes in an intra prediction mode candidate group including n (n is an integer) intra prediction modes of the chrominance component, replacing an intra prediction mode which is same as an intra prediction mode of the prediction unit of the luminance component, and removing a redundant code word.

Also, the encoding mode predictor 2630 may not perform indexing by excluding the intra prediction mode which is same as the intra prediction mode of the luminance component in the intra prediction mode candidate group of the chrominance component which is preset from the intra prediction mode candidate group.

When the number of available intra prediction modes in the intra prediction mode candidate group of the chrominance component is n (n is a positive integer), the intra prediction encoder 2630 reconstructs the intra prediction mode candidate group of the chrominance component by replacing an intra prediction mode of the chrominance component which is same as the intra prediction mode of the luminance component from among the (n–1) predetermined intra prediction modes Candidate_Modes which are preset with a remaining one intra prediction mode.

Alternatively, operation 2860 in which the intra prediction mode candidate group of the prediction unit of the chrominance component may be performed by excluding an intra prediction mode of the chrominance component which is same as the intra prediction mode of the luminance component and assigning a code word only to remaining intra prediction modes. For example, when the intra prediction mode IntraMode_Luma of the prediction unit of the luminance component is a DC mode, the intra prediction mode IntraMode_Chroma of the prediction unit of the chrominance component is a horizontal mode, the predetermined intra prediction modes Candidate_Modes are a vertical mode, a horizontal mode, a DC mode, and a DM mode, the DC mode which is the intra prediction mode IntraMode_Luma of the prediction unit of the luminance component corresponds to one of the predetermined intra prediction modes Candidate_Modes applicable to the chrominance component. In this case, when a separate code word is assigned although the DC mode in Table 6 may be obtained from the intra prediction mode of the prediction unit of the luminance component, the number of bits used to encode a prediction mode may be increased by assigning a separate code word to a redundant prediction mode. Accordingly, it is preferable that a code word is assigned only to intra prediction modes other than the DC mode. That is, the intra prediction mode encoder 2630 may encode the intra prediction mode of the chrominance component by assigning a code word only to 4 intra prediction modes other than the DC mode in Table 9.

Referring back to FIG. 28, in operation 2870, the intra prediction mode encoder 2630 encodes the intra prediction mode of the chrominance component by using the reconstructed intra prediction mode candidate group of the prediction unit of the chrominance component. When the intra prediction mode candidate group of the chrominance component is reconstructed, the intra prediction mode encoder 2630 encodes a code word corresponding to the intra prediction mode of the prediction unit of the chrominance component as intra prediction mode information about the prediction unit of the chrominance component.

A process of decoding an intra prediction mode of a prediction unit of an image will be explained in detail.

Figure 29:
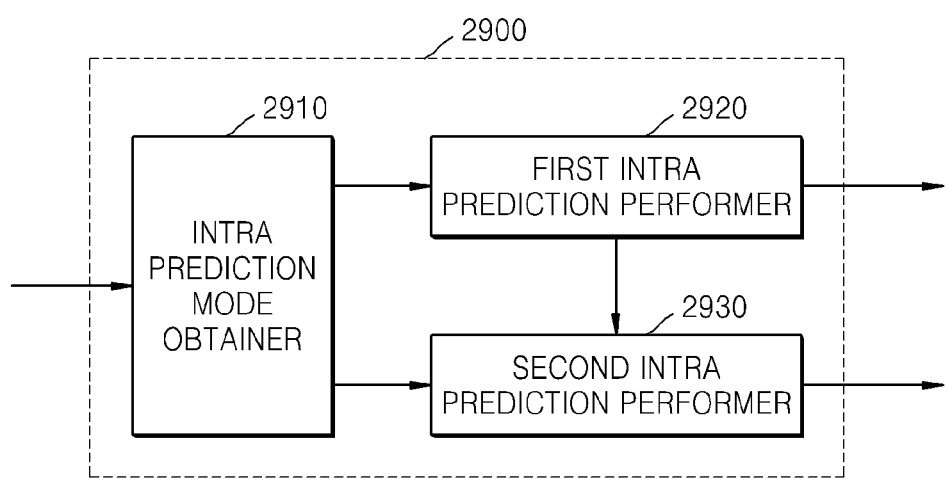
FIG. 29 is a block diagram illustrating an apparatus for decoding an intra prediction mode of an image, according to an exemplary embodiment.
Figure 30:
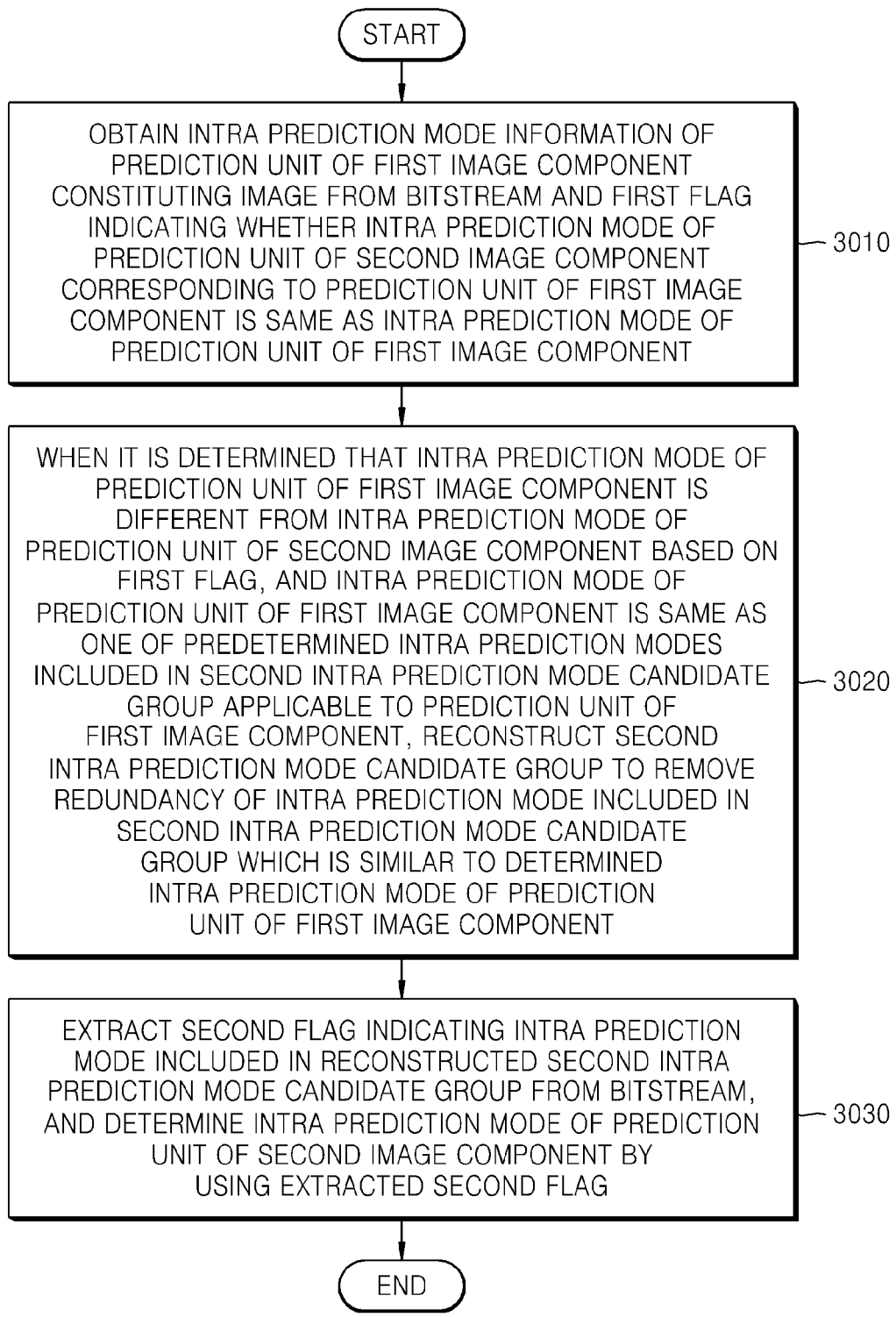
FIG. 30 is a flowchart illustrating a method of decoding an intra prediction mode of an image, according to an exemplary embodiment.

FIG. 29 is a block diagram illustrating an apparatus 2900 for decoding an intra prediction mode of an image, according to an exemplary embodiment. FIG. 30 is a flowchart illustrating a method of decoding an intra prediction mode of an image, according to an exemplary embodiment. The apparatus 2900 may operate as the intra predictor 550 of the apparatus 500 of FIG. 5. In FIG. 29, an intra prediction mode obtainer 2910 may be included in the parser 510 or the entropy decoder 520 of FIG. 5, instead of the intra predictor 550.

Referring to FIGS. 29 and 30, the apparatus 2900 includes the intra prediction mode obtainer 2910, a first intra prediction performer 2920, and a second intra prediction performer 2930.

In operation 3010, the intra prediction mode obtainer 2910 obtains intra prediction mode information IntraMode_Luma of a prediction unit of a luminance component constituting an image from a bitstream. Also, the intra prediction mode obtainer 2910 obtains a flag DM flag indicating whether the intra prediction mode IntraMode_Chroma of the prediction unit of the chrominance component corresponding to a prediction unit of a luminance component is the same as the intra prediction mode IntraMode_Luma of the prediction unit of the luminance component as intra prediction mode information of the prediction unit of the chrominance component.

In operation 3020, when it is determined that the intra prediction mode IntraMode_Luma of the prediction unit of the luminance component is the same as one of the predetermined intra prediction modes Candidate_Modes included in an intra prediction mode candidate group applicable to the prediction unit of the chrominance component, the intra prediction mode obtainer 2910 reconstructs the intra prediction mode candidate group of the chrominance component to remove redundancy of the intra prediction mode included in the intra prediction mode candidate group of the chrominance component which is same as the intra prediction mode IntraMode_Luma of the prediction unit of the luminance component.

In operation 3030, the intra prediction mode obtainer 2910 determines the intra prediction mode of the prediction unit of the chrominance component by using an index indicating one of the intra prediction modes included in the reconstructed intra prediction mode candidate group of the chrominance component which is obtained from the bitstream.

When the intra prediction mode obtainer 2910 determines the intra prediction modes of the prediction unit of the chrominance component and the prediction unit of the luminance component, the first intra prediction performer 2920 generates and outputs a prediction value of the prediction unit of the luminance component by performing intra prediction on the prediction unit of the luminance component, and the second intra prediction performer 2930 generates and outputs a prediction value of the prediction unit of the chrominance component by performing intra prediction on the prediction unit of the chrominance component.

Figure 31:
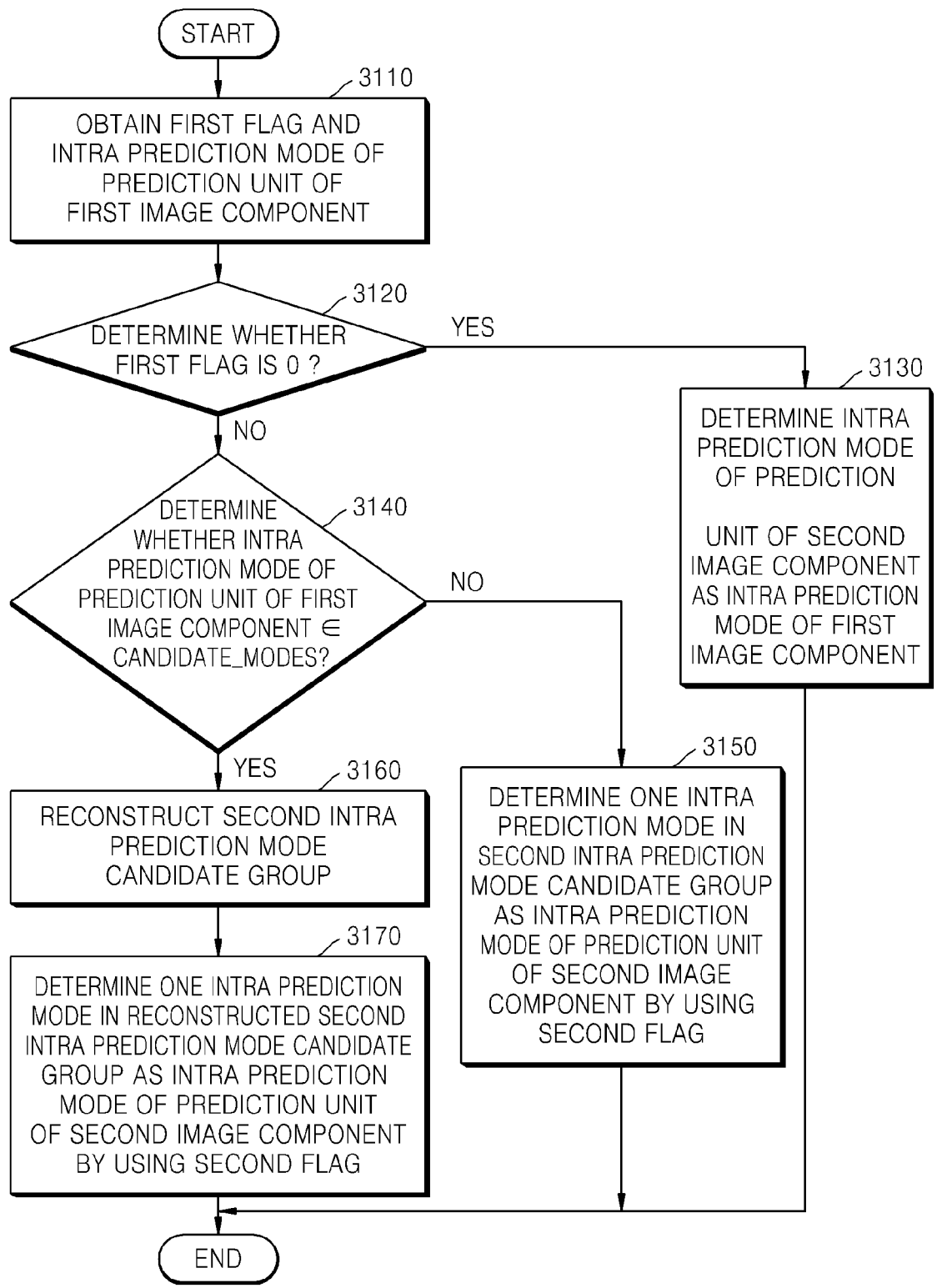
FIG. 31 is a flowchart illustrating a process of decoding an intra prediction mode of an image, according to an exemplary embodiment.

FIG. 31 is a flowchart illustrating a process of decoding an intra prediction mode of an image, according to an exemplary embodiment.

Referring to FIGS. 29 and 31, in operation 3110, the intra prediction mode obtainer 2910 obtains a flag DM indicating whether the intra prediction mode IntraMode_Luma of the prediction unit of the chrominance component and the intra prediction mode of the prediction unit of the luminance component are the same as the intra prediction mode IntraMode_Luma of the prediction unit of the luminance component from the bitstream.

In operation 3120, the intra prediction mode obtainer 2910 determines whether the intra prediction mode IntraMode_Chroma of the prediction unit of the chrominance component is the same as the intra prediction mode IntraMode_Luma of the prediction unit of the luminance component based on the flag DM.

When it is determined in operation 3120 that a value of the flag DM is 0, that is, when the intra prediction mode obtainer 2910 determines that the intra prediction mode IntraMode_Chroma of the prediction unit of the chrominance component is the same as the intra prediction mode IntraMode_Luma of the prediction unit of the luminance component, in operation 3130, the intra prediction mode obtainer 2910 sets the intra prediction mode of the prediction unit of the chrominance component to the intra prediction mode of the prediction unit of the luminance component. As such, when the flag DM is 0, that is, when the intra prediction mode of the prediction unit of the luminance component is the same as the prediction mode of the chrominance component, the intra prediction mode of the chrominance component may be determined by using only the flag DM.

When it is determined in operation 3120 that the intra prediction mode IntraMode_Luma of the prediction unit of the luminance component is not the same as the corresponding the intra prediction mode IntraMode_Chroma of the prediction unit of the chrominance component, the intra prediction mode obtainer 2910 determines whether the intra prediction mode IntraMode_Luma of the prediction unit of the luminance component is included in the predetermined intra prediction modes Candidate_Modes in the intra prediction mode candidate group applied to the prediction unit of the chrominance component. For example, when the intra prediction mode candidate group applicable to the prediction unit of the chrominance component includes 5 intra prediction modes including a planar mode, a vertical mode, a horizontal mode, a DC mode, and a 45°-diagonal mode, the intra prediction mode obtainer 2910 determines whether the intra prediction mode IntraMode_Luma of the prediction unit of the luminance component corresponds to one of the 5 intra prediction modes. Alternatively, when the intra prediction mode candidate group applied to the prediction unit of the chrominance component basically includes a planar mode, a vertical mode, a horizontal mode, and a DC mode, and a diagonal mode instead of a mode which is same as the intra prediction mode of the prediction unit of the luminance component is used only when the intra prediction mode of the prediction unit of the luminance component corresponds to only one of the predetermined intra prediction modes Candidate_Modes, for example, the planar mode, the vertical mode, the horizontal mode, and the DC mode, the intra prediction mode obtainer 2910 determines whether the intra prediction mode of the prediction unit of the luminance component corresponds to one of the planar mode, the vertical mode, the horizontal mode, and the DC mode. When it is determined in operation 3140 that the intra prediction mode IntraMode_Luma of the prediction unit of the luminance component is not included in the predetermined intra prediction modes Candidate_Modes, the method proceeds to operation 3150. In operation 3150, the intra prediction mode obtainer 2910 reads an index from the bitstream and determines the intra prediction mode of the chrominance component indicated by the read index. As described above, a predetermined code word may be preset as shown in Table 6 for intra prediction modes applied to the chrominance component, and the intra prediction mode obtainer 2910 may read from the bitstream the code word, that is, a value of an index, and may determine the intra prediction mode of a prediction unit of the chrominance component.

When it is determined in operation 3140 that the intra prediction mode IntraMode_Luma of the prediction unit of the luminance component is included in the predetermined intra prediction modes Candidate_Modes, the method proceeds to operation 3160. In operation 3160, the intra prediction mode obtainer 2910 reconstructs the intra prediction mode candidate group applied to the prediction unit of the chrominance component to remove redundancy of the intra prediction mode included in the intra prediction mode candidate group of the prediction unit of the chrominance component which is same as the intra prediction mode of the prediction unit of the luminance component. As described above, when the intra prediction mode IntraMode_Luma of the prediction unit of the luminance component is a DC mode, the intra prediction mode IntraMode_Chroma of the prediction unit of the chrominance component is a horizontal mode, and the predetermined intra prediction modes Candidate_Modes are a vertical mode, a horizontal mode, a DC mode and a DM mode, the DC mode which is the intra prediction mode IntraMode_Luma of the prediction unit of the luminance component corresponds to one of the predetermined intra prediction modes Candidate_Modes applicable to the chrominance component. In this case, since the DC mode in Table 6 may be obtained from the intra prediction mode of the prediction unit of the luminance component, a separate code word does not need to be assigned. Accordingly, when the intra prediction mode IntraMode_Luma of the prediction unit of the luminance component is included in the predetermined intra prediction modes Candidate_Modes of the prediction unit of the chrominance component, the intra prediction mode obtainer 2910 may reconstruct a second intra prediction mode candidate group by replacing the intra prediction mode which is same as the intra prediction mode of the prediction unit of the luminance component and is included in the intra prediction mode candidate group of the prediction unit of the chrominance component with an intra prediction mode other than the predetermined intra prediction modes Candidate_Modes or removing the redundant intra prediction mode of the chrominance component, and may determine an index indicating each intra prediction mode based on the reconstructed second intra prediction mode candidate group. A process of reconstructing the intra prediction mode candidate group of the prediction unit of the chrominance component may be the same as the aforesaid reconstruction method performed at an encoding side.

In detail, when the DC mode which is the intra prediction mode IntraMode_Luma of the prediction unit of the luminance component corresponds to one of the predetermined intra prediction modes Candidate_Modes applicable to the chrominance component, the intra prediction mode obtainer 2910 may replace the prediction mode included in the intra prediction mode candidate group of the chrominance component with an intra prediction mode not included in the predetermined intra prediction modes Candidate_Modes. For example, when the intra prediction mode candidate group applied to the prediction unit of the chrominance component basically includes a planar mode, a vertical mode, a horizontal mode, and a DC mode, and the determined intra prediction mode of the prediction unit of the luminance component corresponds to one of the planar mode, the vertical mode, the horizontal mode, and the DC mode, a mode which is same as the intra prediction mode of the prediction unit of the luminance component may be replaced with a diagonal mode. Assuming that a code word is assigned as shown in Table 7 to the predetermined intra prediction modes Candidate_Modes, that is, the vertical mode, the horizontal mode, the DC mode, and the DM mode, in the intra prediction mode candidate group of the prediction unit of the chrominance component, when the DC mode which is the intra prediction mode of the prediction unit of the luminance component is same as the DC mode of the predetermined intra prediction modes Candidate_Modes applicable to the chrominance component, the DC mode is replaced with a diagonal mode and is reconstructed as shown in Table 8. The intra prediction mode obtainer 2910 may determine whether an index of the intra prediction mode included in the bitstream indicates which intra prediction mode by using the reconstructed intra prediction mode candidate group.

Also, when the intra prediction mode IntraMode_Luma of the prediction unit of the luminance component corresponds to one of the predetermined intra prediction modes Candidate_Modes applicable to the prediction unit of the chrominance component, the intra prediction mode obtainer 2910 may remove an intra prediction mode which is redundant in the intra prediction mode candidate group of the chrominance component. For example, when the intra prediction mode candidate group applicable to the prediction unit of the chrominance component includes 5 intra prediction modes including a planar mode, a vertical mode, a horizontal mode, a DC mode, and a 45°-diagonal mode, and the intra prediction mode IntraMode_Luma of the prediction unit of the luminance component is a diagonal mode, indices indicating the intra prediction mode candidate group of the chrominance component may be reconstructed as shown in Table 9 by excluding the diagonal mode in Table 6. The intra prediction mode obtainer 2910 may determine whether the index of the intra prediction mode of the chrominance component included in the bitstream indicates which intra prediction mode by using the reconstructed intra prediction mode candidate group of the chrominance component. The encoding mode obtainer 2910 may reduce the number of bits necessary to decode an intra prediction mode by assigning a code word only to (n−1) intra prediction modes in an intra prediction mode candidate group including n (n is an integer) intra prediction modes of the chrominance component and replacing an intra prediction mode which is same as the intra prediction mode of the luminance component with one remaining intra prediction mode to remove a redundant code word. As described above, when the DC mode which is the intra prediction mode IntraMode_Luma of the prediction unit of the luminance component is same as the DC mode of the predetermined intra prediction modes Candidate_Modes applicable to the chrominance component, a code word of the DC mode may be used as a code word indicating the diagonal mode. As such, when the number of available intra prediction modes in the intra prediction mode candidate group of the chrominance component is n (n is a positive integer), the intra prediction mode obtainer 2910 reconstructs the intra prediction mode candidate group of the chrominance component by replacing an intra prediction of the chrominance component which is same as the intra prediction mode of the luminance component from among the preset (n−1) predetermined intra prediction modes Candidate_Modes with one remaining intra prediction mode.

Alternatively, operation 3160 in which the intra prediction mode candidate group of the prediction unit of the chrominance component is reconstructed may be performed by assigning a code word only to intra prediction modes other than the intra prediction mode of the chrominance component which is the same as the intra prediction mode of the luminance component. For example, when the intra prediction mode IntraMode_Luma of the prediction unit of the luminance component is a DC mode, the intra prediction mode IntraMode_Chroma of the prediction unit of the chrominance component is a horizontal mode, and the predetermined intra prediction modes Candidate_Modes are a vertical mode, a horizontal mode, a DC mode, and a DM mode, the DC mode which is the intra prediction mode IntraMode_Luma of the prediction unit of the luminance component corresponds to one of the predetermined intra prediction modes Candidate_Modes applicable to the chrominance component. In this case, since the DC mode in Table 6 may be obtained from the intra prediction mode of the prediction unit of the luminance component, a code word is assigned only to intra prediction modes other than the DC mode. That is, the intra prediction mode candidate group is reconstructed by assigning a code word only to remaining 4 intra prediction modes other than the DC mode as shown in Table 8.

Referring back to FIG. 31, in operation 3170, the intra prediction mode obtainer 2910 decodes the intra prediction mode of the chrominance component by using the reconstructed intra prediction mode candidate group of the prediction unit of the chrominance component and the index obtained from the bitstream. When the intra prediction mode candidate group of the chrominance component is reconstructed, the index indicates information (code word) about the intra prediction mode applied to the current prediction unit of the chrominance component in the reconstructed intra prediction mode candidate group of the chrominance component through the same process as that performed on the encoding side, and the intra prediction mode obtainer 2910 determines the intra prediction mode of the prediction unit of the chrominance component by selecting the intra prediction mode indicated by the index from the intra prediction mode candidate group of the prediction unit of the chrominance component which is reconstructed in the same manner as that of the encoding side.

The exemplary embodiments may be embodied as computer-readable codes on a computer-readable recording medium. The computer-readable recording medium includes any storage device that may store data which may be read by a computer system. Examples of the computer-readable recording medium include read-only memories (ROMs), random-access memories (RAMs), CD-ROMs, magnetic tapes, floppy disks, and optical data storage devices. The computer-readable recording medium may be distributed over network-coupled computer systems so that the computer-readable codes are stored and executed in a distributed fashion.

While the exemplary embodiments has been particularly shown and described with reference to exemplary embodiments thereof by using specific terms, the embodiments and terms have merely been used to explain the exemplary embodiments and should not be construed as limiting the scope of the exemplary embodiments as defined by the claims. The exemplary embodiments should be considered in a descriptive sense only and not for purposes of limitation. Therefore, the scope of the exemplary embodiments is defined not by the detailed description of the exemplary embodiments but by the appended claims, and all differences within the scope will be construed as being included in the exemplary embodiments.

The invention claimed is:

1. An apparatus of decoding an image, the apparatus comprising:
at least one processor configured to:
split an image into a plurality of maximum coding units,
hierarchically split a maximum coding unit from among the plurality of maximum coding units into at least one coding unit including a current coding unit based on split information,
obtain intra prediction mode information regarding a prediction unit of a first image component of the image from a bitstream, when an intra prediction mode indicated by the intra prediction mode information regarding the prediction unit of the first image component is one of a planar mode, a DC mode, a horizontal mode and a vertical mode,
obtain an intra prediction mode candidate group regarding a second image component, wherein the intra prediction mode candidate group regarding the second image component includes a diagonal mode,
obtain intra prediction mode information regarding a prediction unit of the second image component,
determine an intra prediction mode regarding the prediction unit of the second image component from among a plurality of intra prediction modes which are included in the intra prediction mode candidate group regarding the second image component based on the obtained intra prediction mode information regarding the prediction unit of the second image component,
perform intra prediction on the prediction unit of the first image component according to the intra prediction mode indicated by the intra prediction mode information regarding the prediction unit of the first image component, and
perform intra prediction on the prediction unit of the second image component according to the determined intra prediction mode,
wherein if the at least one processor performs intra prediction on the prediction unit of the first image component, when the intra prediction mode indicated by the intra prediction mode information regarding the prediction unit of the first image component is the planar mode, the at least one processor is configured to obtain a prediction value of a current pixel included in a block in the prediction unit of the first image component using four neighboring pixels of the block in the prediction unit of the first image component,
wherein the current coding unit is a coding unit which is not split according to the split information,
wherein the prediction unit of the first image component is determined by splitting the current coding unit based on partition type information, and
wherein the partition type information indicates whether a partition type of symmetrically splitting the current coding unit along at least one of a height and a width of the current coding unit.

2. The apparatus of claim 1, wherein the intra prediction mode information regarding the prediction unit of the second image component comprises an index which indicates one of a plurality of intra prediction modes included in the intra prediction modes included in the intra prediction mode candidate group regarding the second image component.

3. An apparatus of encoding an image, the apparatus comprising:
at least one processor configured to:
determine a plurality of maximum coding units by splitting an image into the plurality of the maximum coding units,
determine at least one coding unit including a current coding unit by hierarchically splitting a maximum coding unit from among the plurality of maximum coding units into the at least one coding unit, wherein the current coding unit is a coding unit of a current depth which is not split into coding units of a lower depth,
determine one or more prediction units including a prediction unit of a first image component by splitting the current coding unit,
determine an intra prediction mode regarding the prediction unit of the first image component by performing intra prediction on the prediction unit of the first image component,
determine an intra prediction mode regarding a prediction unit of a second image component by performing intra prediction on the prediction unit of the second image component,
generate intra prediction mode information regarding the prediction unit of the first image component of the image,
when an intra prediction mode indicated by the intra prediction mode information regarding the prediction unit of the first image component is one of a planar mode, a DC mode, a horizontal mode and a vertical mode,
generate an intra prediction mode candidate group regarding the second image component, wherein the intra prediction mode candidate group regarding the second image component includes a diagonal mode,
generate intra prediction mode information regarding a prediction unit of the second image component based on a plurality of intra prediction modes included in the intra prediction mode candidate group regarding the second image component,
generate split information which indicates whether a split of coding units in the maximum coding unit, and
generate partition type information indicates whether a partition type of symmetrically splitting the current coding unit along at least one of a height and a width of the current coding unit, and to generate a bitstream including the intra prediction mode information regarding the prediction unit of the first image component of the image, the intra prediction mode information regarding the prediction unit of the second image component, the split information and partition type information,
wherein if the at least one processor determines the intra prediction mode regarding the prediction unit of the first image component comprises when a prediction value of a current pixel included in a block in the prediction unit of the first image component is obtained by using four neighboring pixels of the block in the prediction unit of the first image component in performing the intra prediction on the prediction unit of the first image component, the at least one processor is configured to determine the intra prediction mode regarding the prediction unit of the first image component as a planar mode.

4. A non-transitory computer-readable storage medium storing a bitstream comprising:
- intra prediction mode information regarding a prediction unit of a first image component of an image;
- intra prediction mode information regarding a prediction unit of a second image component of the image;
- split information which indicates whether a split of coding units in a maximum coding unit; and
- partition type information indicates whether a partition type of symmetrically splitting a coding unit of a first depth along at least one of a height and a width of the coding unit of the first depth when the coding unit of the first depth is not split into coding units of a second depth which is lower than the first depth,
- wherein a plurality of maximum coding units are determined by splitting an image into a plurality of maximum coding units,
- wherein at least one coding units including a current coding unit is determined by hierarchically splitting a maximum coding unit from among the plurality of maximum coding units into the at least one coding unit, wherein the current coding unit is a coding unit of a current depth which is not split into coding units of a lower depth,
- wherein one or more prediction unit including the prediction unit of the first image component are determined by splitting the current coding unit,
- wherein when an intra prediction mode indicated by the intra prediction mode information regarding the prediction unit of the first image component is one of a planar mode, a DC mode, a horizontal mode and a vertical mode, an intra prediction mode candidate group regarding the second image component is generated, wherein the intra prediction mode candidate group regarding the second image component includes a diagonal mode,
- wherein the intra prediction mode information regarding the prediction unit of the second image component is generated based on a plurality of intra prediction modes included in the intra prediction mode candidate group regarding the second image component,
- wherein the partition type information is generated to indicate whether a partition type of symmetrically splitting the current coding unit along at least one of a height and a width of the current coding unit,
- wherein when a prediction value of a current pixel included in a block in the prediction unit of the first image component is obtained by using four neighboring pixels of the block in the prediction unit of the first image component in performing the intra prediction on the prediction unit of the first image component, the intra prediction mode regarding the prediction unit of the first image component is determined as a planar mode, and
- wherein the maximum coding unit has a square shape.

* * * * *